(12) United States Patent
Ueda et al.

(10) Patent No.: US 6,433,896 B1
(45) Date of Patent: Aug. 13, 2002

(54) IMAGE PROCESSING APPARATUS

(75) Inventors: Kazuhiro Ueda, Toyokawa; Nobuhiro Mishima, Okazaki; Soh Hirota; Daisetsu Tohyama, both of Toyokawa, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/095,311

(22) Filed: Jun. 10, 1998

(51) Int. Cl.[7] ................................................. H04N 1/04
(52) U.S. Cl. ..................... 358/488; 382/289; 382/296
(58) Field of Search ................................. 358/488, 449, 358/401; 382/289, 296, 297, 293, 286, 295; 399/17, 81, 371

(56) References Cited

U.S. PATENT DOCUMENTS 5,373,371 A * 12/1994 Masui ........................ 358/488
5,818,976 A * 10/1998 Pasco et al. ................ 382/289

FOREIGN PATENT DOCUMENTS

| JP | 56-105579 | 8/1981 |
| JP | 62-166651 | 7/1987 |
| JP | 63-009266 | 2/1988 |
| JP | 04-083467 | 3/1992 |
| JP | 07-298031 | 11/1995 |

* cited by examiner

*Primary Examiner*—Cheukfan Lee
(74) *Attorney, Agent, or Firm*—Sidley Austin Brown & Wood

(57) ABSTRACT

In an image processing apparatus, an image reading unit reads a document put on a platen glass to generate image data, and a detector in the image reading unit detects offset, tilt angle and document area of the document put on the platen glass. A rotation angle is set based on the image data of a document. The entire document area is determined based on a portion of the document which exists within the image reading area when the document extends beyond the image reading area. The document area can be detected even if a document is not rectangular. For example, a slope of the document is determined based on the detected longest segment. In order to solve the unequal reading pitch, the longest segment is selected in the segments having a slope smaller than a predetermined angle relative to the subscan direction. Then, the image data are corrected according to the above result.

21 Claims, 77 Drawing Sheets

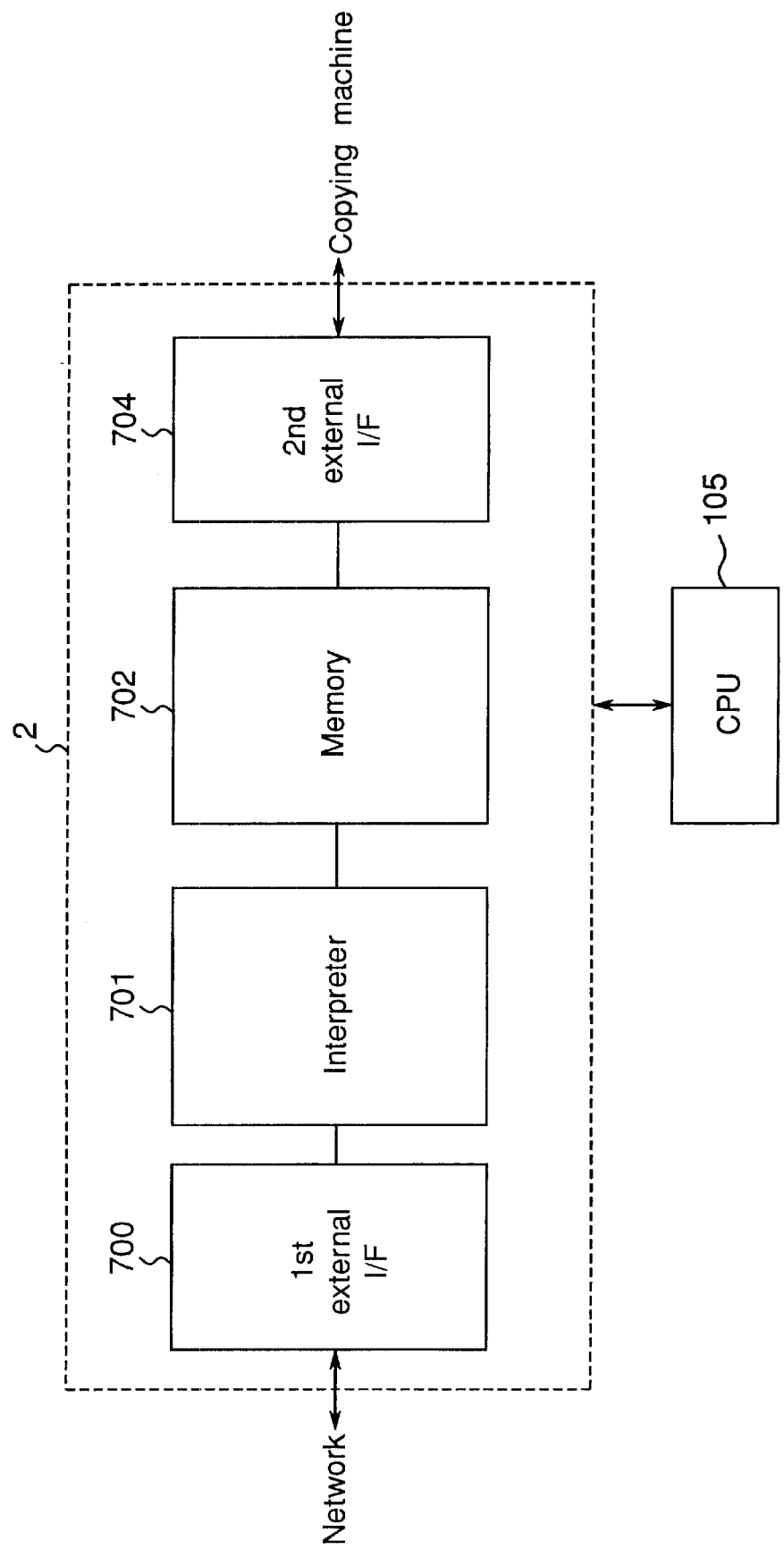

Fig.20A
32-bit input data
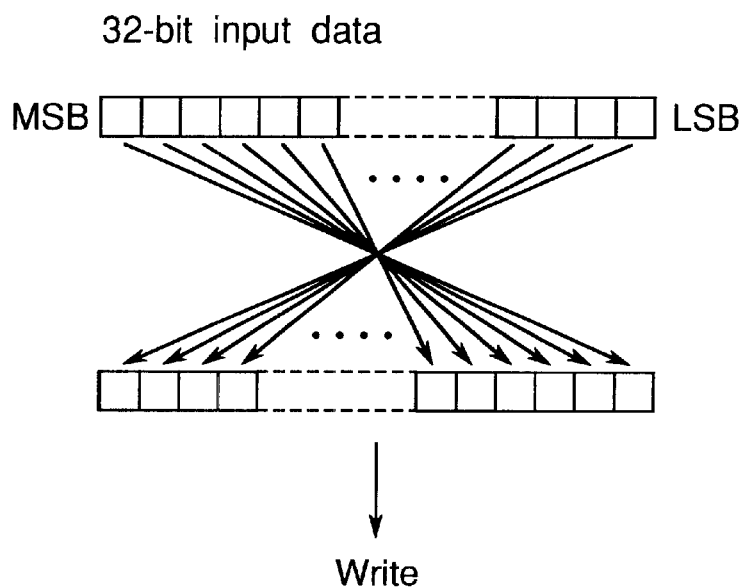
Write
Fig.20B (Virtual paper area)
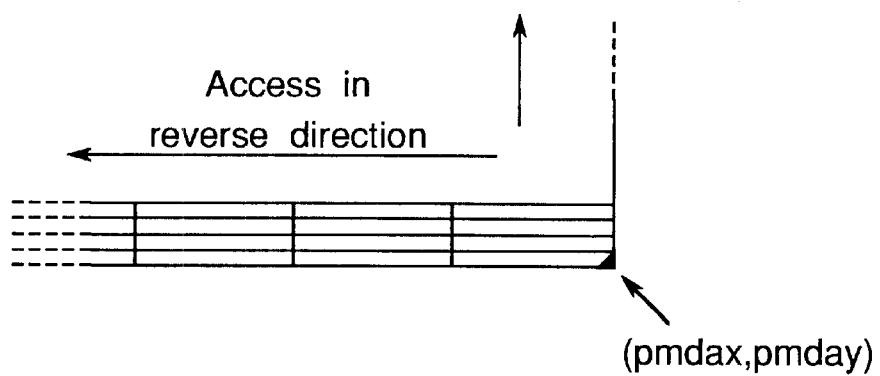
(pmdax,pmday)

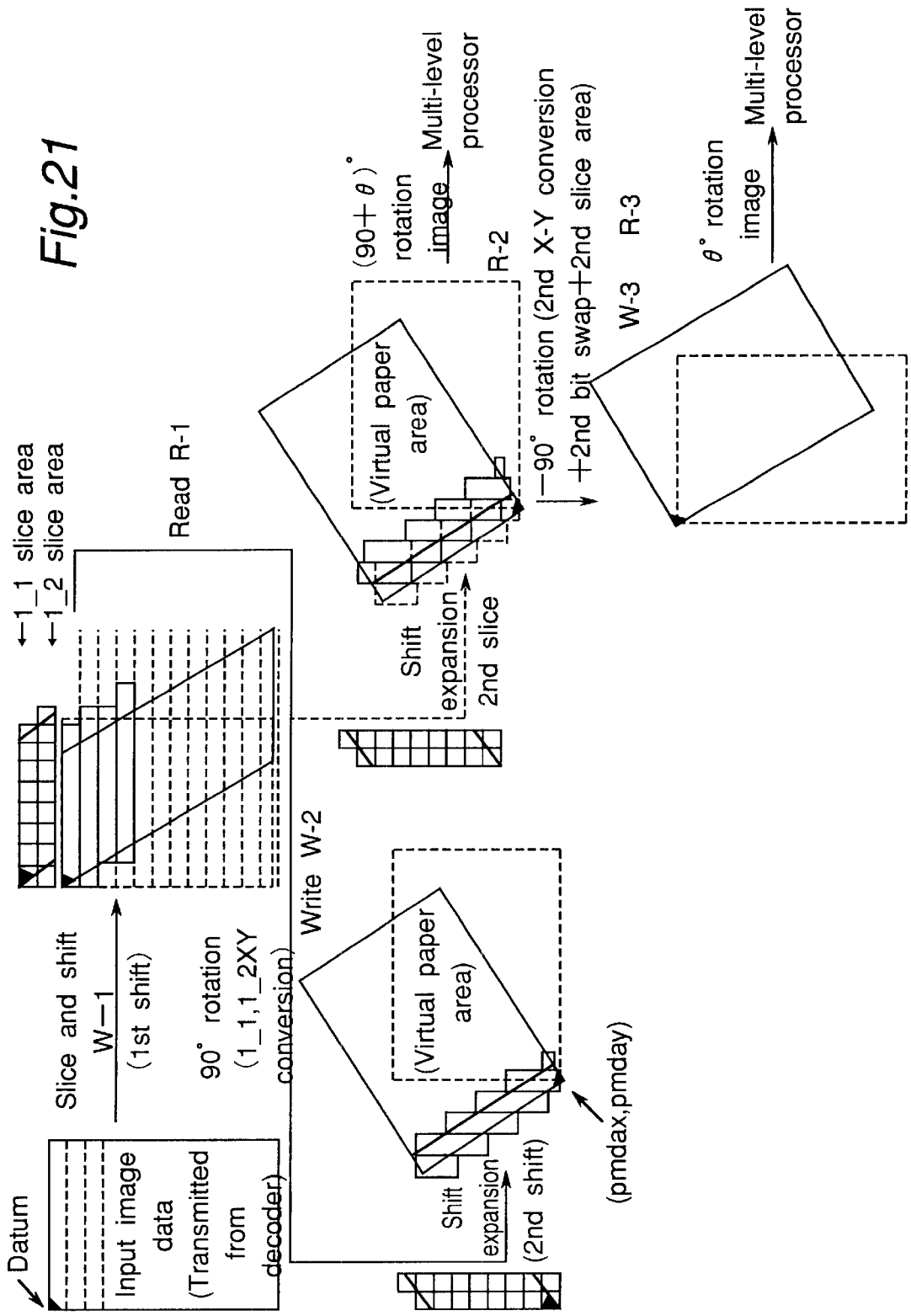

Fig.70A

Set area addresses

S22131 Calculate lengths between adjacent vertices
length_f[line_count_f]=
(point_f[point_f_count] [0]−point_f[point_f_count+1] [0])$^2$
+(point_f[point_f_count] [1]−point_f[point_f_count+1] [1])$^2$
length_l[line_count_l]=
(point_l[point_l_count] [0]−point_l[point_l_count+1] [0])$^2$
+(point_l[point_l_count] [1]−point_l[point_l_count+1] [1])$^2$

S22132 Calculate equation of line connecting the vertices, and store the calculated slope and y-intercept $$Y = \frac{y_2 - y_1}{x_2 - x_1} X - \frac{x_1 y_2 - x_2 y_1}{x_2 - x_1}$$

$$\text{line [point\_count] [0]} = \frac{y_2 - y_1}{x_2 - x_1}$$

$$\text{line [point\_count] [1]} = -\frac{x_1 y_2 - x_2 y_1}{x_2 - x_1}$$

S22133 Divide into groups each including lines with equal or perpendicular slopes
line[point_count] [0]=line[point_count+1] [0]

$$\text{line[point\_count] [0]} = \frac{1}{\text{line[point\_count+1] [0]}}$$

group[group_count] [0]=line[point_count] [0]

S22134 Calculate a sum of the lengths of the lines of each group
group[group_count] [1]=Sum of lengths of the lines

S22135 Extract the group having the longest sum
max_group=group_count

S22136 Store the extracted slope as the inclination of the document
doc_cline=group[max_group] [0]

(15)

IMAGE PROCESSING APPARATUS

This application is based on application Nos. 9-152344, 9-345216, 9-345224 and 9-345225 filed in Japan, the contents of which are hereby incorporated by reference.

BACKGROUND OF THE INVENTION

1. Field of the Invention

The present invention relates to an apparatus for processing image data and more particularly to an apparatus which processes image data read by an image reader.

2. Description of Prior Art

In a digital image forming apparatus such as a digital copying machine, an image of a document is formed on a paper after digital image data of the document are processed. The digital image data are generated by reading an image of a document with a linear CCD sensor or the like.

When a document is read by an image reader, it is put on a platen glass. When the document is put on the platen glass at an erroneous position, it is desirable to correct the tilt of the document. Then, a function is proposed to rotate 2-dimensional image data obtained by a document reader by the tilt angle of the document (for example, Japanese Patent Publication 63-9266/1988). The position of the document and the image area thereof are detected based on the digital image data. For example, Japanese Patent laid open Publication 62-166651/1987 shows that coordinates of four points locates at the maxima and the minima in the X and Y directions, and angles of the four sides connecting the four points are determined relative to a reference. Japanese Patent laid open Publication 7-298031/1995 shows that coordinates of four corners of a document are detected, and a tilt of the document is calculated from the corners detected first and second while the translation of the document is calculated from the corner detected first. In the tilt angle rotation, inclination of a document put on a platen glass is detected, and the image data are rotated to the normal position. Then, an image is formed on a paper based on the corrected image data. Thus, when a user puts a document at a tilt unintentionally, its image can be output by automatically correcting the tilt of the image.

However, in the prior art tilt correction by rotating the image data by the tilt angle, parameters needed for the tilt correction cannot be set when a document to be read is put erroneously to extend beyond the image reading area.

In the apparatuses described in Japanese Patent laid open Publications 62-166651/1987 and 7-298031/1995, the document area and the tilt of a rectangular document can be determined. However, the document area and the tilt of the document cannot be detected appropriately for a document having an extended portion or a non-rectangular document because the extended portion or the like is detected erroneously.

Further, in the above-mentioned apparatuses, the tilt of a document is detected based on the four points at the maxima or the minima or corners of a rectangular document. Then, the positions of the four points or corners may be detected erroneously, and the correct tilt may not be detected.

When an image of a document is read, a scanner is moved in the subscan direction to propagate a reflected light from the document to a liner CCD sensor or the like. However, the reading pitch in the subscan direction is unequal, the positions of the four corners or the like may be detected erroneously, and the slope and the document area cannot be detected correctly.

SUMMARY OF THE INVENTION

An object of the invention is to provide an image forming apparatus which can form an appropriate image of a document even when the document extends beyond the image reading area.

Another object of the invention is to provide a document detection apparatus which detects the position and the tilt of a document more precisely.

A further object of the invention is to provide a document detection apparatus which detects the position and the tilt of a document more precisely even if reading pitch is unequal.

In one aspect of the invention, an image processing apparatus comprises a document setter having an image reading area for reading a document put in the image reading area, and an image reader which reads the document put on the document setter. A detector detects an offset of the document from a standard position based on image data of the document read by the image reader. The detector includes a means for determining the area of the entire document based on a portion of the document which exists within the image reading area when the document extends beyond the image reading area. A moving means modifies the image data such that the determined document is moved to be located at a predetermined position when the offset of the document is detected by the detector. For example, the moving means comprises a rotator to rotate the image data. Further, the modified image data are formed on a paper. The document to be detected is for example rectangular. For example, the detector detects sides of the document and determines the tilt of the document on the document setter based on a longest side in the detected sides of the document.

In a second aspect of the invention, when a document is detected, a document is read by putting it on a document setter having an image reading area on which a document to be read. Edges of the document are extracted based on image data obtained by reading the document for the image reading area. Then, edges along the longest line are detected in lines of the document obtained from the extracted edges, and a slope of the document put on the document setter is determined based on the edges of the longest line.

In a third aspect of the invention, an image forming apparatus comprises a document setter having an image reading area for reading a document put in the image reading area, and an image reader which reads the document put on the document setter. A detector detects a document area of the document in the image reading area based on image data of the document read by said image reader. A rectangular area including the document area is determined, and a slope of the rectangular area is determined. A rotator rotates the image data included in the rectangular area to correct a tilt of the document, and a printer forms an image on a paper based on the image data rotated by the rotator.

In a fourth aspect of the invention, when a document is detected, a document put on a document setter having an image read area for reading a document put in the image reading area is read with a line sensor aligned in the main scan direction by moving a scanner in the subscan direction. Edges of the document are detected based on image data read on the document. Then, edges of lines having slopes equal to or smaller than 45° relative to the subscan direction in the extracted edges are determined, and a tilt of the document is also detected based on the edges of the determined line.

An advantage of the present invention is that an image of a tilted document is corrected automatically if the document extends beyond the image reading area when it is read by an image reader.

Another advantage of the invention is that an image of a tilted document is corrected automatically for a document which is not rectangular.

A further advantage of the invention is that the tilt angle and the document area of a tilted document can be detected even if reading pitch is unequal when the document is read.

BRIEF DESCRIPTION OF THE DRAWINGS

These and other objects and features of the present invention will become clear from the following description taken in conjunction with the preferred embodiments thereof with reference to the accompanying drawings, and in which:

FIG. 5 is a block diagram of a controller;

FIGS. 20A and 20B are diagrams for explaining bit swap processing of image data;

FIG. 21 is a diagram for explaining tilt angle rotation (shift-and-shift processing) of image data;

FIGS. 70A and 70B are flowcharts of area address setting in the third embodiment;

DETAILED DESCRIPTION OF THE PREFERRED EMBODIMENTS

Figure 1:
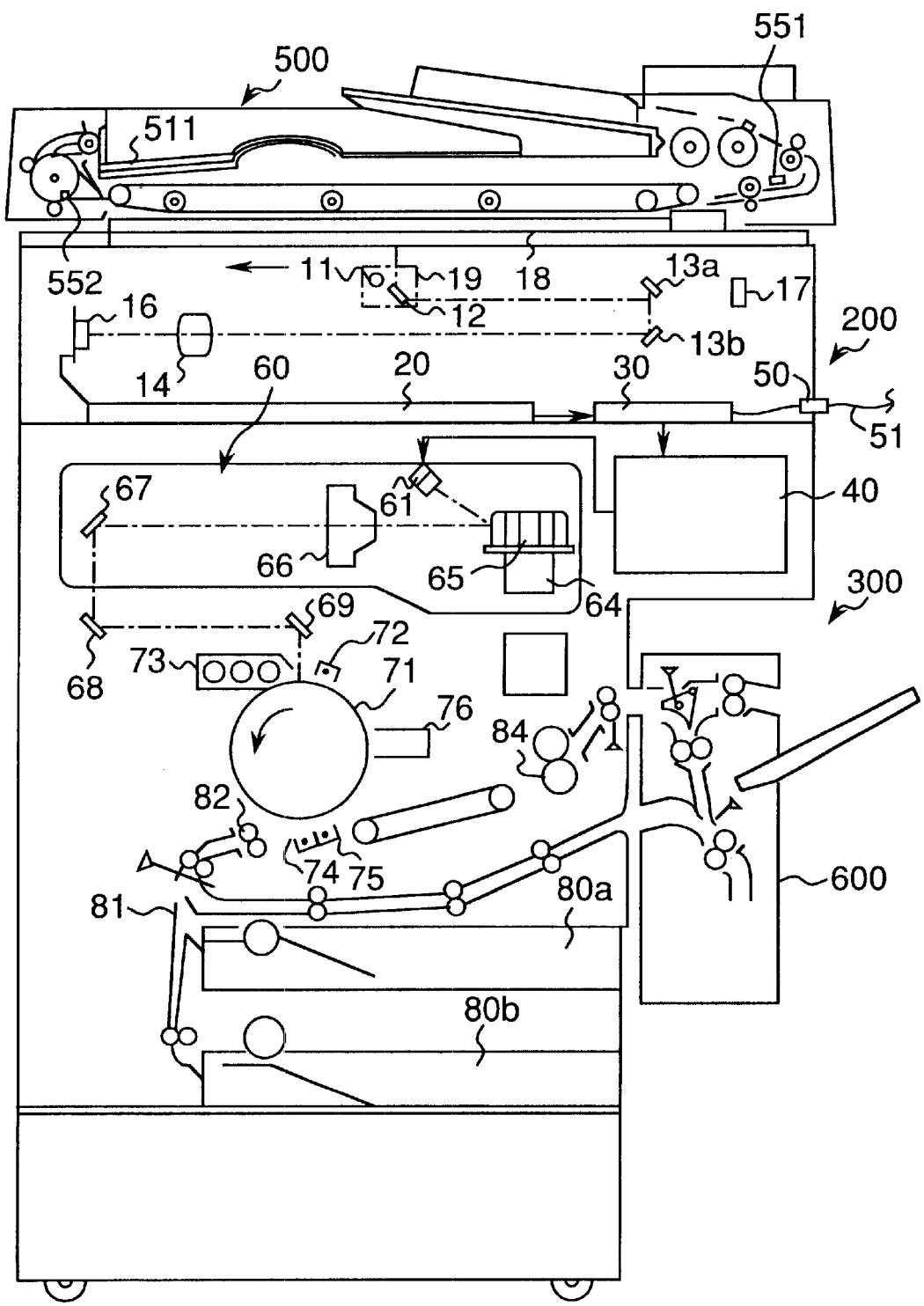
FIG. 1 is a schematic sectional view of a digital copying machine.

Referring now to the drawings, wherein like reference characters designate like or corresponding parts throughout the views, preferred embodiments of the invention are explained below.

A. Structure of the Copying Machine

A digital copying machine of a first embodiment of the invention is explained. FIG. 1 schematically shows an entire structure of the digital copying machine 1. The digital copying machine 1 has an image reader 200, a printer 300, a document feeder 500, an operational panel (refer to FIG. 2), and a paper-re-feed unit 600.

The document feeder 500 feeds a document put on a document tray 10 automatically onto a platen glass 18. After the document is read by the image reader 200, it is carried onto a tray 511. The document size is detected by sensors 551 and 552.

The image reader 200 includes a scan system and an image processor 20. In the scan system, a document on the platen glass 18 is read and image data are generated corresponding to each pixel of the document image. That is, the document is illuminated by an exposure lamp 12 mounted to a scanner 19 which is moved below the platen glass 18. A light reflected from the document propagates through mirrors 12, 13a, 13b and a condenser lens 14 to a line sensor (photoelectric conversion element) 16 such as a CCD (charge-coupled device) array. A scanner position sensor 17 is provided to detect that the scanner 19 reaches to a document read area (image area). The line sensor 16 has many photoelectric conversion elements aligned in main scan direction (a direction vertical to the paper face of FIG. 1). For example, it reads an image at 400 dots per inch to convert the reflected light to electrical signals to be output to the image signal processor 20. The image signal processor 20 processes the input electrical signals and sends the obtained image data to a memory unit 30. The image signal processor 20 detects the tilt of a document. The memory unit 30 encodes the image data received from the image signal processor 20 and stores the code data. Next, it decodes the data and sends the image data to the printer 300. When the data are decoded, edition such as tilt angle rotation for a tilted document is performed if necessary.

The memory unit 30 has an interface as mentioned below, and it is connected through a connector 50 and a cable 51 to an external apparatus.

The printer 300 includes a print processor 40, a laser optical system 60, an image forming system. The print processor 40 controls the laser optical system 60 based on the image data received from the memory unit 30. In the laser optical system 60, a laser diode 61 emits a laser beam modulated by signals from the signal processor 40, and a polygon mirror 65 deflects it to scan a photoconductor drum 71. That is, the deflected laser beam is guided by an f-θ lens 66 and reflection mirrors 67, 68 onto an exposure position on the photoconductor drum 71, to form a latent image of the document image by the scan on the photoconductor drum 71.

An image is formed by an image forming system with an electrophotographic process. That is, a latent image formed on the photoconductor drum 71 is developed and the developed image is transferred and fixed on a paper to form an image on the paper. In this process, after the photoconductor drum 71 rotating counterclockwise in FIG. 1 is charged uniformly by a sensitizing charger 72, it is exposed by the laser beam to form a latent image, and the latent image is developed by a development unit 73. (For ease of explanation, only one development unit is shown in FIG. 1, but actually development units for toners of four colors of cyan, magenta, yellow and black are used.) On the other hand, a sheet of paper is guided from a paper cassette 80a, 80b through a paper guide 81 and timing rollers 82 towards the photoconductor drum 71, and the toner image obtained by development is transferred onto the paper by a transfer charger 74. Next, the paper is separated by a separation charger 75 and carried to fixing rollers 84. The fixing rollers 84 fix the image with heat. Then, the paper is sent out through the paper-re-feed unit 600.

Figure 2:
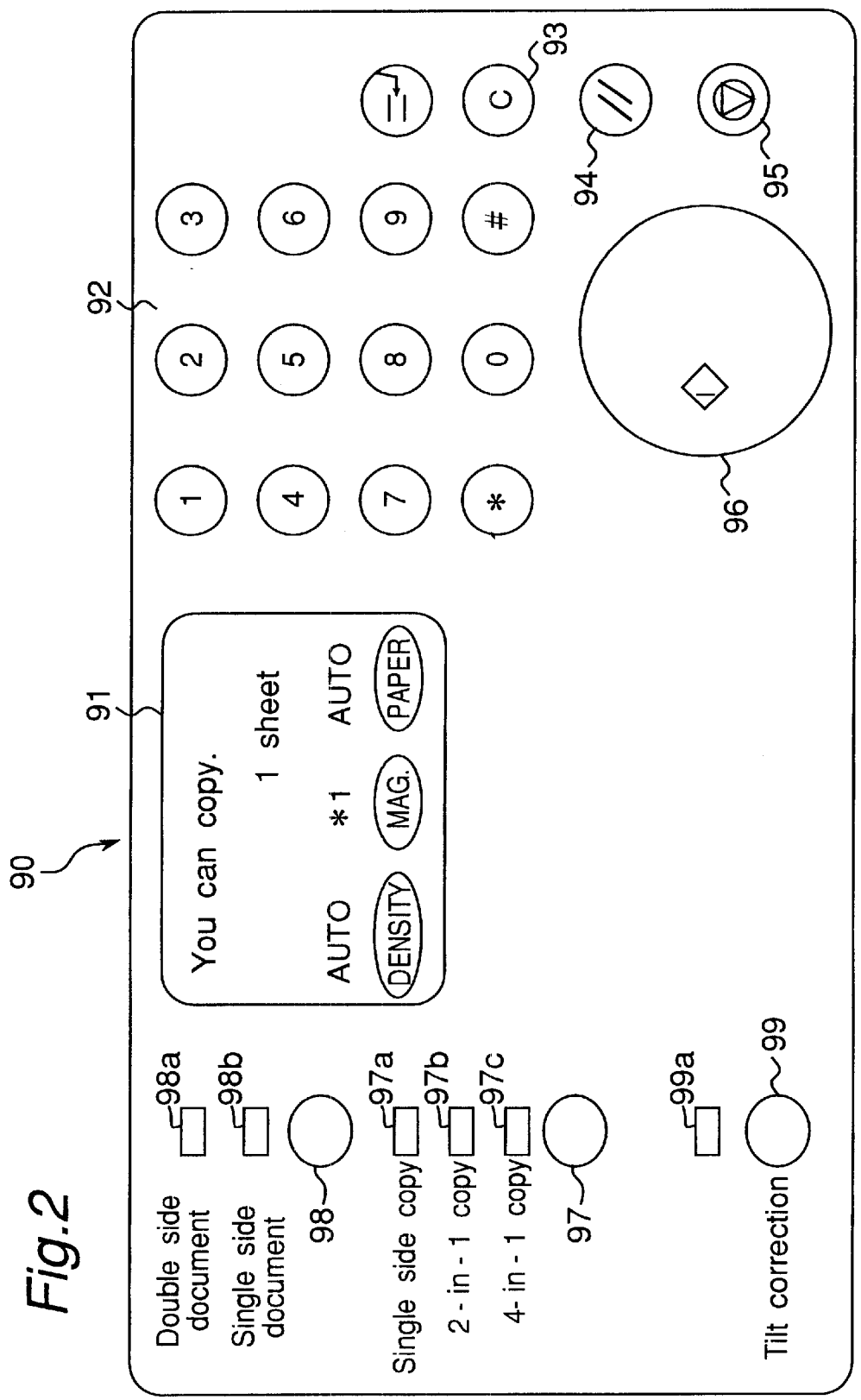
FIG. 2 is a plan view of an operational panel of the copying machine.

FIG. 2 is a plan view of the operational panel of the copying machine. The operational panel has a liquid crystal touch panel 91 which displays statuses, and various modes are set therewith. Further, it has numeral keys 92 for inputting numerical values such as a number of copies or magnifying power, a clear key 93 for resetting a value to the standard value, a panel reset key 94 for initializing the copy mode, a stop key 95 for stopping copy operation, and a start key 96 for starting copy operation. Still further, it has a copy mode key 97 for it setting single side copy mode, single side 2-in-1 copy mode or single side 4-in-1 copy mode, a document mode key 98 for setting single side document mode or double side document mode, and a key 99 for setting tilt angle rotation mode. It also has indicators 97a, 97b and 97c turned on when single side copy mode, single side 2-in-1 copy mode or single side or 4-in-1 copy mode are set, respectively, indicators 98a and 98b turned on when single side document mode and double side document mode are set, respectively, and an indicator 99a turned on when the tilt angle rotation mode is set.

Figure 3:
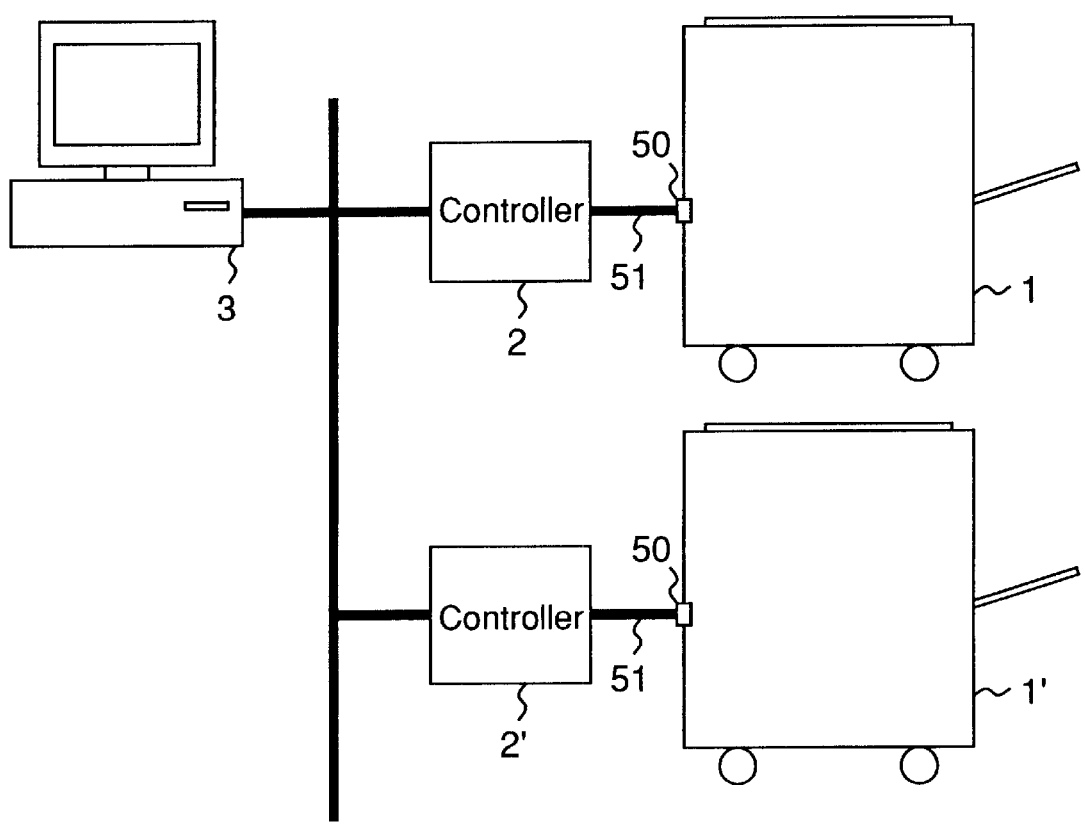
FIG. 3 is a diagram of a system including a plurality of copying machines.

FIG. 3 shows an example of a system including a plurality of digital copying machines 1, 1' connected in a network. The digital copying machines 1, 1' are connected through the connectors 50 to controllers 2, 2' as examples of external apparatuses. The controller 2, 2' is connected through a general interface such as Ethernet to a computer 3 and to the other copying machine. For example, in order print a data file prepared by the computer 3, in the print processing in the computer 3, various conditions such as paper size, magnifying power, copy number or conditions for staple or sorting mode, and an output instruction are input, and the computer 3 sends them to the controller 2. The controller 2 converts the image data such as PostScript data received from the computer 3 to luster data. A memory having a capacity of at least one page is provided in the controller 2. After converted to the bit map data, the image data as well as the various setting conditions sent also through the controller 2 are transmitted to the digital copying machine 1, which performs image forming and other various processes. The invention is not limited to the above system, and it includes a system such as a facsimile apparatus connected through a telephone line and a modem.

B. Control system of Copying Machine

Figure 4A:
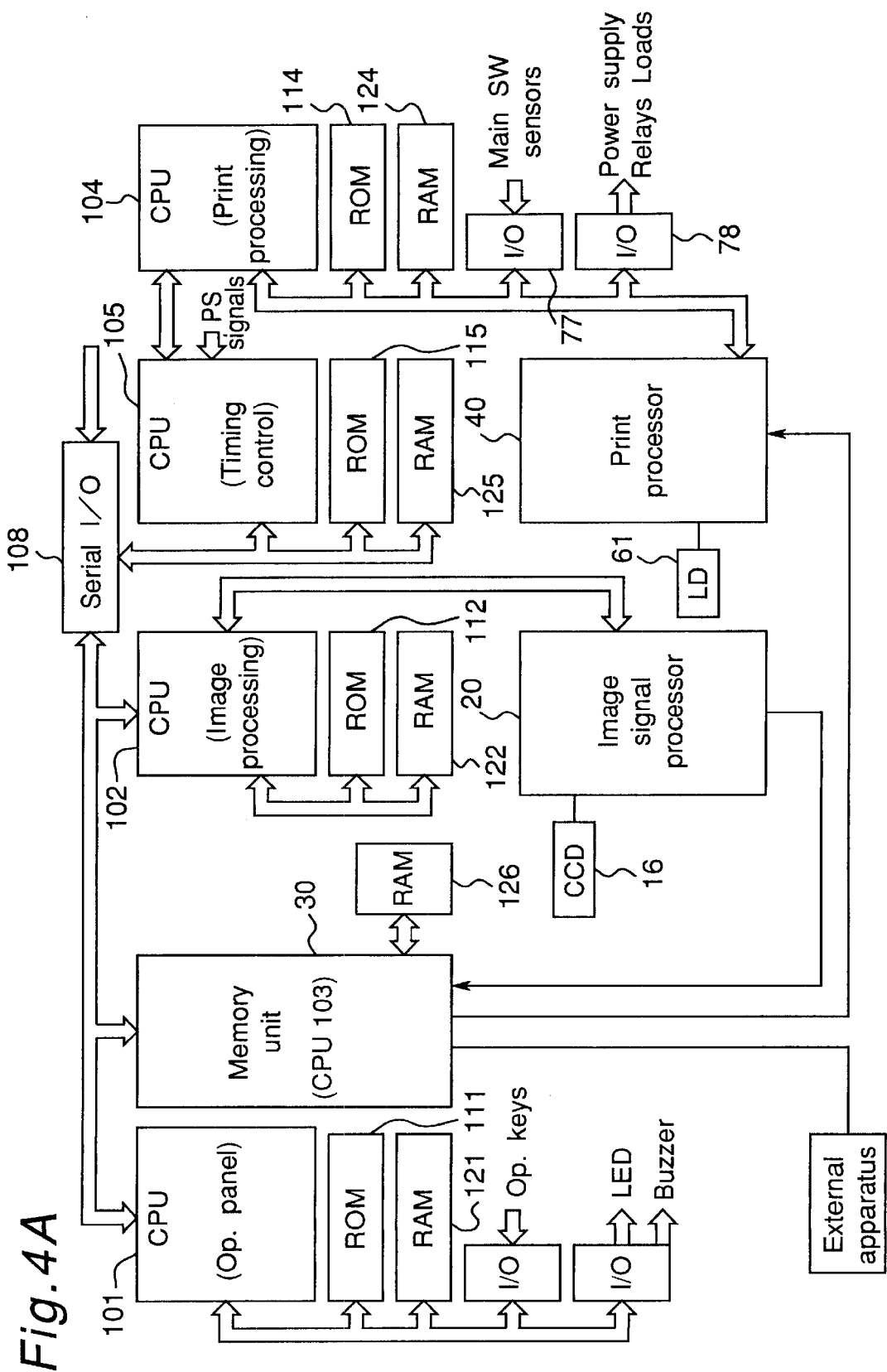
FIGS. 4A and 4B are block diagrams of a control section of the copying machine.
Figure 4B:
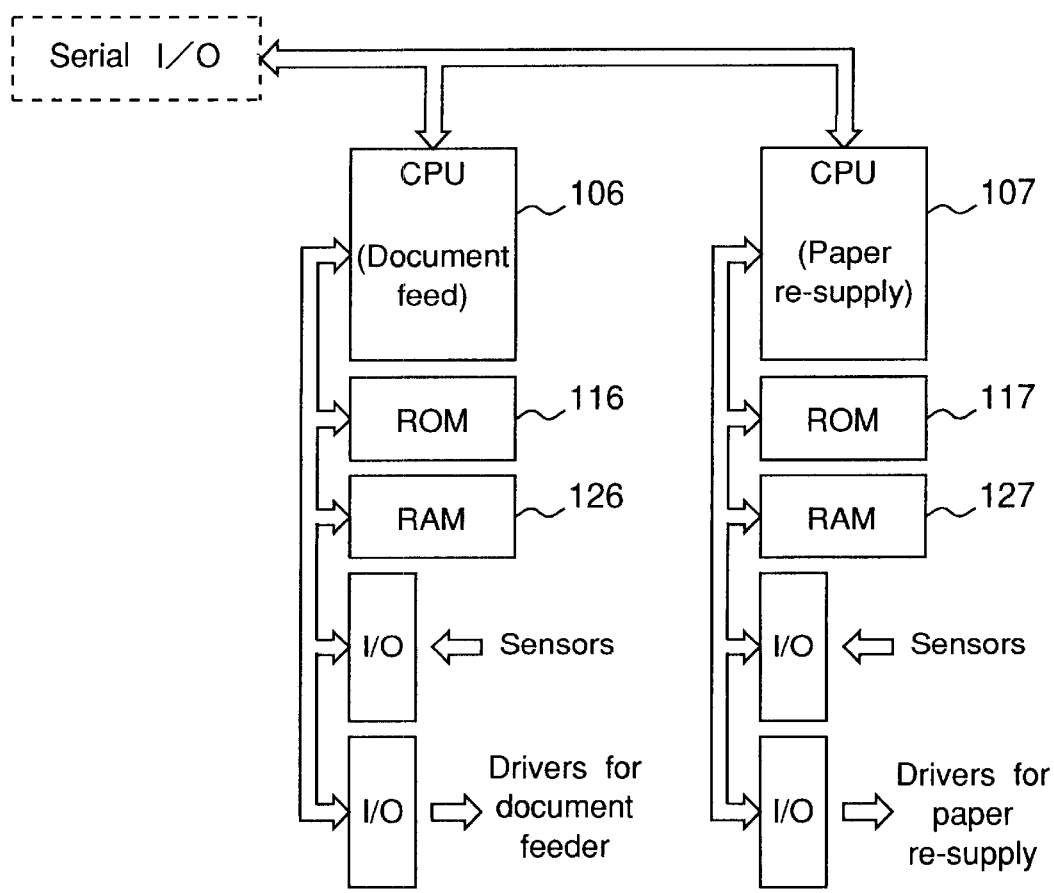

FIGS. 4A and 4B show a control system 100 which controls the copying machine 1. The control system 100 has seven central processing units (CPUs) 101–107. Each of the CPUs 101–107 is connected to a read only memory (ROM) 111–117 storing a program, a random access memory (RAM) 121–127 used as a work area for executing the program. The CPU 103 is provided in the memory unit 30.

The first CPU 101 controls key-input signals from various operational keys in the operational panel (refer to FIG. 2) and display in the liquid crystal touch panel.

The second CPU 102 controls the driving in the scan system in the image reader 200 and processing in the image signal processor 20. The tilt of a document is detected from the image read by the image reader 200.

The third CPU 103 controls the memory unit 30 to code the read image data to be stored in a code memory 303 and to read them therefrom to be sent to the print processor 40. When the image data are read, rotation and edition on the image data, including image tilt correction are performed if necessary. The memory unit 30 has a function to interface with an external apparatus to send or receive image data and control data.

The fourth CPU 104 controls the print processor 40, the optical system 60 and the image forming system in the printer 300.

The fifth CPU 105 controls timings in the entire control system and processes setting on an operation mode.

The sixth CPU 106 controls the document feeder 500.

The seventh CPU 107 controls the paper-re-feed unit 600.

Among the seven CPUs 101–107, serial transmission, is performed by using interrupt processing to send and receive commands, reports and the like between them.

FIG. 5 is a block diagram of the controller 2 controlled by the CPU 105. A first external interface 700 sends and receives signals to and from the external computer 3. An interpreter 701 interprets the data such as PostScript data received from the computer 3 and changes them to luster data, while a memory 702 stores the luster data. After a page of image data are stored, the image data are sent through a second external interface 704 to the printer 300.

Figure 6:
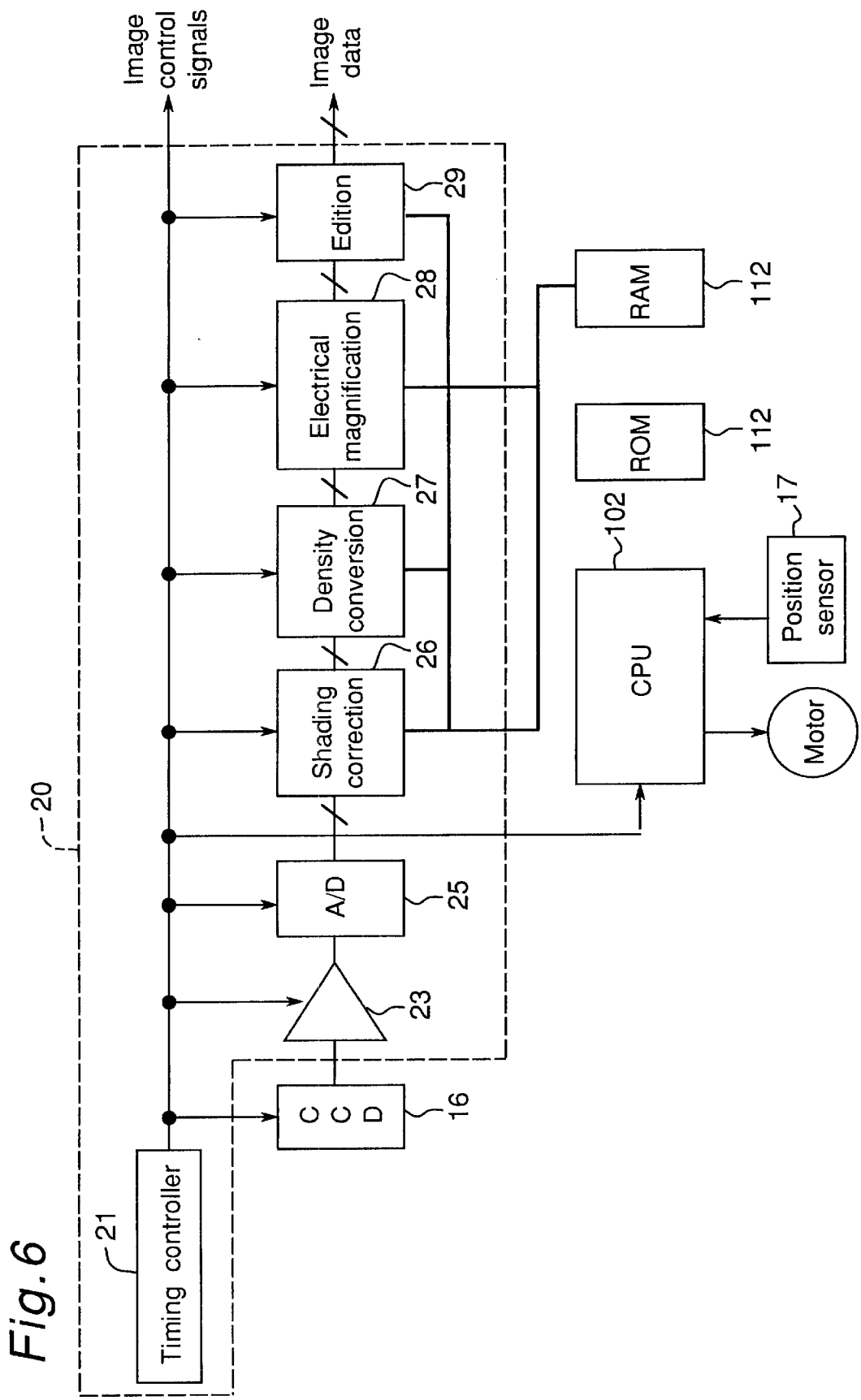
FIG. 6 is a block diagram of an image signal processor.

Next, image data processing is explained. FIG. 6 is a block diagram of the image signal processor 20. The image signal processor 20 has a timing controller 21, an amplifier 23, an analog-to-digital converter 25, a shading correction section 26, a density converter 27, an electrical magnification section 28 and an edition section 29, and it is controlled by the CPU 102. In the image signal processor 20, an input signal from the line sensor 16 is amplified by the amplifier 23 and quantized as an 8-bit data for each pixel by the analog-to-digital converter 25. Then, the image data are subjected to shading correction, conversion to density data (gamma correction), electrical magnification and edition. Then, the data are sent as image data to the memory unit 30 or to the printer. The second CPU 102 sets various parameters for the parts 26–29 in the image signal processor 20, controls a scan motor in the laser scan system and communicates with the CPU 105 to control the entire image reader 200.

The document size and document orientation are detected as follows. When it is checked whether a document is read or not, a document on the platen glass 18 is scanned with a document cover of specular face of the document feeder 500, and a portion having large reflection intensity is decided to be a document. Because there is practically no reflection light from the specular face, the decision is easy. The scan may be performed while the document cover is opened. When a command of document size detection is received from the CPU 105, the CPU 102 performs a prescan. The CPU 102 controls the scanner motor which drives the scanner 19 according to the position information from the scanner position sensor in the subscan direction. The document size and the document orientation of vertical or horizontal setting are detected from the content of the image data and the monitor position information at the timing corresponding to the subscan position. The CPU 102 sends the detection results to the CPU 105. The CPU 102 controls the speed of the scanner motor according to the magnifying power received from the CPU 102 when the image is read.

Figure 7:
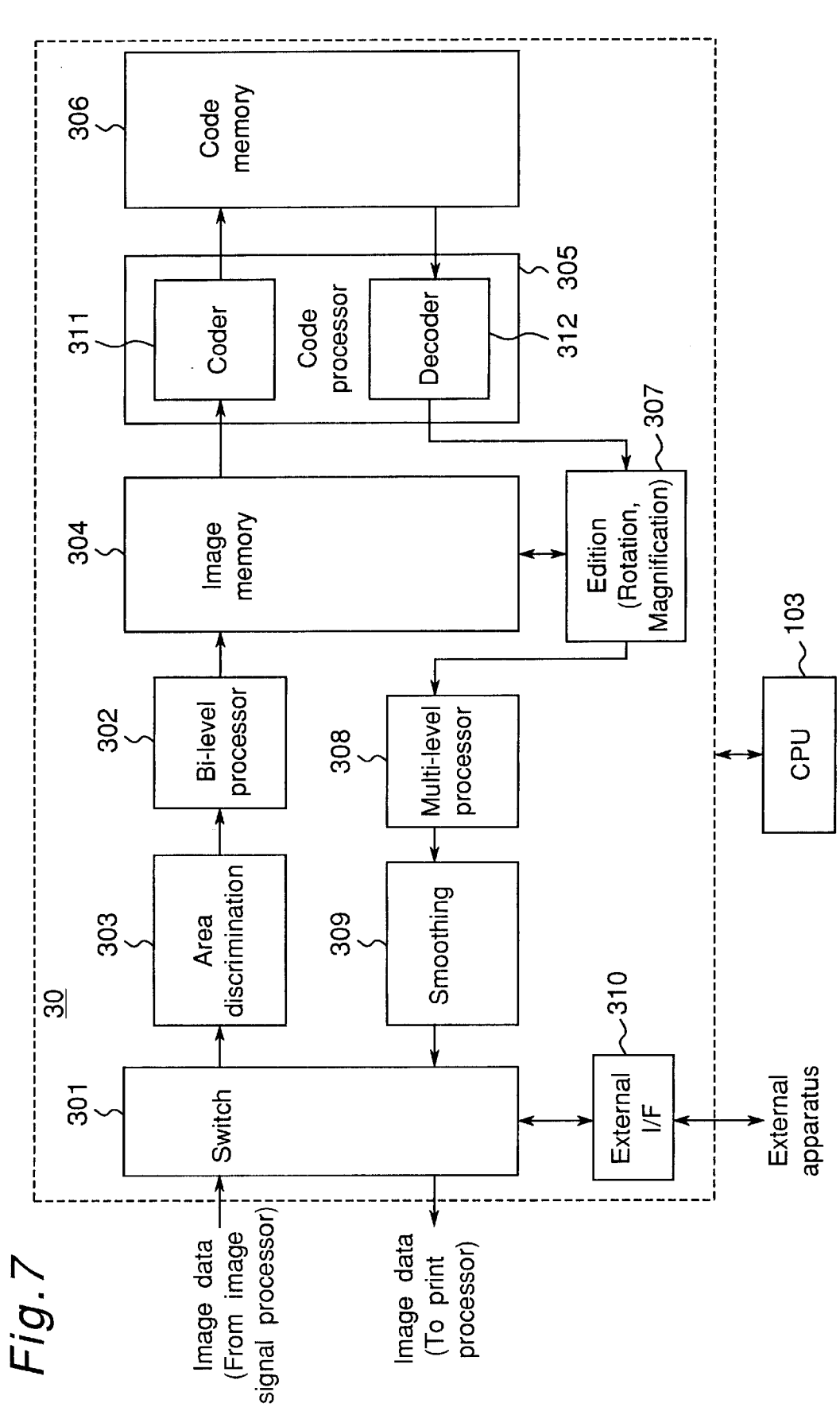
FIG. 7 is a block diagram of a memory unit.

FIG. 7 is a block diagram of the memory unit 30. A switch 301 switches a route of image between the image signal processor 20, the print processor 40 and the external interface 310. An area discrimination section 303 discriminates whether input image data are simple bi-level data or a half-tone data. A bi-level processor 302 binarizes the image data according to the parameters set by the CPU 103 with a process such as error dispersion or dither process in a range which can be recovered to multi-level data. An image memory 304 has a capacity of two pages, and the bi-level data are stored in the image memory 304. Next, the bi-level data stored in the image memory 304 are coded by a coder 311 in the code processor 305, and the code data are stored in a code memory 306. The code memory 306 is for example a multi-port memory having a capacity of one hundred pages of A4 size at 400 dots per inch. As data of a plurality of pages can be stored in the code memory, the code memory 306 is managed by a code management table provided in the RAM 126.

When printing is performed, the code data compressed in the code memory 306 are expanded by a decoder 312. If image edition is needed, an edition processor 307 performs edition (rotation, magnification, shift or the like) and decoding at the same time. If necessary, tilt angle rotation is also performed when the data are decoded. The decoded data are transmitted to the image memory. When data of one page are decoded, the bi-level data read from the image memory 304 are converted to multi-level data by a multi-level processor 308, and, if necessary, subjected to smoothing in a smoothing processor 309. Then, the data are sent through the switch 301 to the print processor 40 or the external apparatus. The CPU 103 sends control parameters to the multi-level processor 308 and the smoothing processor 309.

Figure 8:
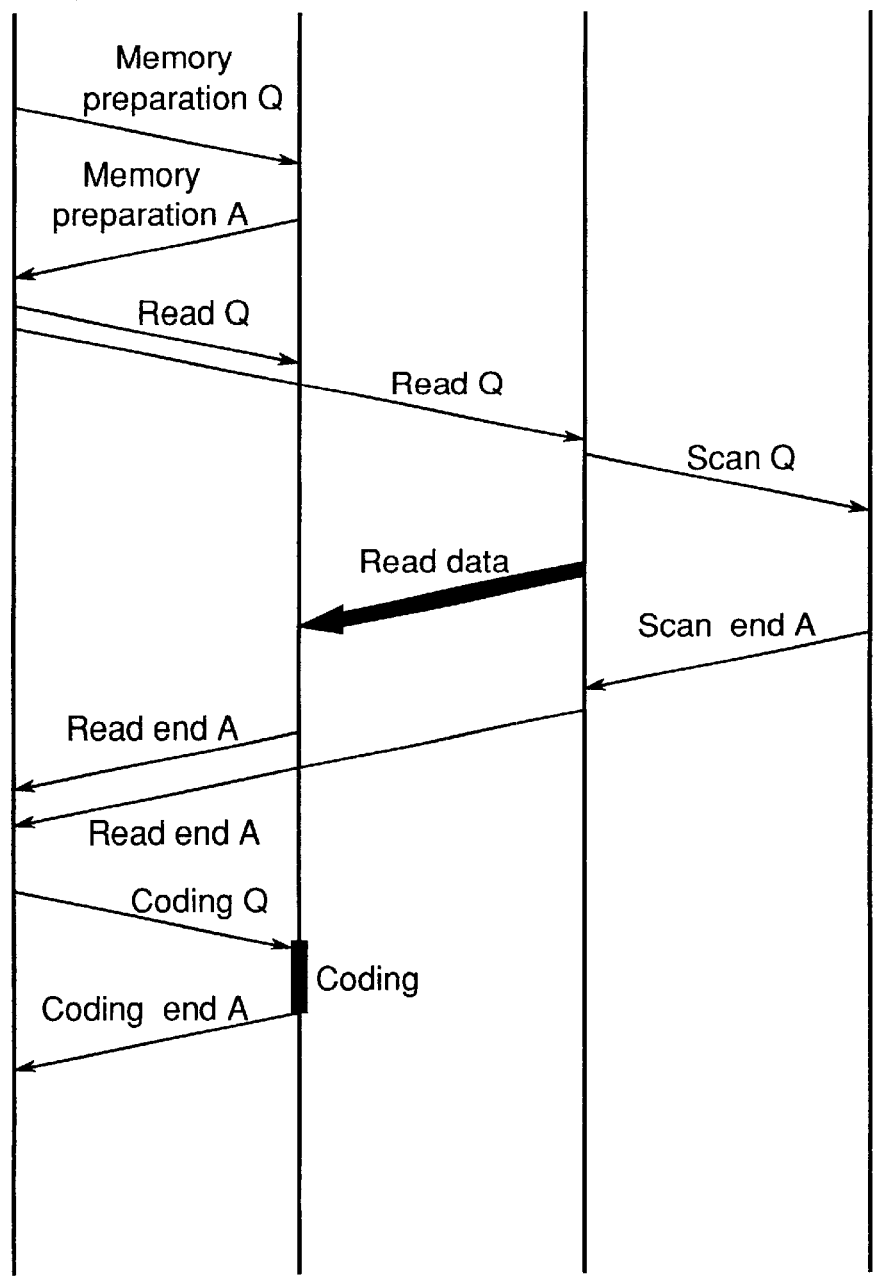
FIG. 8 is a sequence diagram of write to memory.

Next, operation sequences in the copying machine 1 on image reading and on printing are explained mainly on data flow of request commands (Q), reports (A) and data transmitted between the CPUs 101–106. FIG. 8 is a sequence diagram of write to memory. First, the CPU 105 which controls the entire sequence sends a memory preparation command to the CPU 103 which controls the memory unit 30. Then, the CPU 103 sets bus connection for transmitting image data from the image signal processor 20 to the image memory 304, sets a mode for binarization, and sets a start address in a write area in the image memory 30 and XY length information. After the preparation is completed, the CPU 103 notifies memory preparation end report to the CPU 105.

Next, the CPU 105 sends a read instruction to the CPUs 103 and 102. Then, the CPU 102 requests a scan to the document scan section in the image reader 20. Thus, a document scan is started. When the scanner 19 reaches to the document read area on the platen glass, the document is read, and the read data (image data D2) are sent through the image signal processor 20 to the memory unit 30 according to image processing mode set by the CPU 102. When the scan is completed, a scan end signal is sent to the CPU 102, and read end reports are notified by the CPUs 102 and 103 to the CPU 105.

Next, the CPU 105 requests data compression (coding) to the CPU 103. Then, the CPU 103 sets read address for the image memory 304, XY length information, write address for the code memory 306, a mode of the coder 311 such as arithmetic coding or modified Huffman coding, etc. and activates various parts. Then, the coder 311 performs coding (data compression), and the code data are stored in the code memory 306.

After the data compression is completed, the CPU 103 notifies coding end to the CPU 105. If the code memory 306 is full with data, the coding end answer includes a parameter which means coding impossible, and the CPU 105 knows that the code memory 306 is full.

Figure 9:
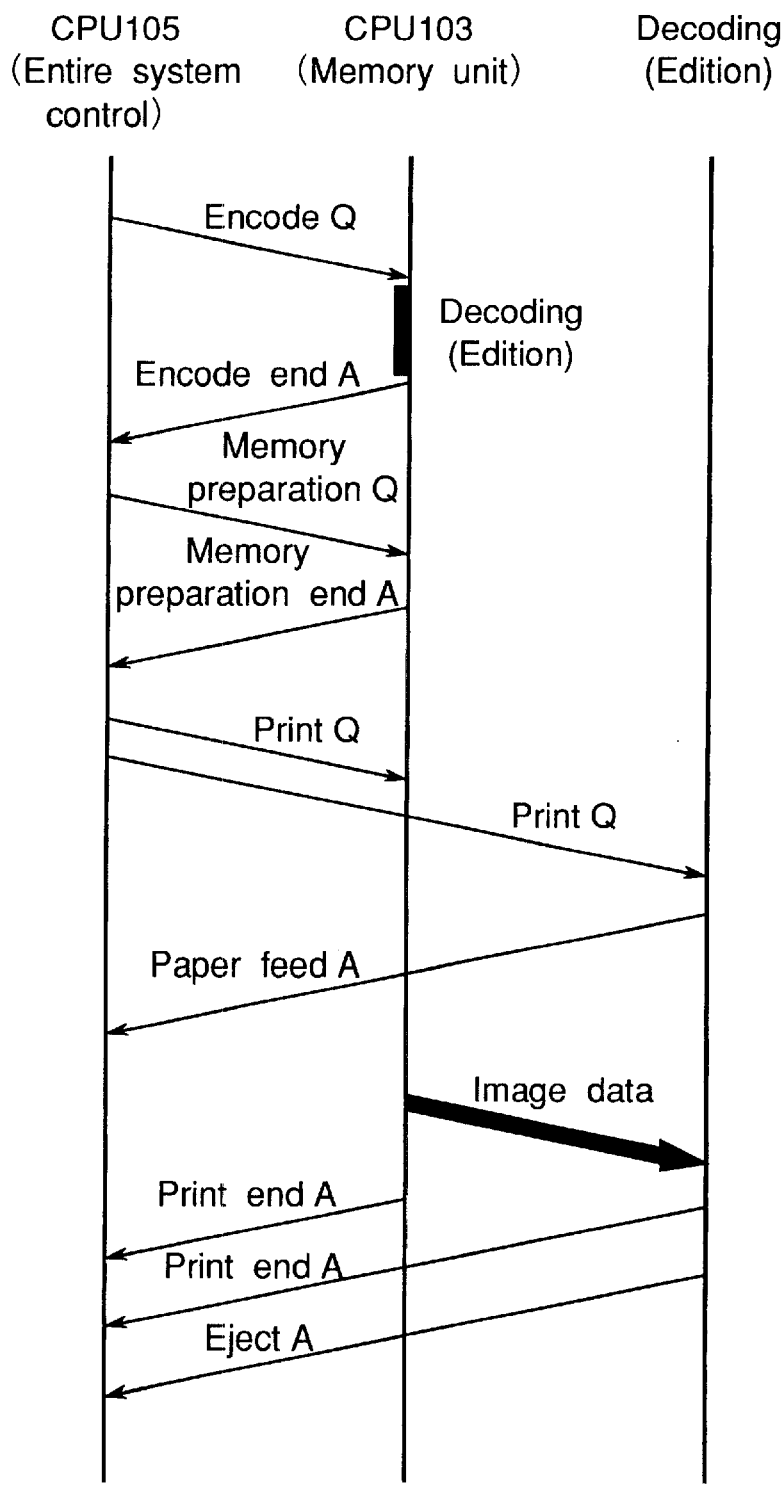
FIG. 9 is a sequence diagram of read from memory.

FIG. 9 shows a sequence diagram of read from memory, wherein image data are read from the image memory 304 and a reproduced image is printed on a paper based on the image data. First, the CPU 105 requests data expansion (decoding) to the CPU 103. Then, the CPU 103 sets read address for the code memory 306, XY length information, write address for the image memory 304, a mode of the decoder 312 such as arithmetic coding or modified Huffman coding, an edition mode such as tilt angle rotation and the like. Further it activates various parts. Then, the decoder 312 performs expansion (data decoding), and image data are written to the image memory 304. After the decoding is completed, the CPU 103 notifies decoding end to the CPU 105.

Next, the CPU 10 sends a memory preparation command to the CPU 103 for reading the image data from the image memory 304. Then, the CPU 103 sets bus connection for transmitting the image data from the image memory 304 to the print processor 40. Further, it sets a start address in a read area in the image memory 304, XY length information and the like. Then, the CPU 103 notifies memory preparation end report to the CPU 105.

Next, the CPU 105 sends a print instruction to the CPU 103 and to the print processor 40. Then, the print processor 40 sends a paper supply report which describes a paper supply status to the CPU 105. Then, image data read from the image memory 304 are sent to the print processor 40 for printing. After the printing is completed, the CPU 103 and the print processor 40 send print end report and eject end report to the CPU 105. The CPU 105 receives these reports and sends memory clear request to the memory 103 if necessary.

C. Document Reading for a Document at a Tilt

Figure 10:
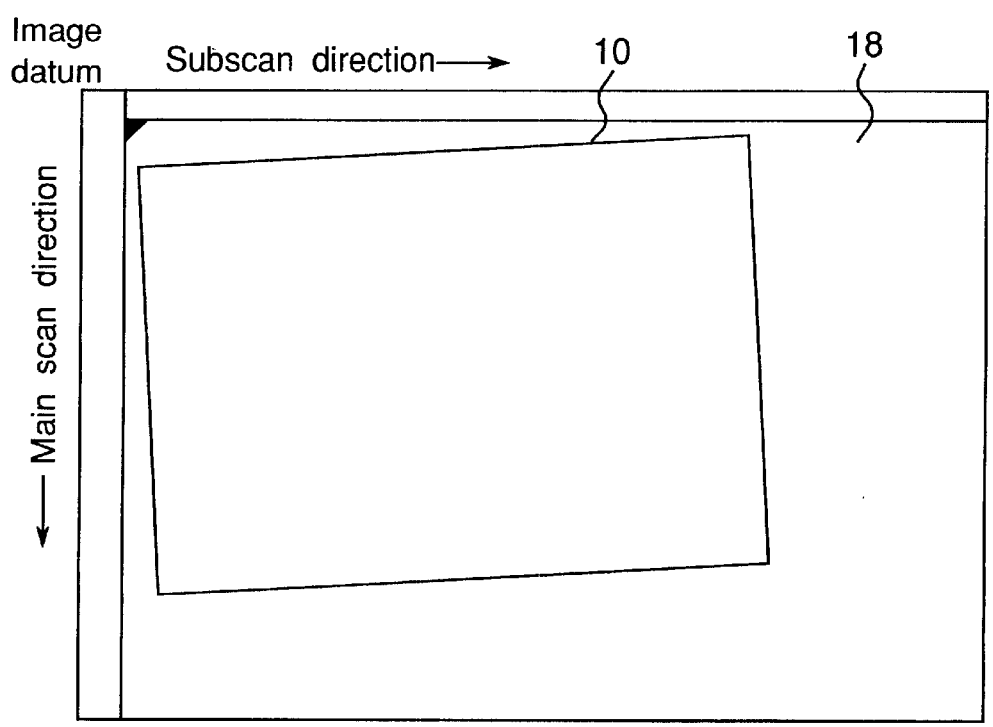
FIG. 10 is a diagram for explaining on reading a document image with scanning.

Image reading is explained when a document to be read is at a tilt on the platen glass 18. In FIG. 10, a document 10 is shown to be put on the platen glass 18 with face down. The platen glass 18 has a datum at the top-rightmost corner shown with a solid triangle in FIG. 10. The longitudinal direction of the platen glass 18 is the subscan direction when the document is scanned for reading, and a direction perpendicular thereto is the main scan direction. In the example shown in FIG. 10, the document is put off the image datum, and its direction is not parallel to the subscan direction. The document does not extend over the image read area in contrast to an example dealt in a sixth embodiment explained later.

Figure 11:
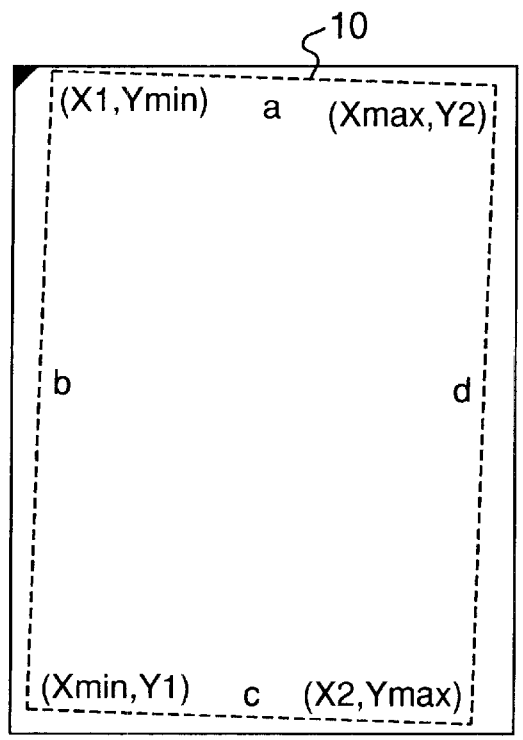
FIG. 11 is a diagram of an example of a document image.
Figure 12:
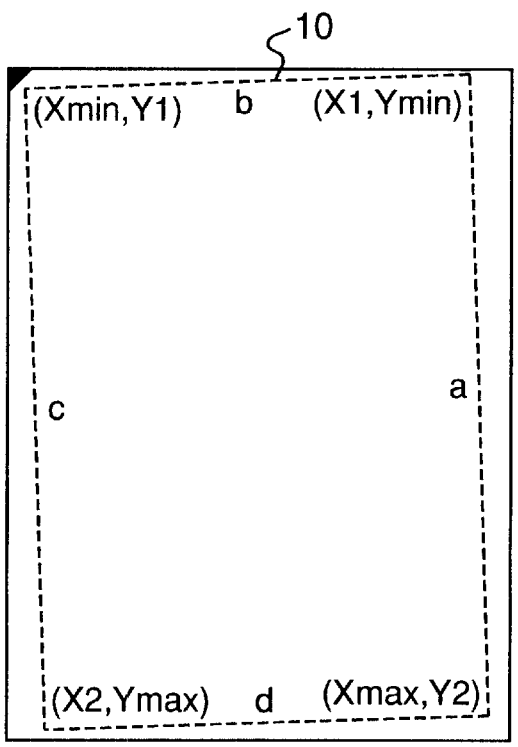
FIG. 12 is a diagram of another example of a document image.

FIGS. 11 and 12 show two examples of read document image when the document (denoted with dashed lines) does not extend beyond the image read area (a rectangle area denoted with solid lines). Because the document 10 is viewed from the face to be read, the image datum is located at the top-leftmost corner. In the image processor 20, the image data of the rectangle area including at least the document area are processed to detect the document area. Then, as shown in FIGS. 11 and 12, the coordinates of the four corners of the rectangle document are detected from the coordinates of all the periphery thereof (that is, edges of the document). The main scan direction is X axis, the subscan direction is Y axis. Parameters $X_{max}$ and $X_{min}$ denote the maximum and minimum X coordinates, $X_1$ denotes the larger among the remaining two X coordinates and $X_2$ denotes the smaller among them. On the other hand, $Y_{min}$ and $Y_{min}$ denote the maximum and minimum Y coordinates, and $Y_1$ denotes the larger among the remaining two Y coordinates, and $Y_2$ denotes the smaller among them. In the example shown in FIG. 11, X and Y coordinates of the four corners are $(X_1, Y_{min})$, $(X_{max}, Y_2)$, $(X_{min}, Y_1)$, $(X_2, Y_{max})$. The lengths of the four sides "a", "b", "c" and "d" of the document 10 are calculated from the document coordinates as follows.

$$a=\sqrt{(X_{max}-X_1)^2+(Y_2-Y_{min})^2},$$

$$b=\sqrt{(X_1-X_{min})^2+(Y_1-Y_{min})^2},$$

$$c=\sqrt{(X_2-X_{min})^2+(Y_{max}-Y_1)^2},$$

and $$d=\sqrt{(X_{max}-X_2)^2+(Y_{max}-Y_2)^2}.$$

In the example shown in FIG. 12, the direction of the tilt of the document is different from the counterpart of FIG. 11, and X and Y coordinates of the four corners are $(X_{min}, Y_1)$, $(X_1, Y_{min})$, $(X_2, Y_{max})$, $(X_{max}, Y_2)$. The lengths of the four sides "a", "b", "c" and "d" of the document 10 are calculated from the document coordinates by the same formulae.

Edition parameters for correcting the tilted document are obtained as follows. First, if $X_1-X_{min}<Y_1-Y_{min}$ (FIG. 11), Rotation coordinates:
 $(X_1, Y_{min})$.
Rotation angle θ:

$$\tan^{-1}\{(X_1-X_{min})/(Y_1-Y_{min})\}. \qquad (2)$$

Destination address (pmdax, pmday): $(-X_1-Y_{min})$.
On the other hand, if $X_1-X_{min}>Y_1-Y_{min}$ (FIG. 12),
Rotation coordinates: $(X_{min}, Y_1)$.
Rotation angle θ:

$$\tan^{-1}\{(Y_1-Y_{min})/(X_1-X_{min})\}. \qquad (3)$$

Destination address (pmdax, pmday): $(-X_{min}, -Y_1)$.
The rotation coordinates denotes the coordinates at the corner near the top-leftmost corner in FIGS. 11 and 12. The rotation angle θ is used to rotate the document at the position of the rotation coordinates to make the document parallel to the read area. The destination address denotes the coordinates to be transmitted to the memory, and it corresponds to a length between the top-leftmost position to the image datum.

Figure 13:
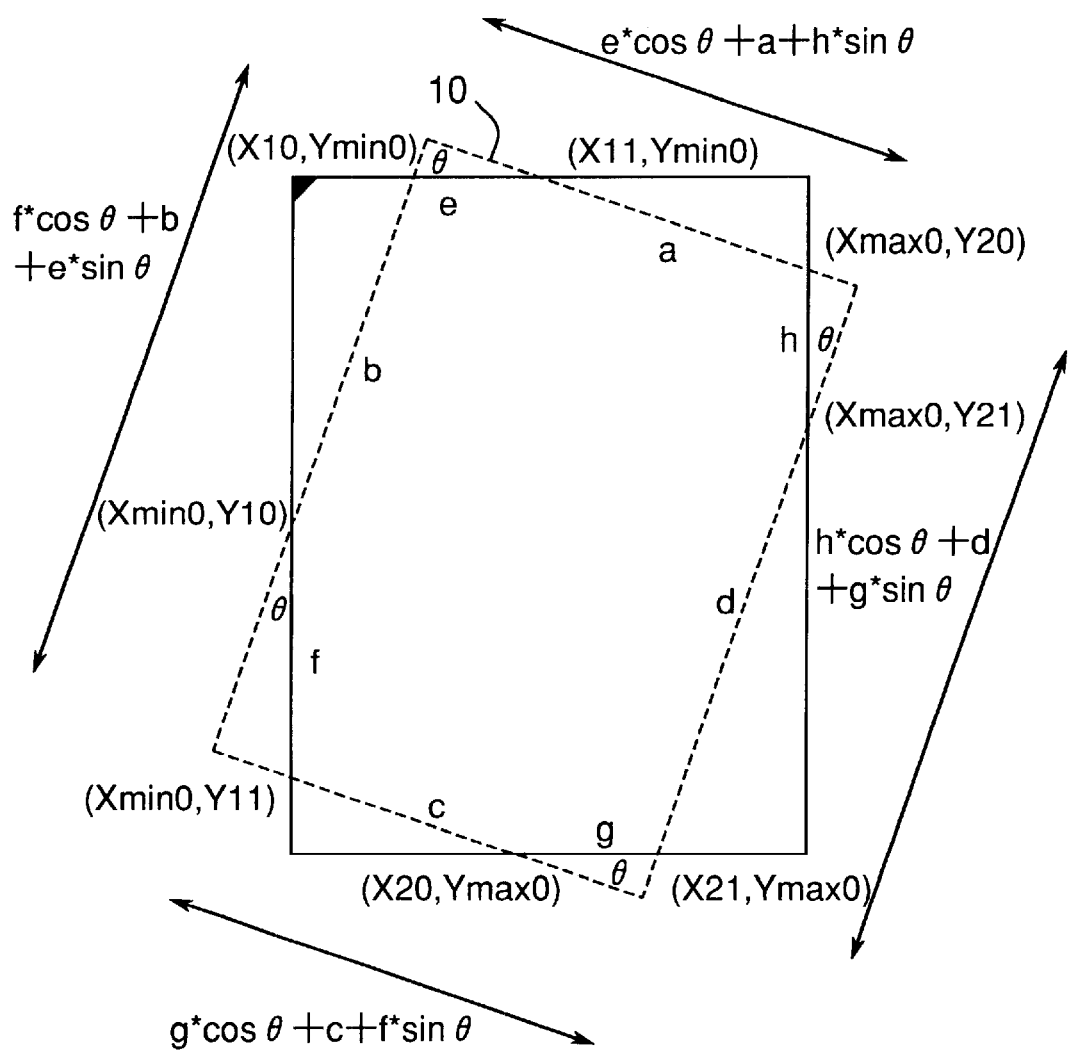
FIG. 13 is a diagram of an example of a document image of a document extending beyond the reading area.

First, detection of the four corners of a document is explained. The coordinates of the four corners of a document can be detected when a document 10 extends beyond the reading area (the rectangle portion of solid line), or when the read image (dashed line) is an image as shown in FIG. 13. The main scan direction is X axis and the subscan direction is Y axis in FIG. 13. It is assumed here that the read range is from $X_{min0}$ to $X_{max0}$ in the X axis and is from $Y_{min0}$ to $Y_{max0}$ in the Y axis. Because the corners of the document exist outside the read area, each of the extreme values $X_{max}$, $X_{min}$, $Y_{max}$ and $Y_{min}$ are detected at two points at the intersects of sides of the document with the periphery of the read region. For example, two points are detected if the extreme value in X or Y axis agrees with the maximum $X_{max0}$, $Y_{max0}$ or minimum $X_{min0}$, $Y_{min0}$. Thus, coordinates of the eight points for the corners of a document are $(X_{min0}, Y_{10})$ $(X_{min0}, Y_{11})$, $(X_{10}, Y_{min0})$, $(X_{11}, Y_{min0})$, $(X_{20}, Y_{max0})$, $(X_{21}, Y_{max0})$, $(X_{max0}, Y_{20})$, and $(X_{max0}, Y_{21})$. Thus, the lengths of the four sides "a", "b", "c" and "d" which exist within the read area can be extracted. Then, the lengths of the sides "a", "b", "c" and "d" existing within the read area and those "e", "f", "g" and "h" along the periphery corresponding to the extending portions are calculated from the document coordinates as follows.

$$a = \sqrt{(X_{max0} - X_{11})^2 + (Y_{20} - Y_{min0})^2},$$
$$b = \sqrt{(X_{10} - X_{min0})^2 + (Y_{10} - Y_{min0})^2},$$
$$c = \sqrt{(X_{20} - X_{min0})^2 + (Y_{max0} - Y_{11})^2},$$
$$d = \sqrt{(X_{max0} - X_{21})^2 + (Y_{max0} - Y_{20})^2}, \quad (4)$$
$$e = X_{11} - X_{10},$$
$$f = Y_{11} - Y_{10},$$
$$g = X_{21} - X_{20},$$

and $$h = Y_{21} - Y_{20}.$$

Further, when the document is assumed to be a rectangle, the lengths of the four sides are calculated as shown in the drawing, as follows:

$$e^* \cos \theta + a + h^* \sin \theta,$$
$$f^* \cos \theta + b + e^* \sin \theta,$$
$$g^* \cos \theta + c + f^* \sin \theta, \quad (5)$$

and $$h^* \cos \theta + d + g^* \sin \theta.$$

Then, the tilt angel θ is calculated for each side from the above coordinates.

For a document put on any position on the platen glass, edition parameters can be determined according to the procedures explained above. If at least one side in the four sides is detected, the tilt angle can be calculated. Further, the length and coordinate of each side can be calculated for a rectangle as an effective document area which includes the reading document area.

Figure 14:
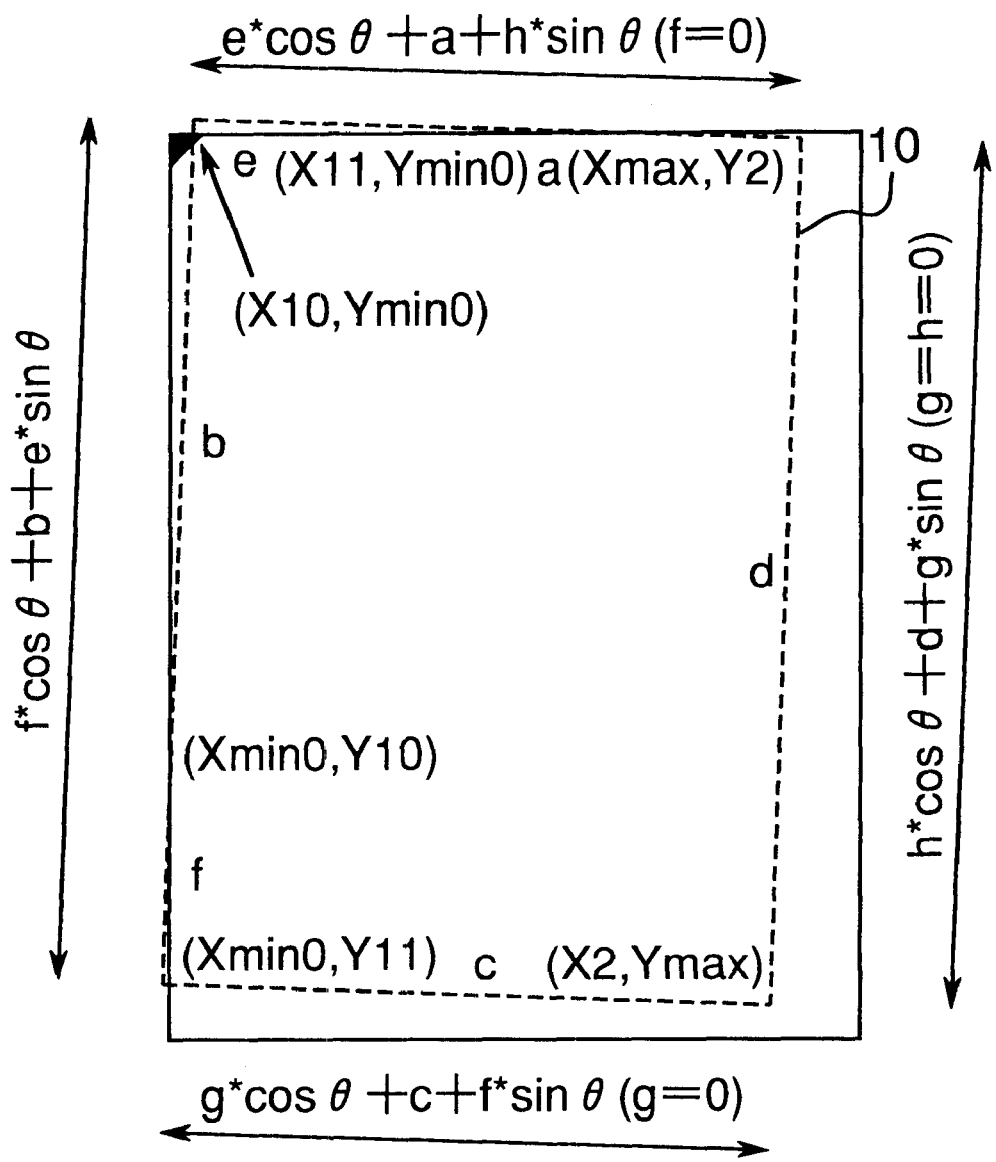
FIG. 14 is a diagram of another example of a document image of a document extending beyond the reading area.

FIG. 14 shows an example of a document image when the four sides of the document can be extracted even though the document extends beyond the reading area. The document extends beyond the reading area at the left and top sides, but two points intersecting each of the top and left sides $(X_{min0}, Y_{10})$, $(X_{min0}, Y_{11})$, $(X_{10}, Y_{min0})$ and $(X_{11}, Y_{min0})$ can be detected. The side "d" can be extracted surely, while the entire sides "a", "b" and "d" cannot be extracted. However, the lengths of the four sides and the coordinates of the four corners can be calculated based on the sides "e" and "f" and the tilt angle θ. In this example, g=h=0. Therefore, the lengths of the four sides can be calculated by setting g=h=0 in Eqs. (5).

$$e^* \cos \theta + a,$$
$$f^* \cos \theta + b + e^* \sin \theta,$$
$$c + f^* \sin \theta, \quad (6)$$

and $$d + g^* \sin \theta.$$

Figure 15:
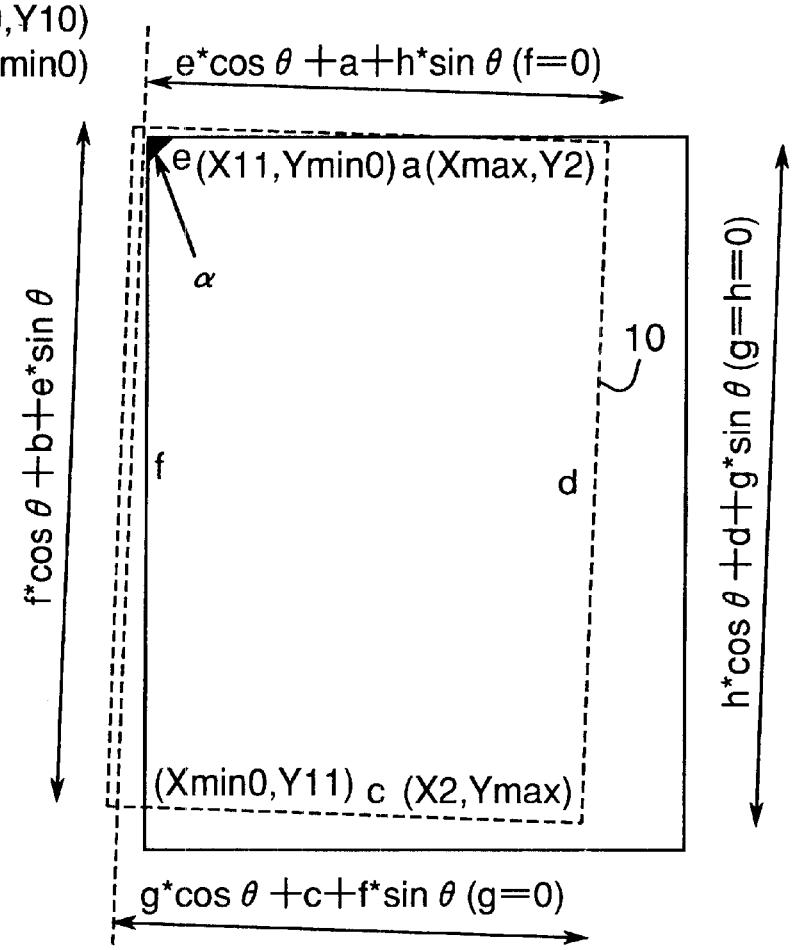
FIG. 15 is a diagram of a further example of a document image of a document extending beyond the reading area.

FIG. 15 shows another example of a document image on which only three sides can be extracted. In this example, the position α at the top-leftmost corner of the document portion which can be read is $(X_{min0}, Y_{10}) = (X_{min0}, Y_{11})$. In this example, b=g=h=0. Therefore, the lengths of the four sides can be calculated by setting b=g=h=0 in Eqs. (5).

$$e^* \cos \theta + a,$$
$$f^* \cos \theta + e^* \sin \theta,$$
$$c + f^* \sin \theta, \quad (7)$$

and $$d.$$

Figure 16:
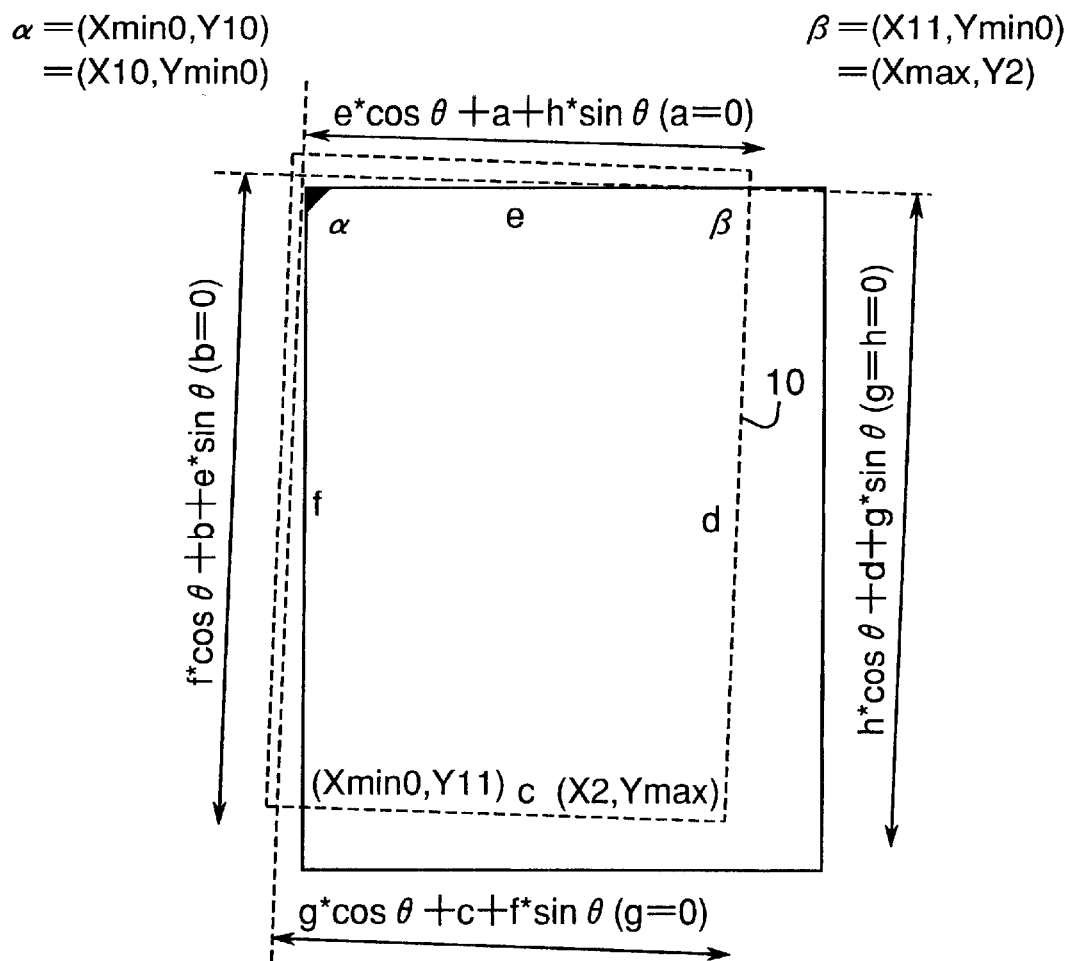
FIG. 16 is a diagram of a still further example of a document image of a document extending beyond the reading area.
Figure 17:
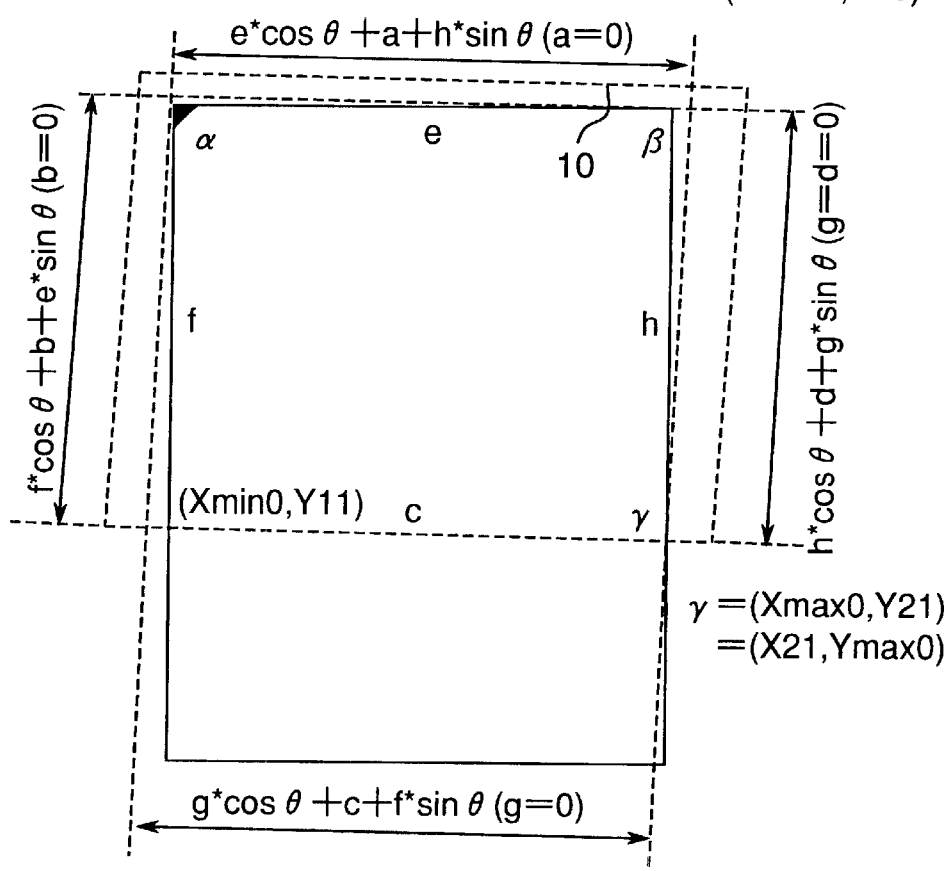
FIG. 17 is a diagram of a different example of a document image of a document extending beyond the reading area.

FIG. 16 shows another example of a document image on which only one side can be extracted. In this example, the position α at the top-leftmost corner of the document portion which can be read is $(X_{min0}, Y_{10}) = (X_{min0}, Y_{11})$, the position β at the top-rightmost corner of the document portion which can be read is $(X_{11}, Y_{min0}) = (X_{max0}, Y_2)$, and the position γ at the bottom-rightmost corner of the document portion which can be read is $(X_{max0}, Y_{21}) = (X_{21}, Y_{max0})$. In this example, a=b=d=g=0. Therefore, the lengths of the four sides can be calculated by setting a-b=d=g=0 in Eqs. (5).

$$e^* \cos \theta + h^* \sin \theta,$$
$$f^* \cos \theta + e^* \sin \theta,$$
$$c + f^* \sin \theta, \quad (8)$$

and $$h^* \sin \theta.$$

D. Tilt Angle Correction By Tilt Angle Rotation

When a tilt of a document is detected, the document image is rotated automatically by the tilt angle to provide a normal image without tilt. Therefore, for example, when a user puts a document at a tilt erroneously, a normal image thereof can be obtained by automatically rotating the image by the tilt angle. The rotation by the tilt angle uses a technique of arbitrary angle rotation for rotating image data by an arbitrary angle. The rotation by a tilt angle using the arbitrary angle rotation is called below as tilt angle rotation.

Figure 18:
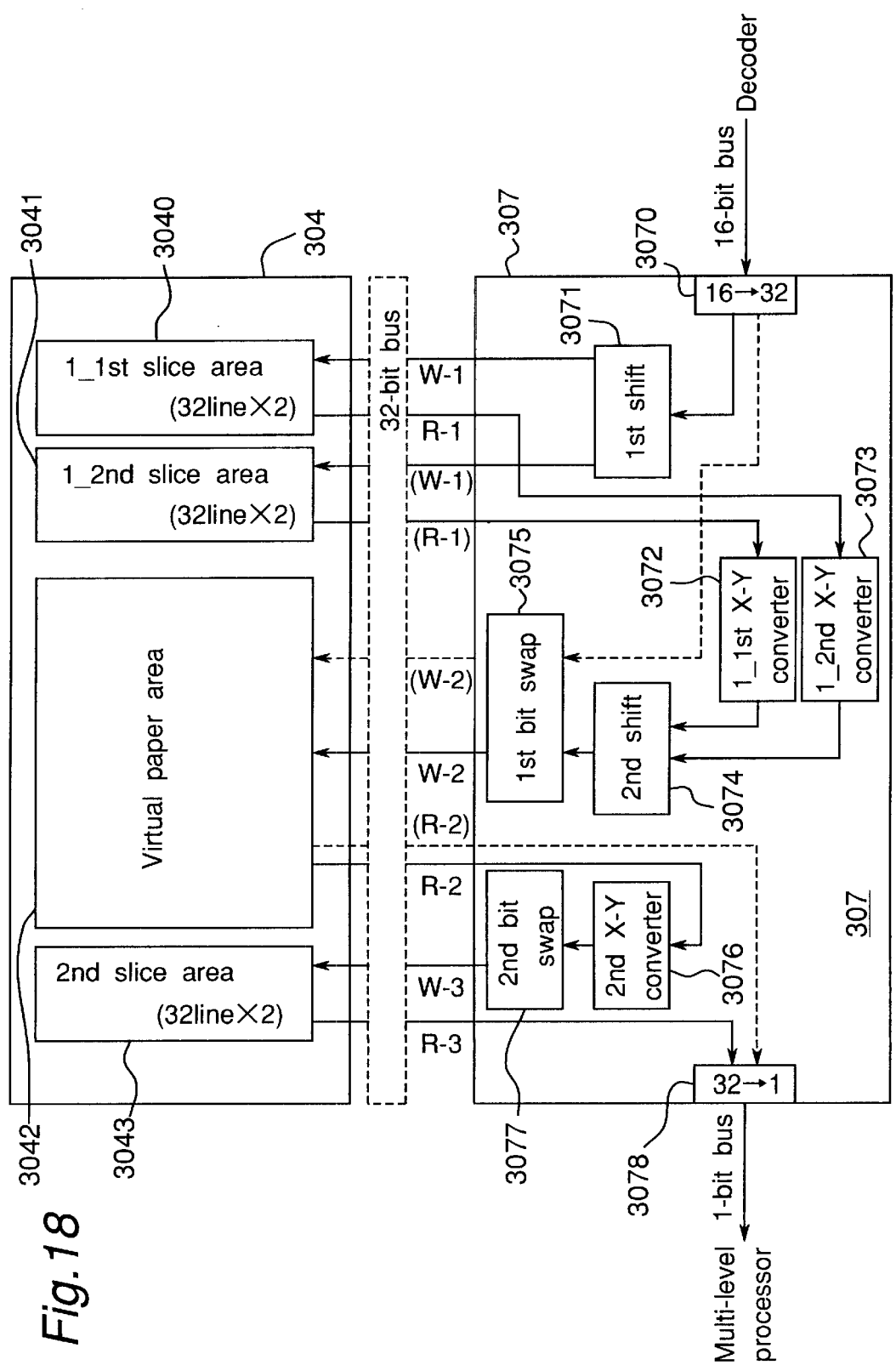
FIG. 18 is a block diagram of an editor in the memory unit.

The tilt angle rotation is performed by the edition processor 307 in the memory unit 30 based on the edition parameters detected by image reading. First, the edition processor 307 is explained. FIG. 18 is a block diagram of a part of the edition processor 307 related to the tilt angle rotation and of the image memory 304. Edition such as rotation in the edition processor 307 uses the image memory 304 and it combines shift, X-Y conversion and bit swap (refer to FIGS. 19 and 20). When the rotation is not performed (0° rotation), only the bit swap is performed as shown with dashed lines, and only signals W2 and R2 are accessed.

In the rotation, input image data transmitted from the decoder 312 are 16-bit data, and they are converted by a 16→32 converter 3070 to 32-bit data. Thus, the data processing are all performed in 32 bits in order to speed up internal operations in the edition operator 307 and accesses to the image memory 304. If data after bit conversion are needed, a first shift section 3071 performs shift on a data and writes the sifted data to a 1_1 slice area 3040 and a 1_2 slice area 3041 in the image memory 304. A 1_1 X-Y converter 3072 and a 1_2 X-Y converter 3073 perform X-Y conversion on data RI read from the 1_1 slice area 3040 and the slice area 3041, respectively. If data after X-Y conversion are needed, a second shift section 3074 performs shift on the data after the bit conversion. If necessary, a first bit swap section 3075 performs bit swap on the data from the 16→32 converter 3070 or from the second shift section 3074 and writes the bit swap data to a virtual paper area 3042 in the image memory 304 which has a capacity of A3 size at maximum. When the data are output for printing, if necessary, a second X-Y converter 3076 performs X-Y conversion on data R2 read from the virtual paper area 3042 by a second bit swap section 3077 and writes the data to a second slice area 3043 in the image memory 304. When printing is performed, R2 data read from the virtual paper area 3042 or R3 data read from the second slice area 3043 are converted to 1-bit data by a 32→1 converter 3078, and it is sent to the multi-level processor 308. On continuous operation, accesses to the image memory 304 (signals W1–W3 and R1–R3) are processed in parallel in time sharing through the 32-bit bus line.

Figure 19:
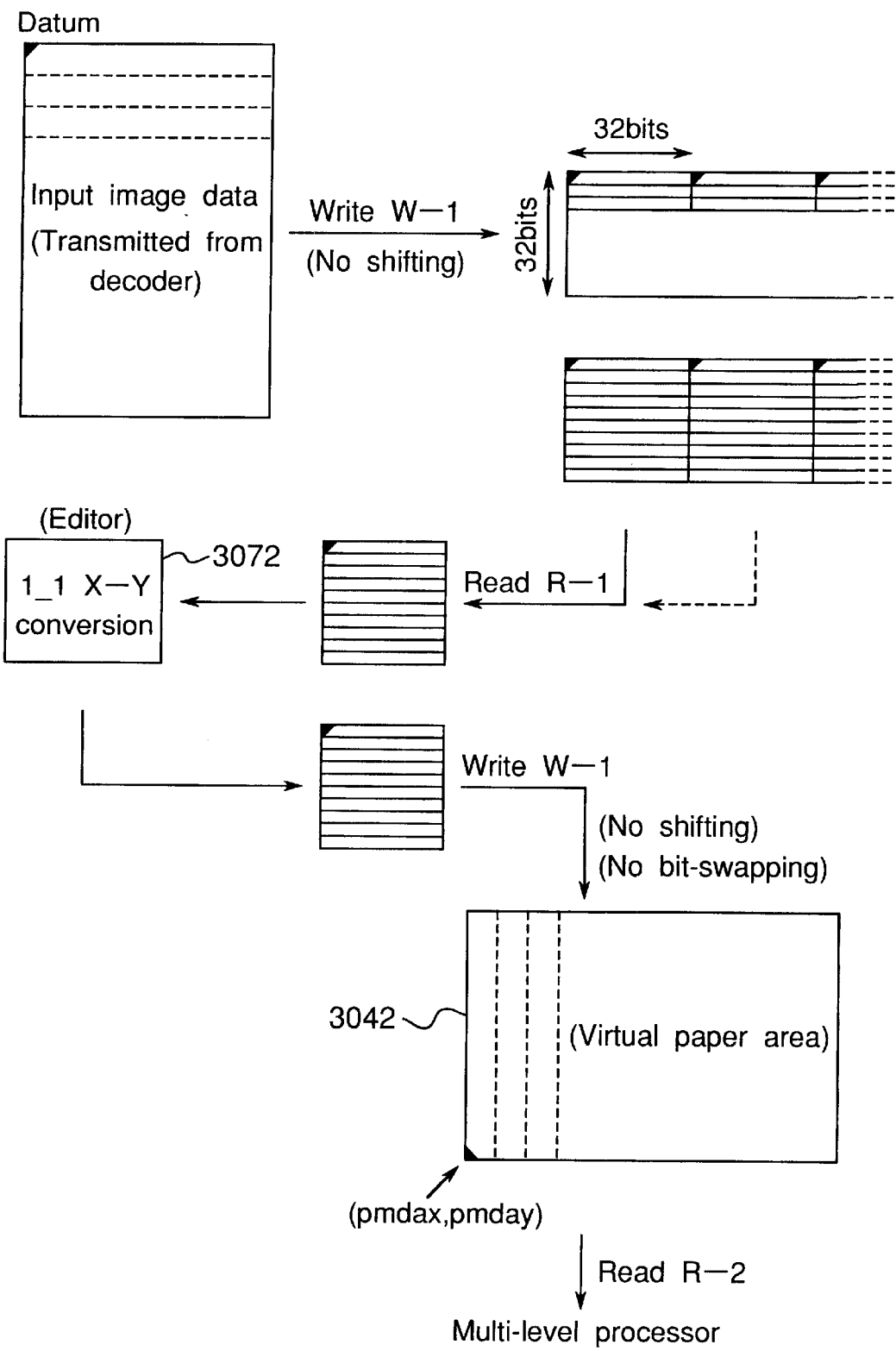
FIG. 19 is a diagram for explaining 90° rotation of image data.

Next, by referring to FIG. 19, 90° rotation of image data is explained. The input image transmitted from the decoder 312 are received with the image datum at the top-leftmost side in FIG. 14. Then, the input image is read in the unit of 32 bits*32 bits from the data of 32 bits*32 lines in the 1_1 X-Y slice area 3040 and edited by the 1_1 X-Y converter 3072. Next, for the 90° rotation, the data is read and written to the virtual paper area 3042 so as to have the image datum, or the destination address (pmdax, pmday), at the bottom-leftmost end. The 1_1 X-Y slice area 3040 and the 1_2 X-Y slice area 3041 form a pair, and the above processing is performed as double-buffers operation.

Next, bit swap of the image data by the 1_1 and 1_2 bit swap sections 3040, 3041 is explained with reference to FIGS. 20A and 20B. In the processing, as shown in FIG. 20A, the alignment of the 32-bit data is reversed. Then, as shown in FIG. 20B, the reversed data are written to the virtual paper area 3042 with the image datum (destination address) at the bottom-rightmost end. Further, 270° rotation is performed by combining the 90° rotation and the bit swap processing with the image datum at the top-rightmost end.

In the editor 307, translation of the image can be performed at the same time by changing the transmission address (or destination address) of the image datum to the virtual paper area. Further, erase, copy, paste or the like of an image at a specified area can also be performed, though not explained here.

Next, calculation for the tilt angle rotation is explained. The following equations show rotation in affine transformation. As shown in Eq. (10), coordinates (X, Y) are rotated by an angle θ to coordinates (U, V). The calculation is decomposed as shown in Eq. (11) as a combination of first shift, 90° rotation, second shift and −90° rotation. The editor 307 performs the calculation by combining these processes. In the first and second shifts, only X-axis parameter is processed while Y-axis parameter is fixed.

$$\begin{pmatrix} U \\ V \end{pmatrix} = \begin{pmatrix} \cos\theta & \sin\theta \\ -\sin\theta & \cos\theta \end{pmatrix}\begin{pmatrix} X \\ Y \end{pmatrix} = \frac{1}{\sqrt{s^2+t^2}}\begin{pmatrix} s & t \\ -t & s \end{pmatrix}\begin{pmatrix} X \\ Y \end{pmatrix} \quad (10)$$

$$= \begin{pmatrix} 0 & -1 \\ 1 & 0 \end{pmatrix}\begin{pmatrix} 1/\cos\theta & \tan\theta \\ 0 & 1 \end{pmatrix}\begin{pmatrix} 0 & 1 \\ -1 & 0 \end{pmatrix}\begin{pmatrix} \cos\theta & \sin\theta \\ 0 & 1 \end{pmatrix}\begin{pmatrix} X \\ Y \end{pmatrix} \quad (11)$$

−90°, 2nd shift, 90°, 1st shift $$= \begin{pmatrix} 0 & -1 \\ 1 & 0 \end{pmatrix}\begin{pmatrix} z/s & t/s \\ 0 & 1 \end{pmatrix}\begin{pmatrix} 0 & 1 \\ -1 & 0 \end{pmatrix}\begin{pmatrix} s/z & t/z \\ 0 & 1 \end{pmatrix}\begin{pmatrix} X \\ Y \end{pmatrix},$$

where $z=\sqrt{s^2+t^2}$.

Next, the reverse calculation for the above rotation address calculation is explained. Eqs. (12) and (13) show the reverse transformation of Eqs. (10) and (11).

$$\begin{pmatrix} X \\ Y \end{pmatrix} = \begin{pmatrix} \cos\theta & -\sin\theta \\ \sin\theta & \cos\theta \end{pmatrix}\begin{pmatrix} U \\ V \end{pmatrix} = \frac{1}{\sqrt{s^2+t^2}}\begin{pmatrix} s & -t \\ t & s \end{pmatrix}\begin{pmatrix} U \\ V \end{pmatrix} \quad (12)$$

$$= \begin{pmatrix} 1/\cos\theta & -\tan\theta \\ 0 & 1 \end{pmatrix}\begin{pmatrix} 0 & -1 \\ 1 & 0 \end{pmatrix}\begin{pmatrix} \cos\theta & -\sin\theta \\ 0 & 1 \end{pmatrix}\begin{pmatrix} 0 & 1 \\ -1 & 0 \end{pmatrix}\begin{pmatrix} U \\ V \end{pmatrix} \quad (13)$$

1st shift, 90°, 2nd shift, −90°

$$= \begin{pmatrix} z/t & -t/s \\ 0 & 1 \end{pmatrix}\begin{pmatrix} 0 & -1 \\ 1 & 0 \end{pmatrix}\begin{pmatrix} s/z & -t/z \\ 0 & 1 \end{pmatrix}\begin{pmatrix} 0 & 1 \\ -1 & 0 \end{pmatrix}\begin{pmatrix} U \\ V \end{pmatrix},$$

where $z=\sqrt{s^2+t^2}$.

In the tilt angle rotation of image data, the image data are processed according to the above-mentioned calculation for tilt angle rotation. The tilt angle rotation (shift-and-shift technique) of image data is explained with reference to FIG. 21. In the editor 307, as shown at the top-left-most side in FIG. 21, input image data are received from the decoder 312 with the datum at the top-leftmost end. The input image data are subjected to the first shift by the first shift section 3071 according to the set rotation angle θ, as shown at the top center in FIG. 21, and they are written to the 1_1 and 1_2 slice areas 3041 and 3042 in the unit of line. Next, the data are read from the 1_1 and 1_2 slice areas 3041 and 3042 in the unit of block of 32 bits*32 bits and are processed by the 1_1 and 1_2 X-Y converters 3072 and 3073. Next, data of two blocks are subjected to the second shift by the second shift section 3074 according to the rotation angle θ, and the data are written to the virtual paper area 3042. The two slice areas 3040 and 3041 forms a pair, and the above-mentioned operation is performed as double-buffers operation. Thus, the image is brought to a state rotated by (90°+θ). When the data are output for printing from the virtual paper area 3042, −90° rotation (270° rotation) is processed by the second X-Y converter 3076 and the second bit swap section 3077. After they are buffered to the second slice area 3043 (bit conversion), they are sent to the multi-level processor 308. The rotation angle θ is desirable to be as small as possible in the above-mentioned shift-shift rotation, by considering the image quality after the rotation. Then, −45°<θ<45°. The rotation angle outside the range is processed by combining rotation in the unit of 90°.

Next, the relationship is explained for simultaneously processing the tilt angle rotation and magnification of image data. Eq. (14) shows rotation and magnification in the affine transformation, and the coordinates (X, Y) are rotated by an angle θ with a magnifying power of α to coordinates (U, V). It is decomposed as shown in Eq. (15) to first shift, 90° rotation, second shift and −90° rotation. In the first and second shifts, only X-axis parameters are processed while Y-axis parameter is fixed.

$$\binom{U}{V} = \alpha \begin{pmatrix} \cos\theta & \sin\theta \\ -\sin\theta & \cos\theta \end{pmatrix}\binom{X}{Y} = \frac{1}{\sqrt{s^2+t^2}}\begin{pmatrix} s & t \\ -t & s \end{pmatrix}\binom{X}{Y} \quad (14)$$

$$= \begin{pmatrix} 0 & -1 \\ 1 & 0 \end{pmatrix}\begin{pmatrix} \alpha/\cos\theta & \tan\theta \\ 0 & 1 \end{pmatrix}\begin{pmatrix} 0 & 1 \\ -1 & 0 \end{pmatrix}\begin{pmatrix} \alpha\cos\theta & \sin\theta \\ 0 & 1 \end{pmatrix}\binom{X}{Y} \quad (15)$$

$-90°$, second shift, $90°$, first shift $$= \begin{pmatrix} 0 & -1 \\ 1 & 0 \end{pmatrix}\begin{pmatrix} \alpha z/s & t/s \\ 0 & 1 \end{pmatrix}\begin{pmatrix} 0 & 1 \\ -1 & 0 \end{pmatrix}\begin{pmatrix} \alpha s/z & t/z \\ 0 & 1 \end{pmatrix}\binom{X}{Y},$$

where $z=\sqrt{s^2+t^2}$.

Next, the reverse calculation for the above rotation address calculation is explained. Eqs. (16) and (17) show the reverse transformation of Eqs. (14) and (15).

$$\binom{X}{Y} = \frac{1}{\alpha}\begin{pmatrix} \cos\theta & -\sin\theta \\ \sin\theta & \cos\theta \end{pmatrix}\binom{X}{Y} = \frac{1}{\alpha\sqrt{s^2+t^2}}\begin{pmatrix} s & -t \\ t & s \end{pmatrix}\binom{U}{V} \quad (16)$$

$$= \begin{pmatrix} 1/\alpha \cos\theta & -\tan\theta \\ 0 & 1 \end{pmatrix}\begin{pmatrix} 0 & -1 \\ 1 & 0 \end{pmatrix}\begin{pmatrix} \cos\theta/\alpha & -\sin\theta/\alpha \\ 0 & 1 \end{pmatrix}\begin{pmatrix} 0 & 1 \\ -1 & 0 \end{pmatrix}\binom{U}{V} \quad (17)$$

first shift, $90°$, second shift, $-90°$ $$= \begin{pmatrix} z/\alpha t & -t/s \\ 0 & 1 \end{pmatrix}\begin{pmatrix} 0 & -1 \\ 1 & 0 \end{pmatrix}\begin{pmatrix} s/\alpha z & -t/\alpha z \\ 0 & 1 \end{pmatrix}\begin{pmatrix} 0 & 1 \\ -1 & 0 \end{pmatrix}\binom{U}{V},$$

where $z=\sqrt{s^2+t^2}$.

Figure 22:
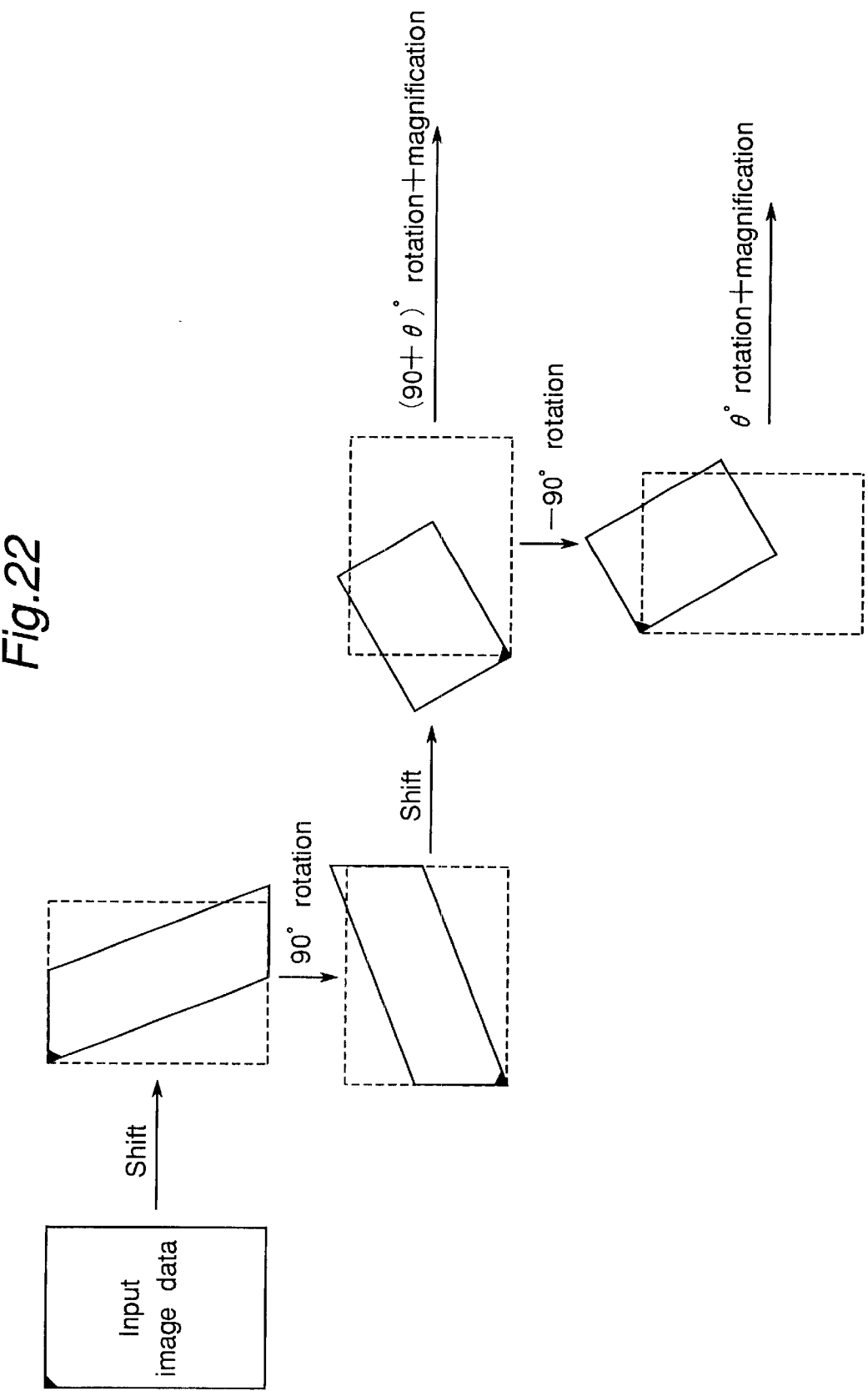
FIG. 22 is a diagram for explaining tilt angle rotation (shift-and-shift processing) and magnification of image data performed at the same time.

FIG. 22 shows the above-mentioned tilt angle rotation of image data. The operation consists of first shift, 90° rotation, second shift and −90° rotation. The magnification is performed by the editor 307 shown in FIG. 18 in the first and second shift sections by setting appropriate parameters for the magnification. For some parameters, it becomes necessary to increase the number in slice area. In this case, only the magnification is processed, and the rotation angle is set to 0° when the rotation is not performed.

E. Tilt Angle Rotation when a Document Extending Beyond the Image Reading Area is Read As explained above, 2-dimensional image data are read on a document put on the image reading area in the platen glass, and a document area wherein the document exists is detected. If the document area is found to be inclined, the 2-dimensional image data are rotated by the tilt angle to correct the inclination of the document. However, if the document extends beyond the reading area, the image to be corrected cannot be determined without considering the extension. Then, if the document extends beyond the reading area, a portion of the document existing in the image reading area on the platen glass is detected. Then, coordinates which represent the detected document area are extracted, the tilt angle θ and the shift or offset of the document from a reference position are detected therefrom. Then, various parameters for the rotation are set according to the results. Thus, even if a document is put at a tilt in the image reading area and extends beyond it, the document area, or an area wherein the document exists, is detected from the image data, and sides of the document are extracted from the coordinates of the detected document area. Then, the four corners of the document are estimated, (refer to FIGS. 13–17), and various parameters such as paper size, tilt angle and shift are calculated therefrom. In the tilt correction, when image data are written to the virtual paper, the image data are rotated by the tilt angle θ to correct the inclination, and the image data are moved so that the position of a corner of two extracted adjacent sides agrees with the origin of the virtual paper. Thus, even if a document is put erroneously beyond the image reading area, various parameters can be calculated from the image data, and the tilt of the document can be corrected automatically to output the corrected image thereof.

For example, the lengths of sides of a document (such as sides "a"–"d" in the example shown in FIG. 13) are detected from the coordinates of the document area determined from the image data of the document. Then, the lengths of the sides outside the image reading area are set by using the tilt angle θ and the sides "a"–"d" existing within the image reading area (refer to FIG. 39). The document is rectangular. The tilt angle and the sides are determined from the image data, and the four corners of a document including a portion existing outside the image reading area are determined. Then, paper size for printing is determined based on the above analysis, and the tilt angle rotation is operated according to the tilt angle, paper size and the shift obtained above.

The tilt angle θ is extracted, for example, by assuming that the straight lines obtained from the coordinates of the document area are regarded as the sides of the document area (refer to FIGS. 27–31). That is, the straight lines defining the boundary of a document area wherein the document exists are regarded as the sides of the document, and the tilt angle is determined based on the detected lines.

Figure 27:
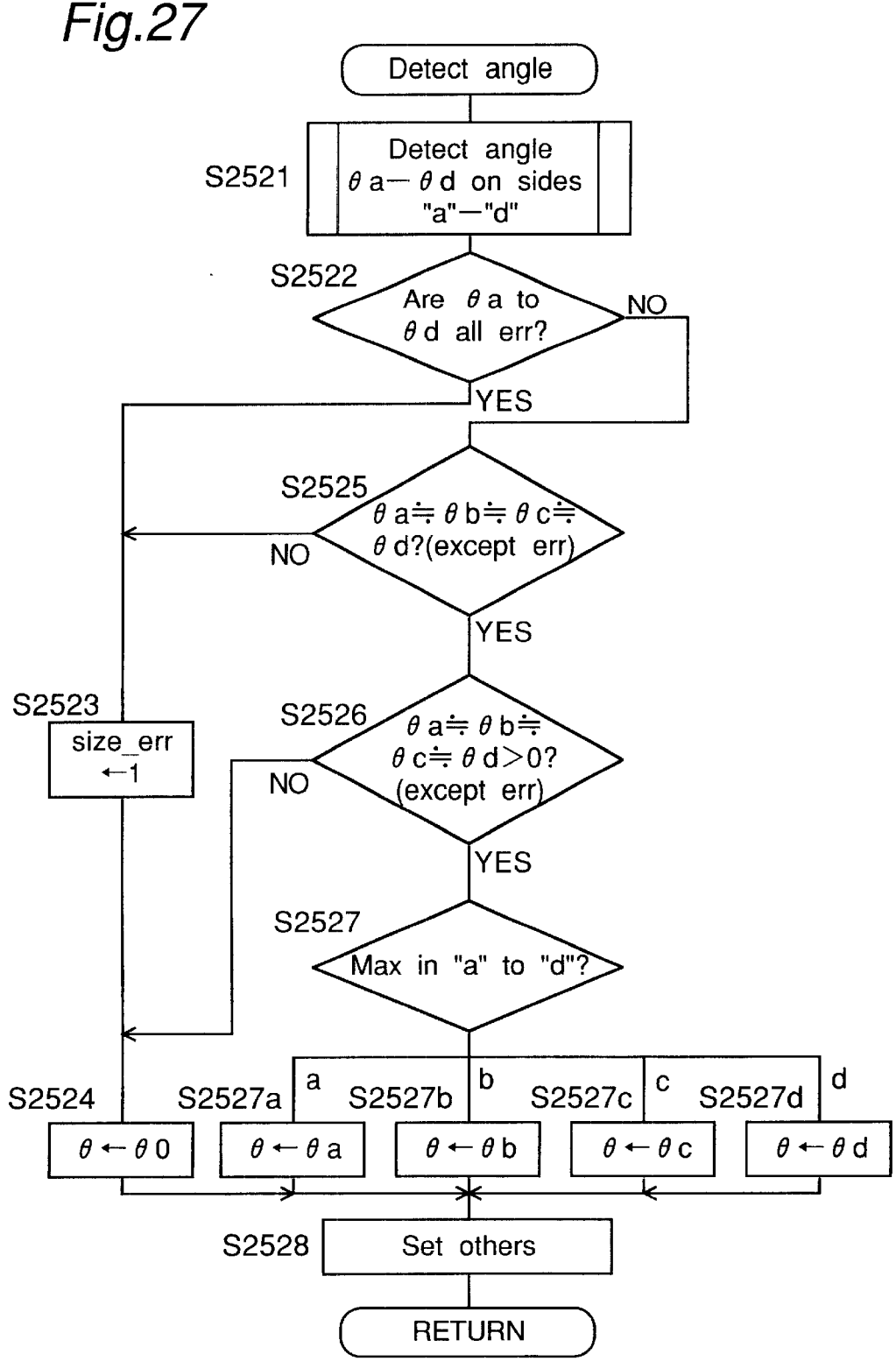
FIG. 27 shows a flowchart of angle detection.

The tilt angle θ is calculated based on the longest side in the extracted sides of the document (refer to steps S2527–S2527d in FIG. 27). Then, the most reliable tilt angle can be determined.

Figure 25:
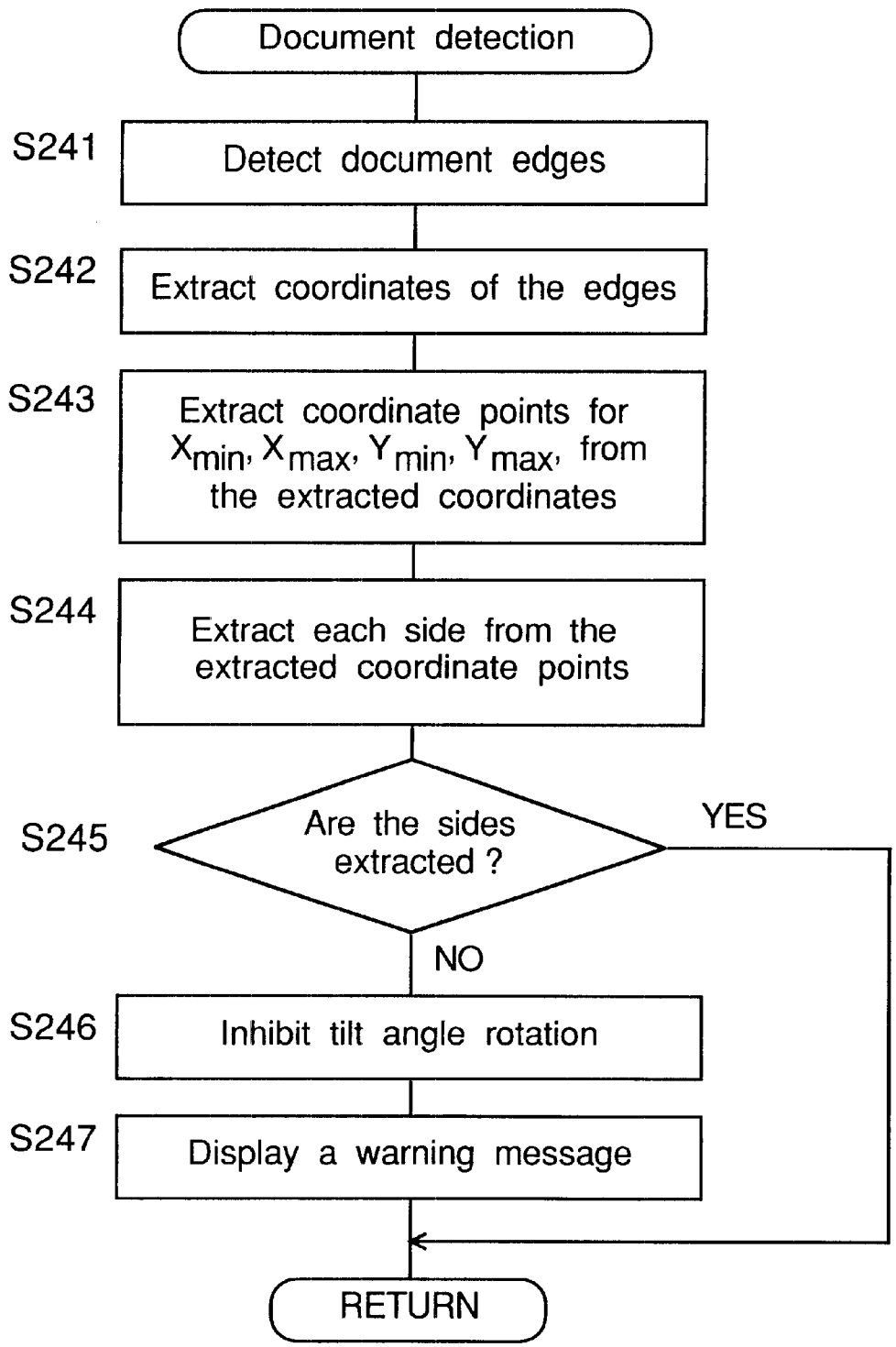
FIG. 25 is a flowchart of document detection.

If no side of the document area is detected, the tilt angle rotation is inhibited (refer to FIG. 25). Thus, unreliable rotation correction on the document image is inhibited.

The tilt angle rotation is also inhibited if one of the tilt angles calculated for the extracted sides is different largely from the others (steps S2525–S2523 in FIG. 27). That is, if the document has an irregular shape, the rotation of the image data is inhibited.

Paper size for image forming is set according to a rectangular area including the detected document area and including the estimated sides. That is, a rectangular area including the sides existing in the document area is determined, and the document size is estimated from the rectangular area.

If the calculated paper size is larger than the maximum paper size, the tilt angle rotation is inhibited. That is, the rotation is inhibited when no normal image is formed.

Further, a means for rotating the image by 90° is provided. When the calculated paper size is larger than a maximum paper size but smaller than the maximum paper size which can be prepared by the printer, the direction of the paper for printing is changed by rotating the image data by 90°, and the tilt angle rotation is performed while using the 90° rotation.

When adjacent two sides of the document are detected in the extracted sides, a parallel translation (shift) of the image is calculated by considering the adjacent two sides and the calculated paper size for shifting the image data to the normal position for correcting the tilt of the image. That is, because at least one corner can be determined if adjacent two sides of the document exist, the parallel translation can be calculated based on the determined corner.

F. Control of Copying Machine

Figure 23:
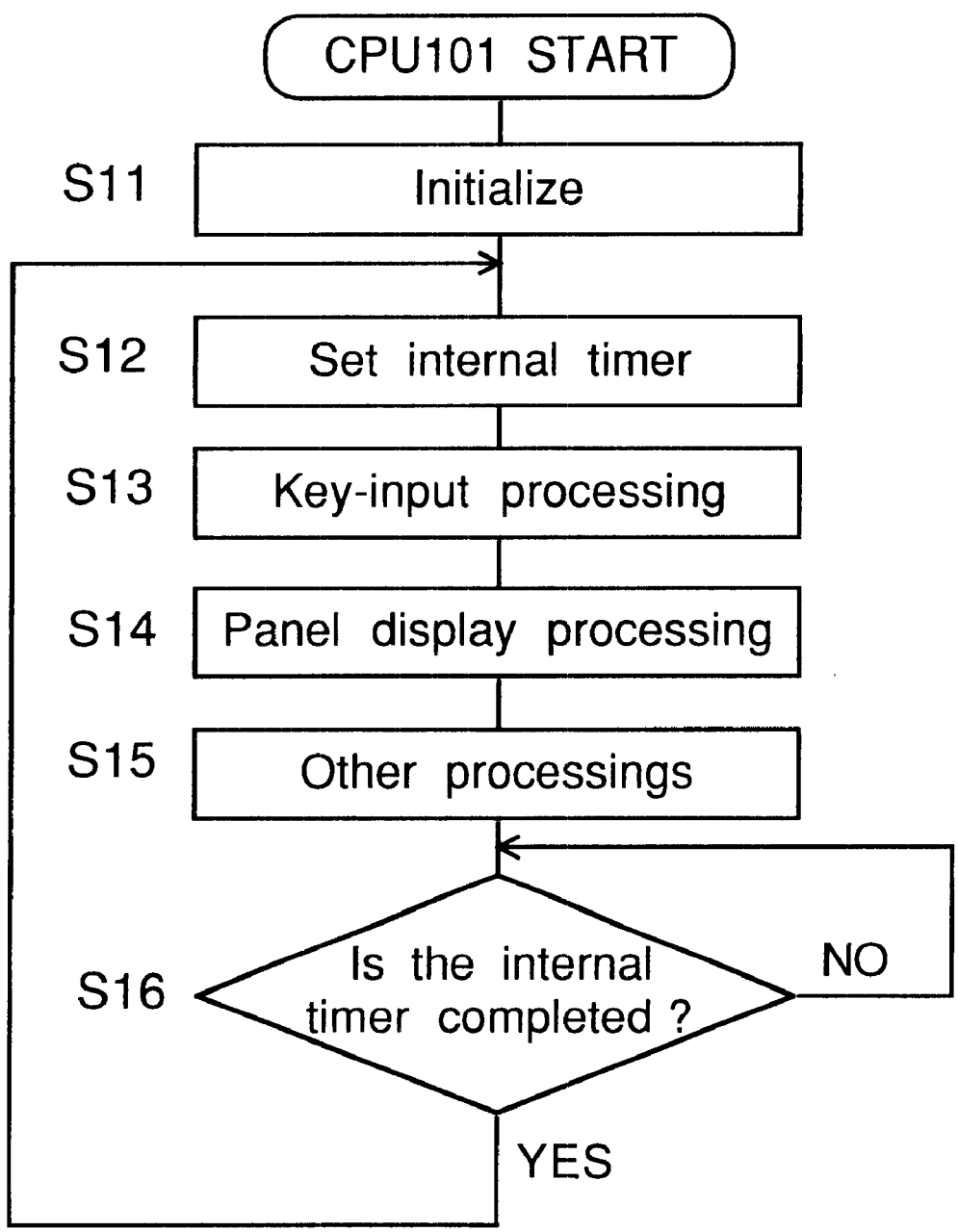
FIG. 23 is a main flowchart of a first CPU.

Control flows of the copying machine will be explained below. FIG. 23 is a main flowchart of the first CPU 101 which controls the operational panel. When the electrical power source is turned on, first initialization is performed for initializing the RAM, registers or the like (step S11). Next, an internal timer which defines a time of one routine is set (step S12). Then, key-inputs are processed to receive key operation (step S13), and a display is performed in the panel according to the key-input operation (step S14). After other processings are performed (step S15), it is waited that the internal timer is completed (YES at step S16). Then, the flow returns to step S12 to repeat the above processes.

Figure 24:
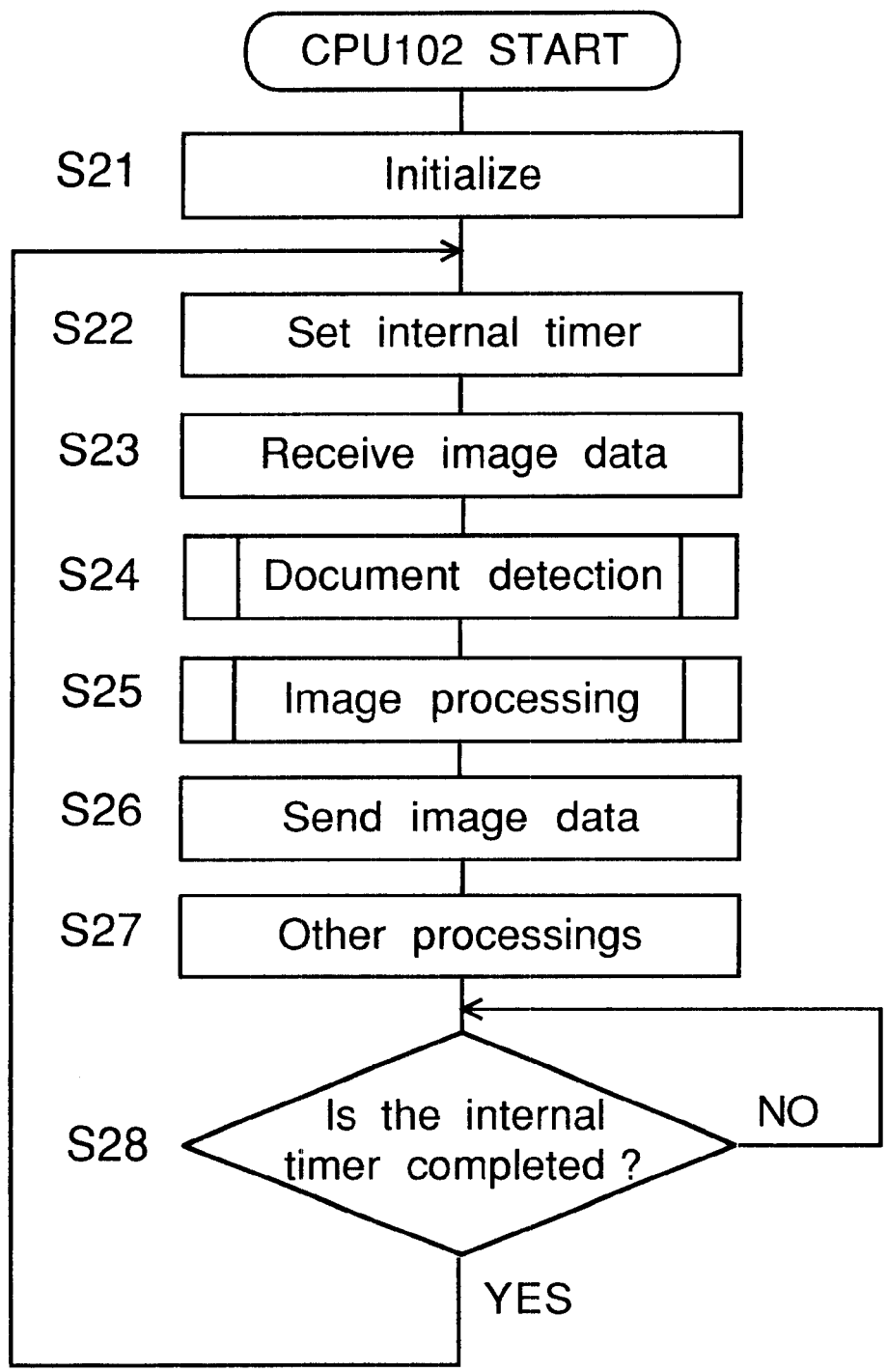
FIG. 24 is a main flowchart of a second CPU.

FIG. 24 is a main flowchart of the second CPU 102 which controls the image signal processor 20. After the RAM, the registers and the like are initialized (step S21), an internal timer which defines a time of one routine is set (step S22). Then, image data are received (step S23), document detection is performed (step S24), image processing is performed (step S25), and the image data are output (step S26). After other processings are performed (step S27), it is waited that the internal timer is completed (YES at step S28). Then, the flow returns to step S22 to repeat the above processes.

FIG. 25 is a flowchart of the document detection (steps S24 in FIG. 24) wherein straight lines consisting of extracted coordinates in the document area are regarded as the sides of the document area. First, edges of the document are detected from the image data (step S241), and the coordinates of each edge are extracted (step S242). Then, coordinate points representing $X_{min}, X_{max}, Y_{min}, Y_{max}$ are extracted from the extracted coordinates (step S243), and the sides of the document are extracted from the extracted coordinate points (step S244). If it is decided that no side is extracted (NO at step S245), the tilt angle rotation is inhibited (step S246), and a warning message is displayed (step S247).

Figure 26:
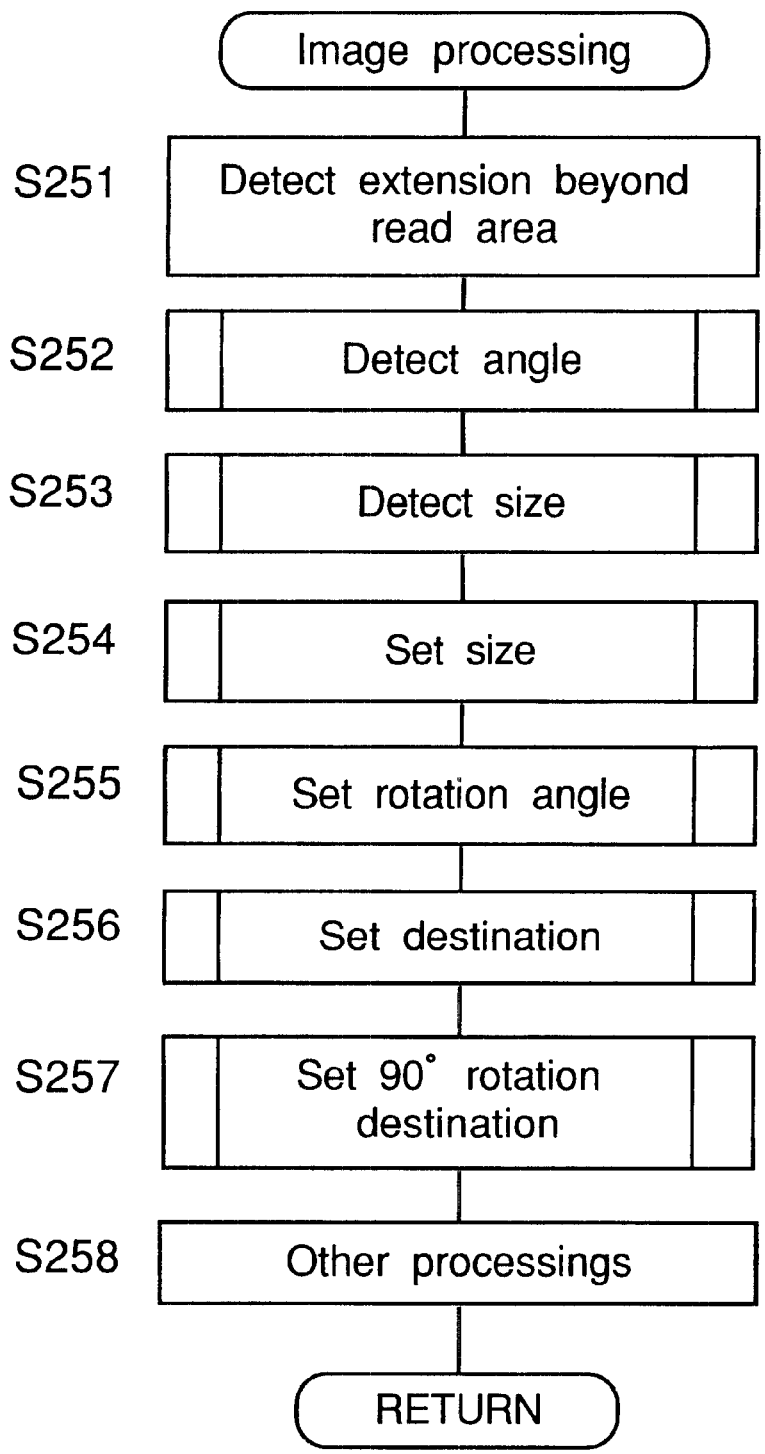
FIG. 26 is a flowchart of image processing.

FIG. 26 is a flowchart of the image processing (step S25 in FIG. 24). First, sides and coordinates of the document are extracted from the image data thereof, and extension of the document beyond the read area is detected (step S251). Further, following processings are performed successively: Angle detection (step S252), size detection (step S253), size setting (step S254), rotation coordinate setting (step S255), destination setting (step S256), 90° rotation destination setting (step S257), and others (step S258).

In the above flow, even when a document is detected to be extended beyond the read area wherein the document exists, or document area, is detected from the image data, and each side thereof is extracted from the coordinates of the detected document area. Then, the four corners of the document are estimated by assuming a rectangle. Next, various parameters used for the tilt angle detection are set. The following parameter are included. The tilt angle θ (step S252) represents the tilt of the effective document area. Effective document area sizes, "spx" and "spy", (step S253) represent the size of the detected document or the sizes in the X and Y directions when the document is not tilted, while sizes, "cpx" and "cpy", are size parameters in the X and Y directions for setting the virtual paper area for drawing the image data. Paper size (step S254) is usually a minimum standard paper size including the effective document area. Rotation coordinates, rot_x and rot_y, (step S255) represent coordinates of rotation center in the X and Y directions relative to the origin of the read area. Then, the rotation coordinates, rot_x and rot_y, represent the corner of the effective document area (denoted with dashed line) nearest to the origin, or an erroneous translation of the document. Destination (or translation), pmdax and pmday, (step S256) represents coordinates of the rotation coordinates relative to the origin of the virtual paper area. When the image data are drawn in the virtual paper area, the coordinates are shifted by the destination to draw the image data from the origin of the virtual paper area. Further, 90° rotation parameter (step S257) is used to rotate the image by 90°. The above parameters are set in the edition control for the image memory.

FIG. 27 shows a flowchart of the angle detection (step S252 in FIG. 26). First, angles, $\theta_a, \theta_b, \theta_c$ and $\theta_d$, are detected for the sides "a", "b", "c" and "d" of the document area relative to the sides of the read area (step S2521, refer to FIGS. 28–31). After the angles are detected, the angle used for the actual rotation is selected. If all the angles are decided to be erroneous (YES at step S2522), or if it is decided not to be $\theta_a \cong \theta_b \cong \theta_c \cong \theta_d$ (except erroneous angles) (NO at step S2525), that is, if an angle detected from the sides is remarkably different from the others, or if the document is not rectangular, size_err is set to 1 in order to inhibit the tilt angle rotation (step S2523), and θ is set to $\theta_0$ (step S2524). On the other hand, if it is decided to be $\theta_a \cong \theta_b \cong \theta_c \cong \theta_d$ (except erroneous angles) (YES at step S2525), but if it is not decided that $\theta_a \cong \theta_b \cong \theta_c \cong \theta_d > 0$ (except erroneous angles) (NO at step S2526), θ is set to $\theta_0$ (step S2524). If the above conditions are not satisfied (NO at step S2526), the lengths of the sides "a", "b", "c" and "d" are compared (step S2527), and the angle $\theta_a, \theta_b, \theta_c$ or $\theta_d$ calculated from the longest side among them is adopted as the angle θ (step S2527a, S2527b, S2527c or S2527d). Then, other processings are performed (step S2528).

Figure 28:
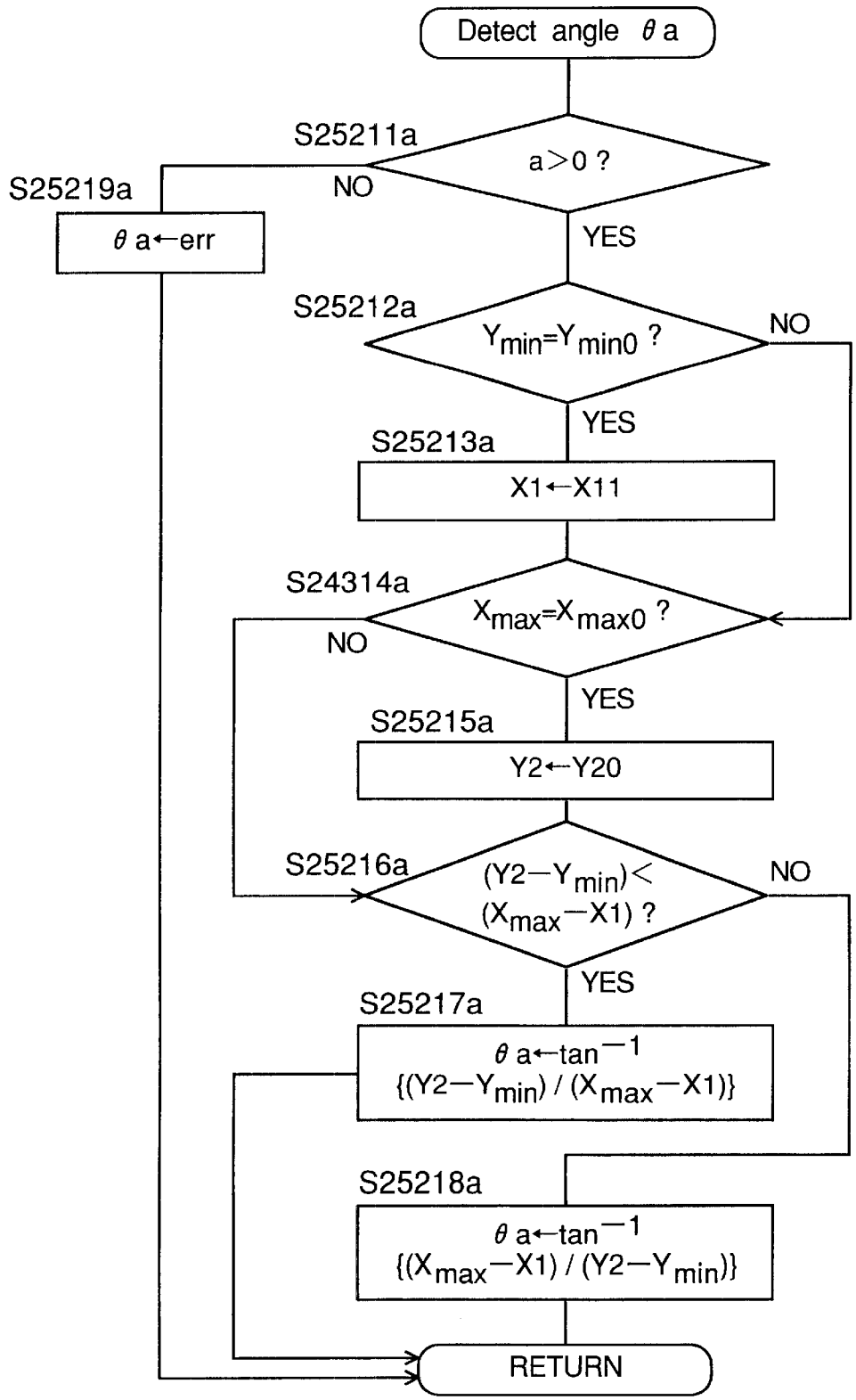
FIG. 28 shows a flowchart of $\theta_a$ detection based on side "a"
Figure 29:
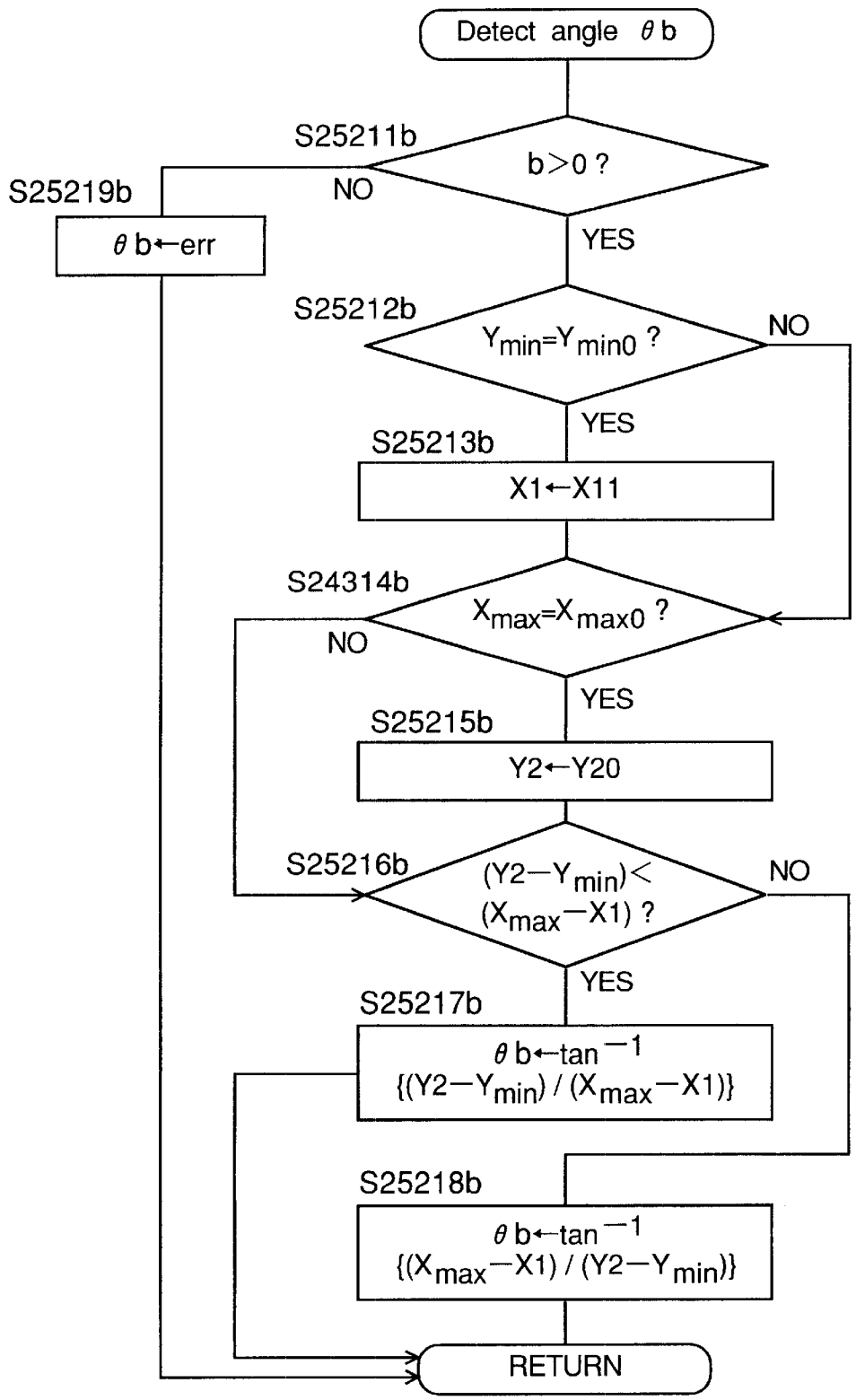
FIG. 29 shows a flowchart of $\theta_b$ detection based on side "b"
Figure 30:
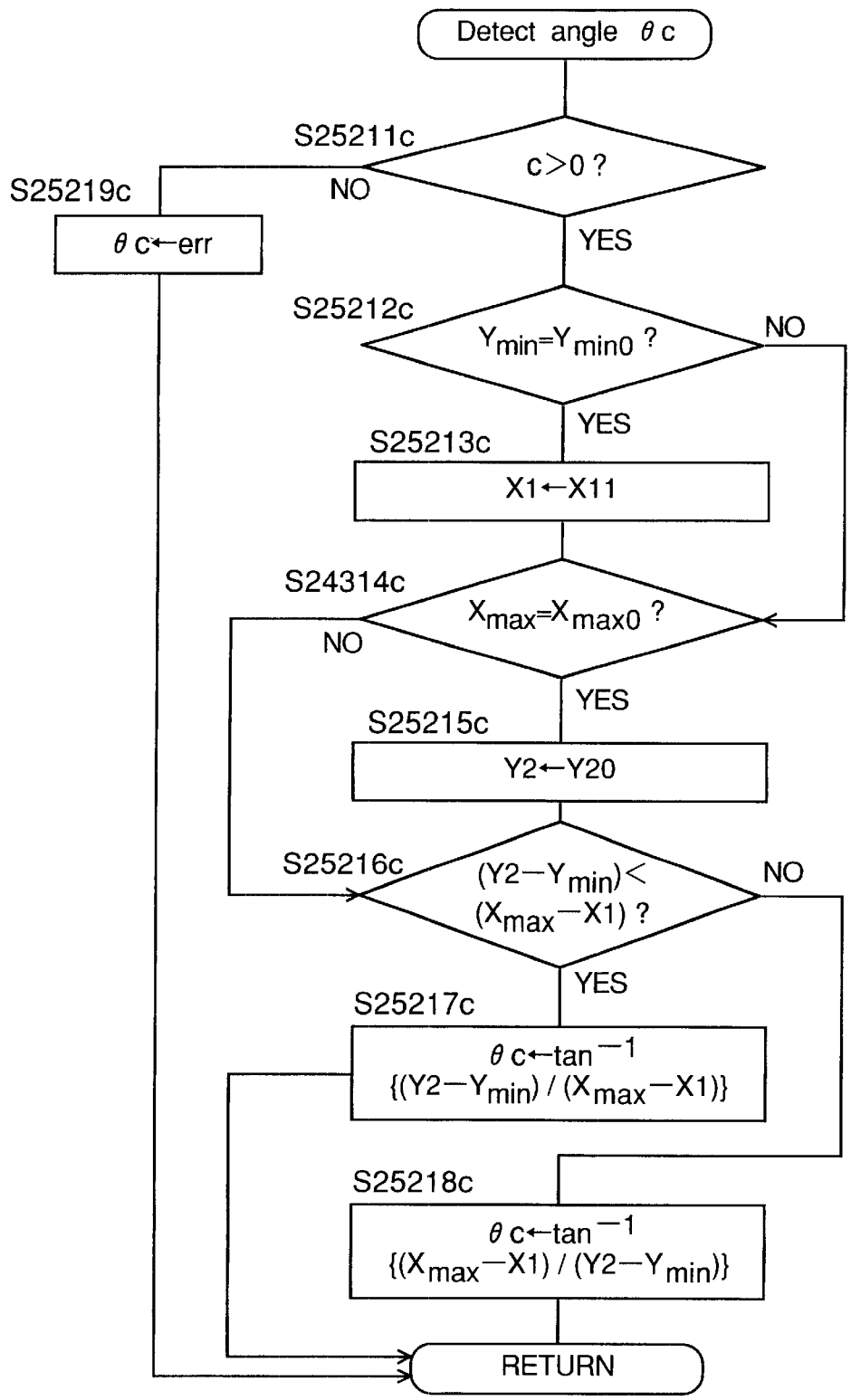
FIG. 30 shows a flowchart of $\theta_c$ detection based on side "c"
Figure 31:
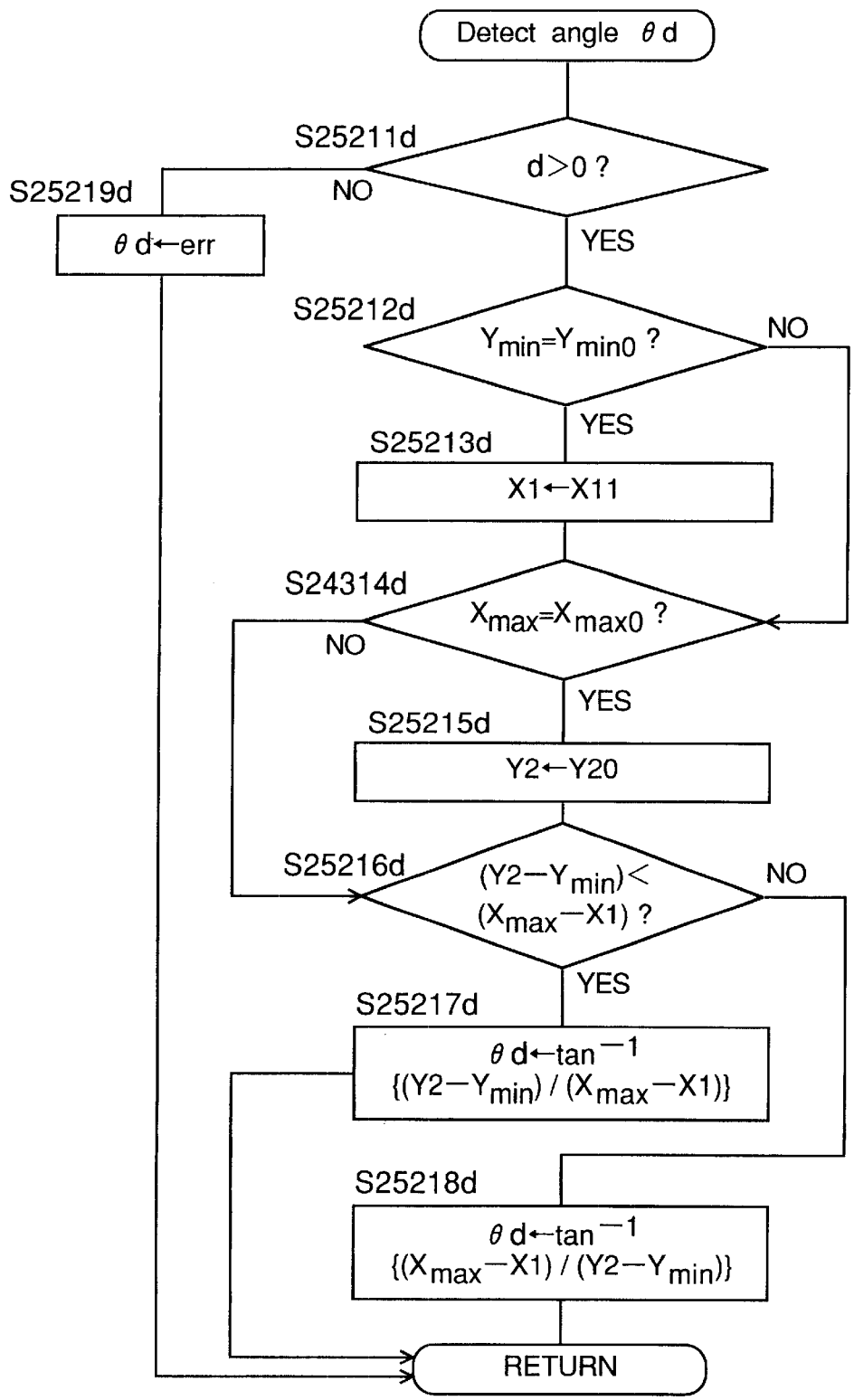
FIG. 31 shows a flowchart of $\theta_d$ detection based on side "d"

FIG. 28 shows a flowchart of the $\theta_a$ detection based on side "a" (step S2527a in FIG. 27). If it is decided not to be $\theta_a > 0$ (NO at step S25211a), the angle $\theta_a$ is set to err (step S25219a), and the flow returns. If it is decided to be $\theta_a > 0$ (YES at step S25211a), it is decided next whether the document extends beyond the read area. If $Y_{min} = Y_{min0}$, that is, if the side "e" exists (step S25212a), $X_{11}$ is set to $X_1$ (step S25213a). If $Y_{max} = Y_{max0}$, that is, if the side "g" exists (step S25214a), $Y_{20}$ is set to $Y_2$ (step S25215a). Then, $(Y_2 - Y_{min})$ is compared with $(X_{max} - X_1)$ (step S25216a), and the rotation direction is set to make the rotation angle θ smaller. That is, if it is decided that $(Y_2 - Y_{min}) < (X_{max} - X_1)$, $\tan^{-1}\{(X_{max} - X_1)/(Y_2 - Y_{min})\}$ is set to the angle θ (step S25217a), while if it is not decided that $(Y_2 - Y_{min}) < (X_{max} - X_1)$, $\tan^{-1}\{(Y_2 - Y_{min})/(X_{max} - X_1)\}$ is set to the angle θ (step S25218a). The angles, $\theta_b, \theta_c$ and $\theta_d$, are detected similarly to $\theta_a$, as shown in FIGS. 29–31, but the explanation is omitted here for the brevity of the explanation.

Figure 32:
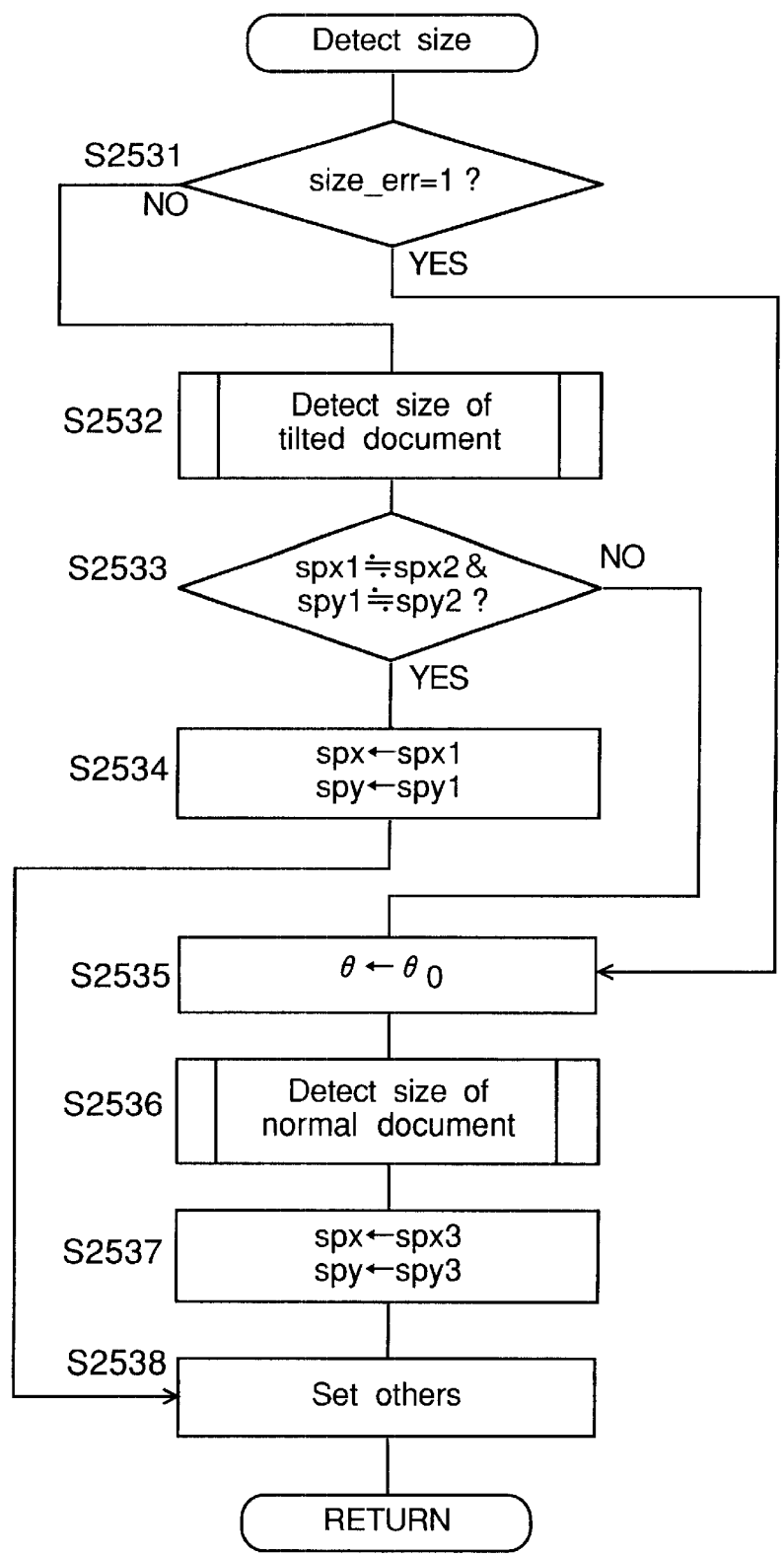
FIG. 32 shows a flowchart of size detection.

FIG. 32 shows a flowchart of the size detection (step S253 in FIG. 26). The size of the document paper is detected based on the lengths of the sides existing outside the read area and as well as those existing within the read area. The parameters, spx and spy, represent sizes of the document paper to be set in the x and Y directions. If it is decided that size_err=1 (YES at step S1531), the side of the document cannot be detected normally. Then, the angle θ is set to $\theta_0$ (step S2535), and detection of normal document size is performed (step S2536, refer to FIG. 34). Then, spx is set to spx3 and spy is set to spy3 (step S2537), and other parameters are set (step S2538). If it is not decided that size_err=1 (NO at step S2531), detection of tilted document size is performed (step S2532, refer to FIG. 33). Then, the length of spx1 is compared with that of spx2, and the length of spy1 is compared with that of spy2 (step S2533). If they are different from each other (NO at step S2533), the flow proceeds to step S2535 for performing the detection of normal document. Otherwise spx1 is set to spx, and spy1 is set to spy (step S2534), and other parameters are set (step S2538).

Figure 33:
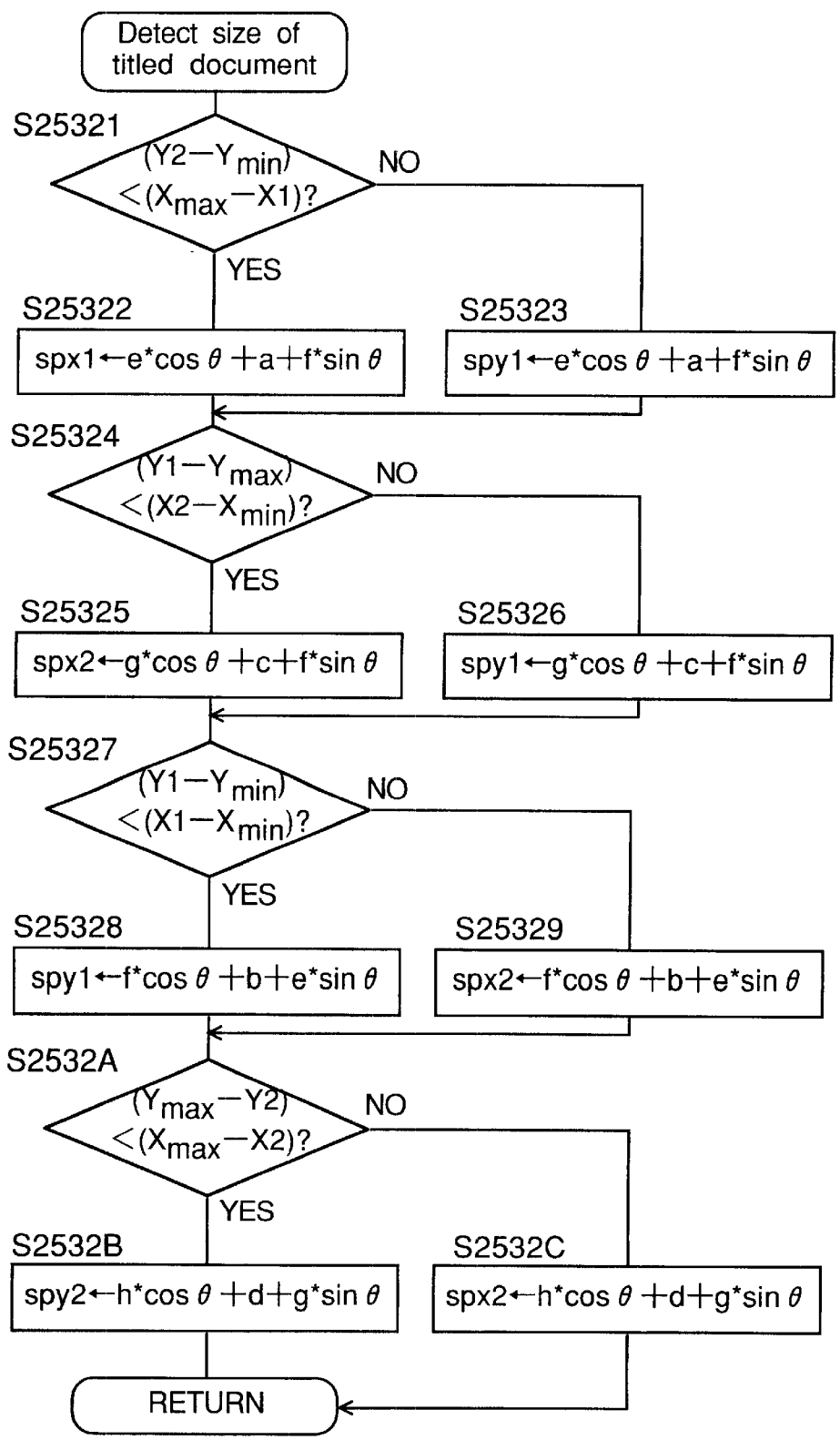
FIG. 33 is a flowchart of detection of tilted document size.

FIG. 33 is a flowchart of the detection of tilted document size (step S2532 in FIG. 32). In this flow, the lengths of sides extending beyond the read area are set based on the tilt angle $\theta$ and the lengths of the sides "a", "b", "c" and "d" of the documents existing within the read area. First, $(Y_2-Y_{min})$ is compared with $(X_{max}-X_1)$ in order to decide the rotation direction (step S25321). If it is decided that $(Y_2-Y_{min})<(X_{max}-X_1)$ (YES at step S25321), $e*\cos\theta+a+f*\sin\theta$ is assigned to spx1 (step S25322), else it is assigned to spy1 (step S25323). Similarly, $(Y_1-Y_{max})$ is compared with $(X_2-X_{min})$ in order to decide the rotation direction (step S25324). If it is decided that $(Y_1-Y_{max})<(X_2-X_{min})$ (YES at step S25324), $g*\cos\theta+c+f*\sin\theta$ is assigned to spx2 (step S25325), else it is assigned to spy2 (step S25326). Further, $(Y_1-Y_{min})$ is compared with $(X_1-X_{min}$ in order to decide the rotation direction (step S25327). If it is decided that $(Y_1-Y_{min})<(X_1-X_{min})$ (YES at step S25327), $f*\cos\theta+b+e*\sin\theta$ is assigned to spy1 (step S25328), else it is assigned to spx2 (step S25329). Still further, $(Y_{max}-Y_2)$ is compared with $(X_{max}-X_2)$ in order to decide the rotation direction (step S2532A). If it is decided that $(Y_{max}-Y_2)<(X_{max}-X_2)$ (YES at step S2532A), $h*\cos\theta+d+g*\sin\theta$ is assigned to spy2 (step S2532B), else it is assigned to spx2 (step S2532C).

Figure 34:
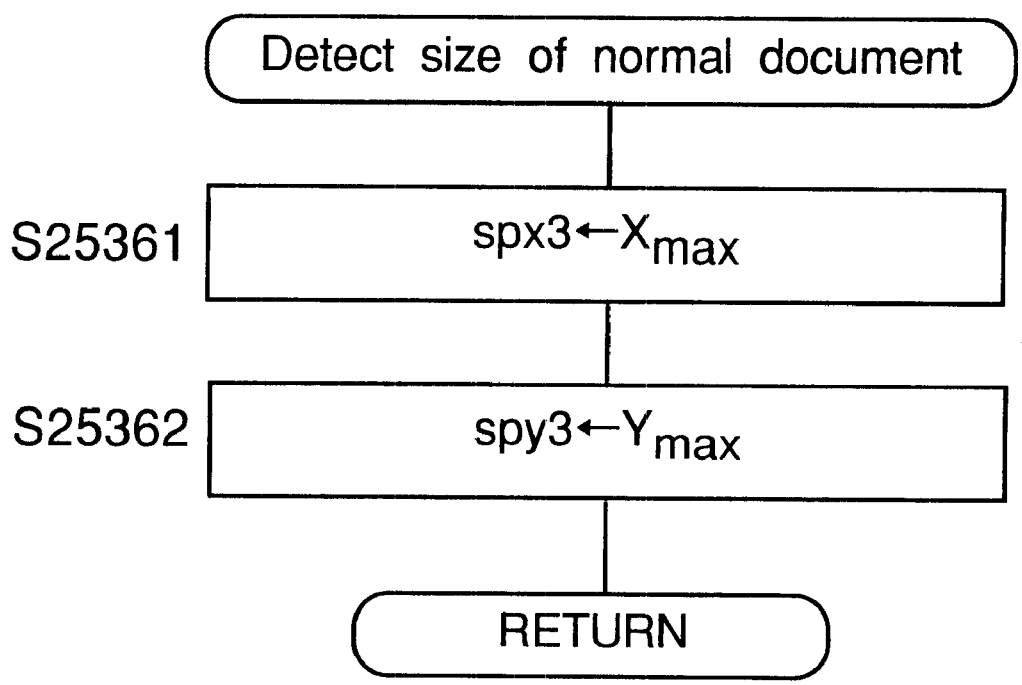
FIG. 34 is a flowchart of detection of normal document size.
Figure 35:
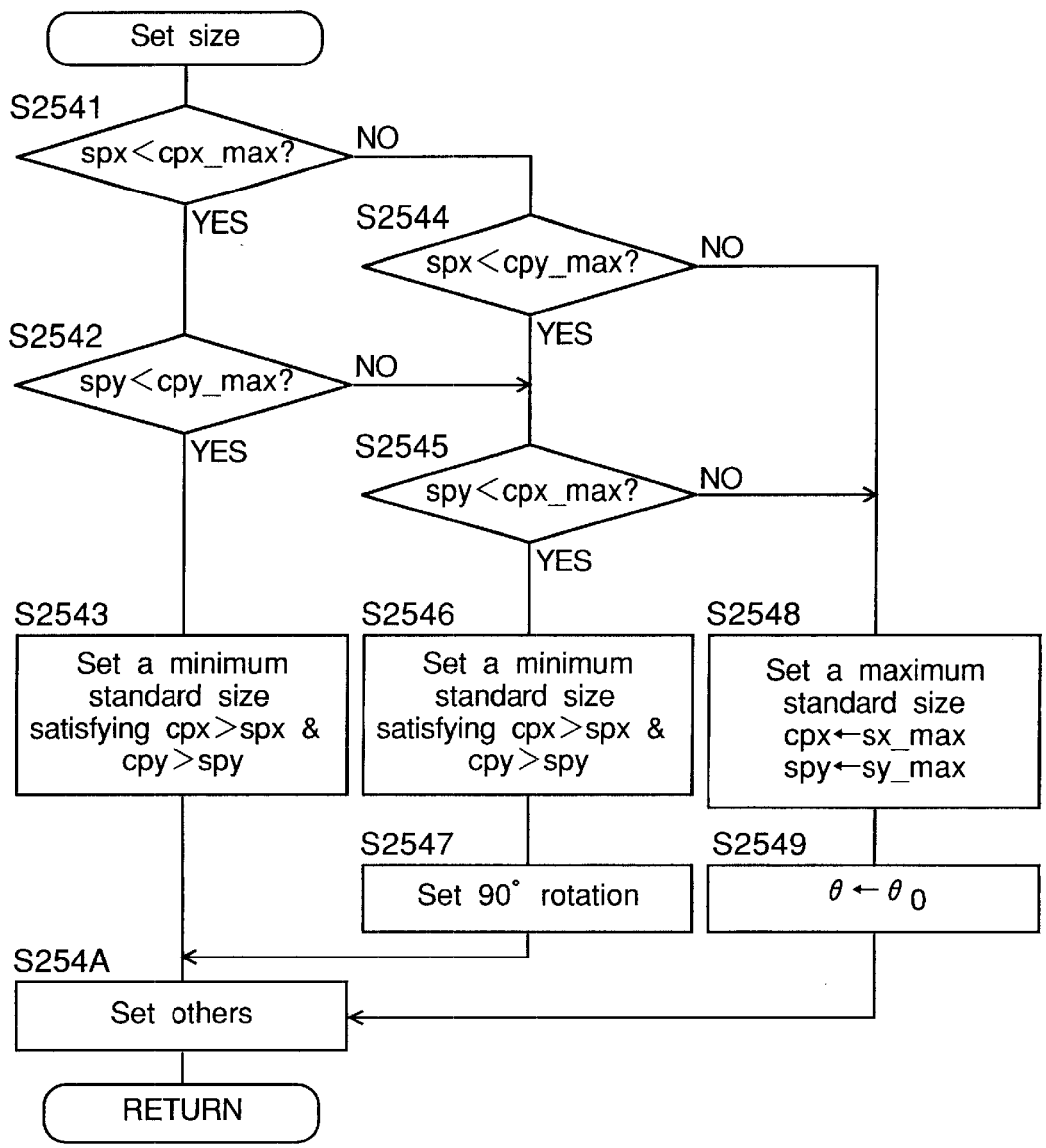
FIG. 35 shows a flowchart of size setting.

FIG. 34 is a flowchart of the detection of normal document size (step S2536 in FIG. 32). First, $X_{max}$ is assigned to spx3 (step S25361), and $Y_{max}$ is assigned to spy3 (step S25362)., FIG. 35 shows a flowchart of the size setting (step S254 in FIG. 26). The parameters spx and spy represent the sizes of the detected document, cpx and cpy represent the size set: for the virtual paper size 3042, and cpx__max and cpy__max represent the maximum sizes to be set. First, if cpx<spx and cpy<spy (YES at steps S2541 and s2542), the minimum standard size satisfying cpx>spx and cpy>spy is set (step S2543). If the detected document size is larger than the maximum standard size but smaller than the maximum size to be set when the direction of the effective document area is changed between the vertical and horizontal directions, that is, if spx<cpx__max, spy≧cpy__max and spy<cpx__max (YES at step S2541, NO at step S2542, YES at step S2545), or if spx≧cpx__max, spx≧cpy__max and spy<cpx__max (NO at step S2541, YES at step S2544, YES at step S2545), the minimum standard size satisfying cpx<spy and cpy<spx is set (step S2546), and 90° rotation is set (step S2547). In other cases, that is, if the effective document area size spx, spy is larger than the maximum size cpx__max, cpy__max allowed to be set (NO at step S2541, NO at step S2544), the maximum standard size is set. That is, sx__max is assigned to cpx and sy__max is assigned to cpy (step S2548). Finally, other parameters are set (step S254A).

Figure 36:
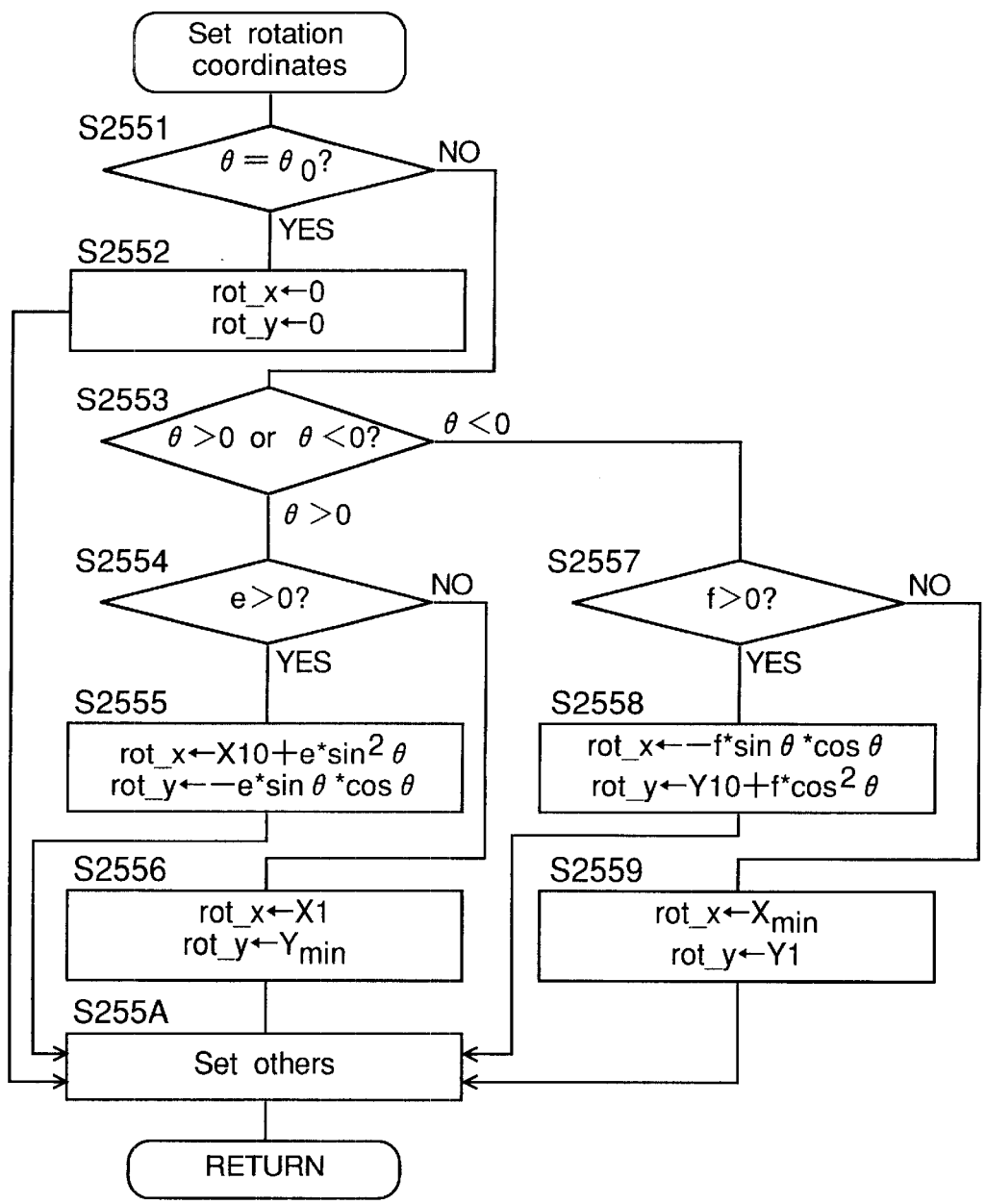
FIG. 36 shows a flowchart of rotation coordinate setting.

FIG. 36 shows a flowchart of the rotation coordinate setting (step S255 in FIG. 26). Parameters, rot__x and rot__y, are coordinates of the rotation center relative to the origin of the read area. If the rotation is not performed $(\theta=\theta_0)$ (YES at step S2551), both rot__x and rot__y are set to 0 (step S2552). If the rotation is performed (NO at step S2551), the flow branches according to the positive or negative sign of the rotation angle $\theta$ (step S2553). When the rotation angle $\theta$ is positive, if e>0 (YES at step S2554), $X_{10}+e*\sin^2\theta$ is assigned to rot__x and $e*\sin\theta*\cos\theta$ is assigned to rot__y (step S2555). If it is not decided that e>0, or if e=0, $X_1$ is assigned to rot__x and $Y_{min}$ is assigned to rot__y (step S2556). When the rotation angle $\theta$ is negative, if f>0 (YES at step S2557), $f*\sin\theta*\cos\theta$ is assigned to rot__y and $Y_{10}+f*\sin^2\theta$ is assigned to rot__y (step S2558). If it is not decided that f>0, or if f=0, $Y_{min}$ is assigned to rot__x and $Y_1$ is assigned to rot__y (step S2559). Finally, other parameters are set (step S255A).

Figure 37:
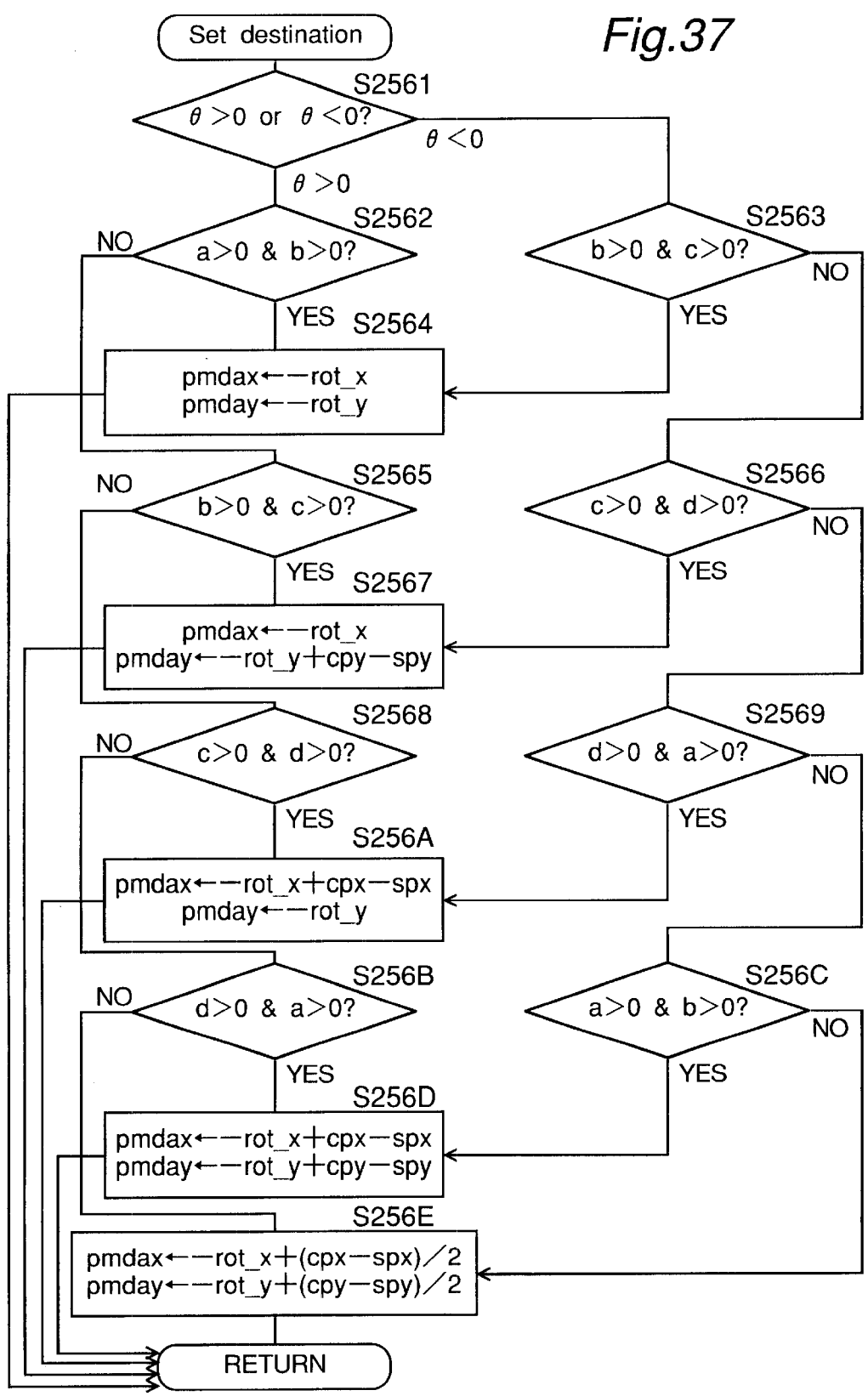
FIG. 37 shows a flowchart of destination setting.

FIG. 37 shows a flowchart of the destination setting (step S256 in FIG. 26). The destination is set to the coordinates pmdax, pmday (relative to the origin of the virtual paper) corresponding to the origin of the read area for image data drawn in the virtual paper area. The virtual paper area is set to a standard size, while it does not necessarily agree with the input image size determined by extracting the sides of the document in the document detection. Therefore, if two or more sides are extracted from the image data, preferably at the side of read datum (the side of rotation center), the destination (or parallel translation length) is set based on two adjacent sides and the paper size so that the corner of the two adjacent sides agrees with a corner of the virtual paper area. The parameters spx and spy represent sizes of the detected document paper, cpx and cpy represent sizes of the virtual paper size (refer to FIG. 32), and rot__x and rot__y represent the coordinates of the rotation center relative to the origin of the read area (refer to FIG. 36). First, if the angle $\theta>0$ (step S2561) and if the sides, a and b, are both positive (YES at step 52562), or if the angle $\theta<0$ (step S2561) and if the sides, b and c, are both positive (YES at step S2563), two sides containing the rotation center are extracted. Then, −rot__x is assigned to pmdax and −rot__Y is assigned to pmday (step S2564). Next, if the angle $\theta>0$ (step S2561) and the sides, b and c, are both positive (YES at step S2565), or if the angle $\theta<0$ (step S2561) and the sides, c and d, are both positive (YES at step S2566), −rot__x is assigned to pmdax and −rot__y+cpy-spy is assigned to pmday (step S2567). Next, if the angle $\theta>0$ (step S2561) and the sides, c and d, are both positive (YES at step S2568), or if the angle $\theta<0$ (step S2561) and the sides, d and a, are both positive (YES at step S2569), −rot__x+cpx-spx is assigned to pmdax and −rot__y is assigned to pmday (step S256A). Further, if the angle $\theta>0$ (step S2561) and if the sides, d and a, are both positive (YES at step S256B), or if the angle $\theta<0$ (step S2561) and if the sides, a and b, are both positive (YES at step S256C),−rot__x+cpx-spx is assigned to pmdax and −rot__y+cpy-spy is assigned to pmday (step S256D). If any of the above-mentioned conditions is not satisfied, −rot__x+(cpx-spx)/2 is assigned to pmdax and −rot__y+(cpy-spy)/2 is assigned to pmday (step S256E).

Figure 38:
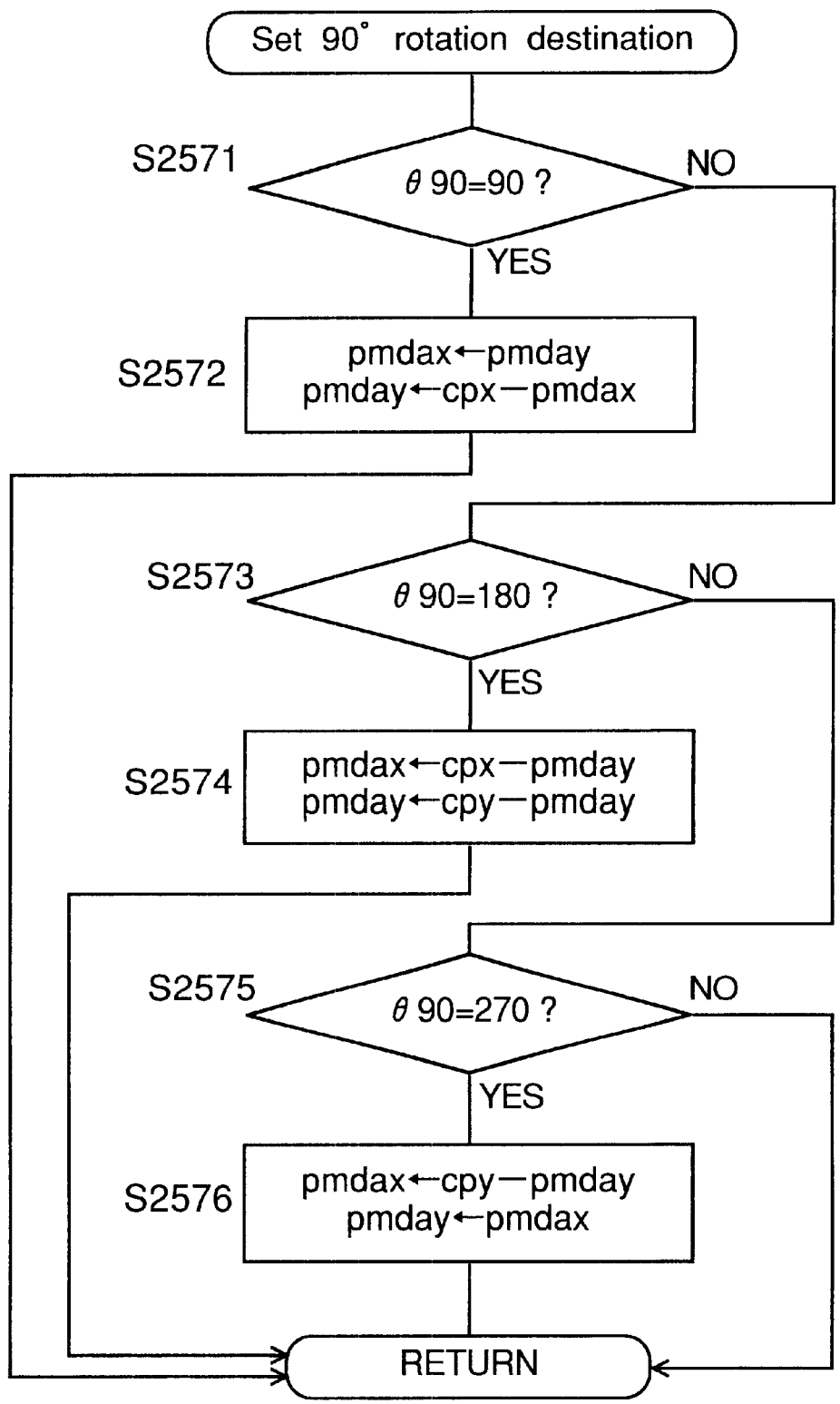
FIG. 38 shows a flowchart of 90° rotation destination setting.

FIG. 38 shows a flowchart of the 90° rotation destination setting (step S257 in FIG. 26). When 90° rotation is combined in the rotation, the datum of destination has to be changed. If $\theta_{90}=90$ (YES at step S2571), pmday is assigned to pmdax and cpx-pmdax is assigned to pmday (step S2572). If $\theta_{90}=180$ (YES at step S2573), cpx-pmdax is assigned to pmdax and cpy-pmday is assigned to pmday (step S2574). If $\theta_{90}=270$ (YES at step S2575), cpy-pmday is assigned to pmdax and pmdax is assigned to pmday (step S2576).

The above-mentioned destination setting is explained in the normal mode. However, it is possible to set an appropriate destination when the image is required to be shifted by a margin provided for binding, or when a plurality of documents are required to be copied in a single paper.

Figure 39:
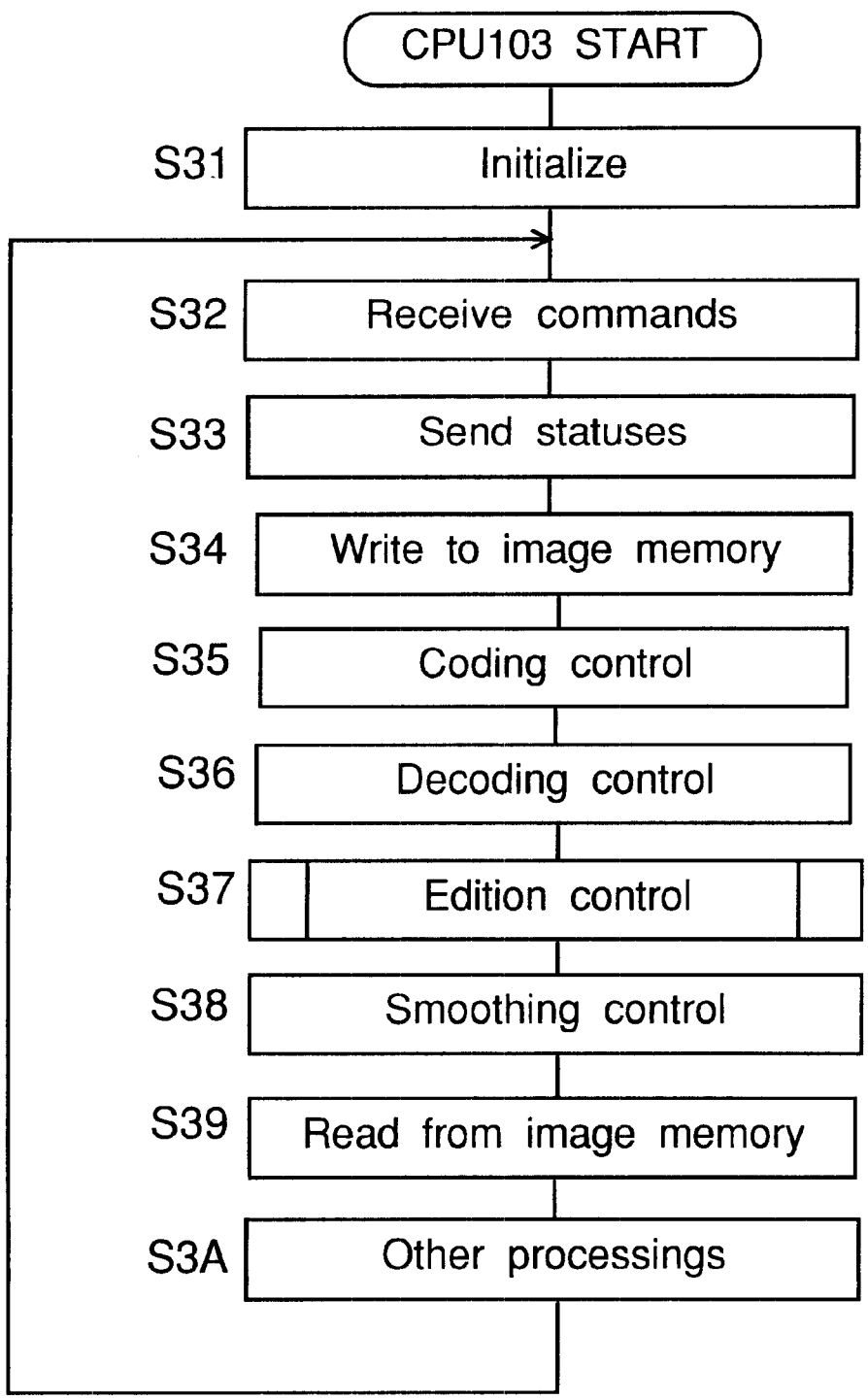
FIG. 39 is a main flowchart of the third CPU.

FIG. 39 is a main flowchart of the third CPU 103 which controls the memory unit 30. First the RAM, the registers and the like are initialized (step S31). Then, commands from the CPU 105 are received (step S32), statuses are sent to the CPU 105 (step S33), write to the image memory is performed (step S034), and compression (coding) is controlled (step S35). Further, expansion (decoding) is controlled (step S36), edition control is performed (step S37, refer to FIG. 40), smoothing control is performed (step S38), and read from the image memory is performed (step S39). After other processings are performed (step S3A), the flow returns to step S32 to repeat the above processes.

Figure 40:
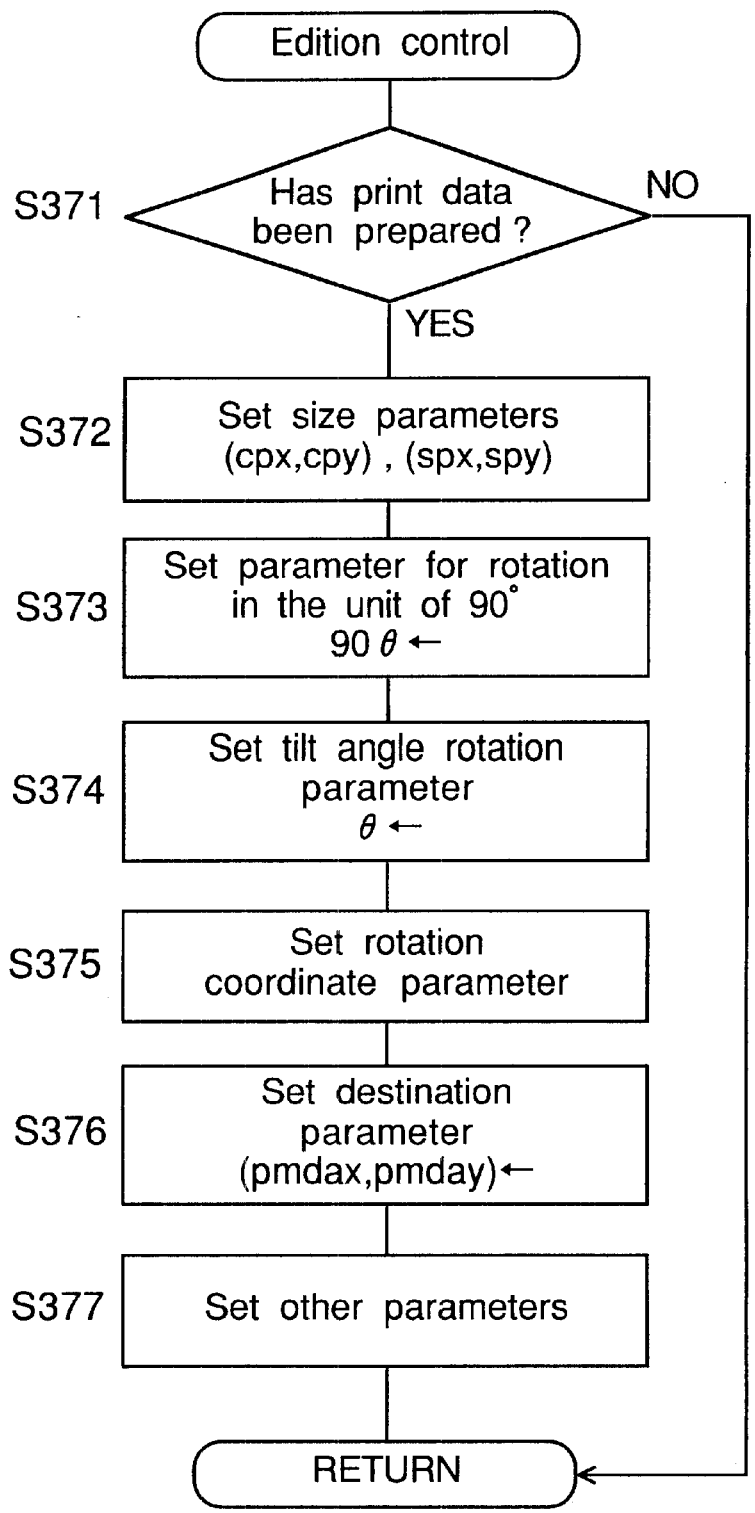
FIG. 40 is a flowchart of edition control.

FIG. 40 is a flowchart of the edition control (step S037 in FIG. 39). When data for printing are stored in the code memory 306 (YES at step S371), the size parameters, (cpx, cpy), (spx, spy) are set (step S372), the rotation parameter in the unit of 90° is set (step S373), tilt angle rotation parameter θ is set (step S374), rotation coordinate parameters (rot_x, rot_y) are set (step S375), the destination parameter (pmdax, pmday) is set (step S376), and other parameters are set (step S377).

Figure 41:
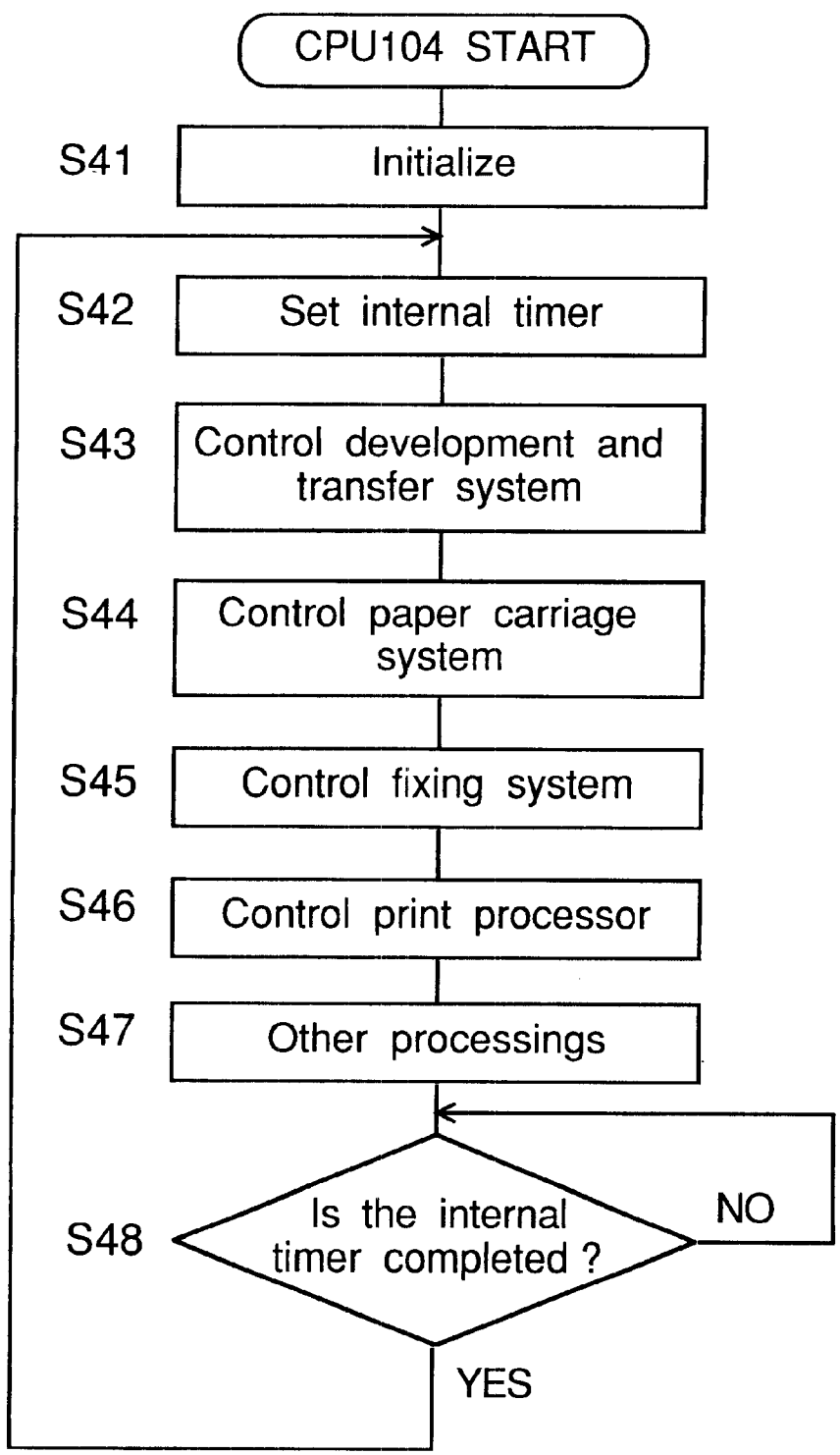
FIG. 41 is a main flowchart of a fourth CPU.

FIG. 41 is a main flowchart of the third CPU 103 which controls the memory unit 30. First the RAM, the registers and the like are initialized (step S31). Then, a command from the CPU 105 is received (step S32), a status is sent to the CPU 105 (step S33), write to the image memory is performed (step S34), areas are discriminated (step S35, refer to FIG. 24), smoothing decision is performed (step S36, refer to FIG. 25), and coding is controlled (step S37). Further, decoding is controlled (step S38), edition control is performed (step S39, refer to FIG. 26), smoothing control is performed (step S3A), and read from the image memory is performed (step S3B). After other processings are performed (step S3C), the flow returns to step S32 to repeat the above processes.

Figure 42:
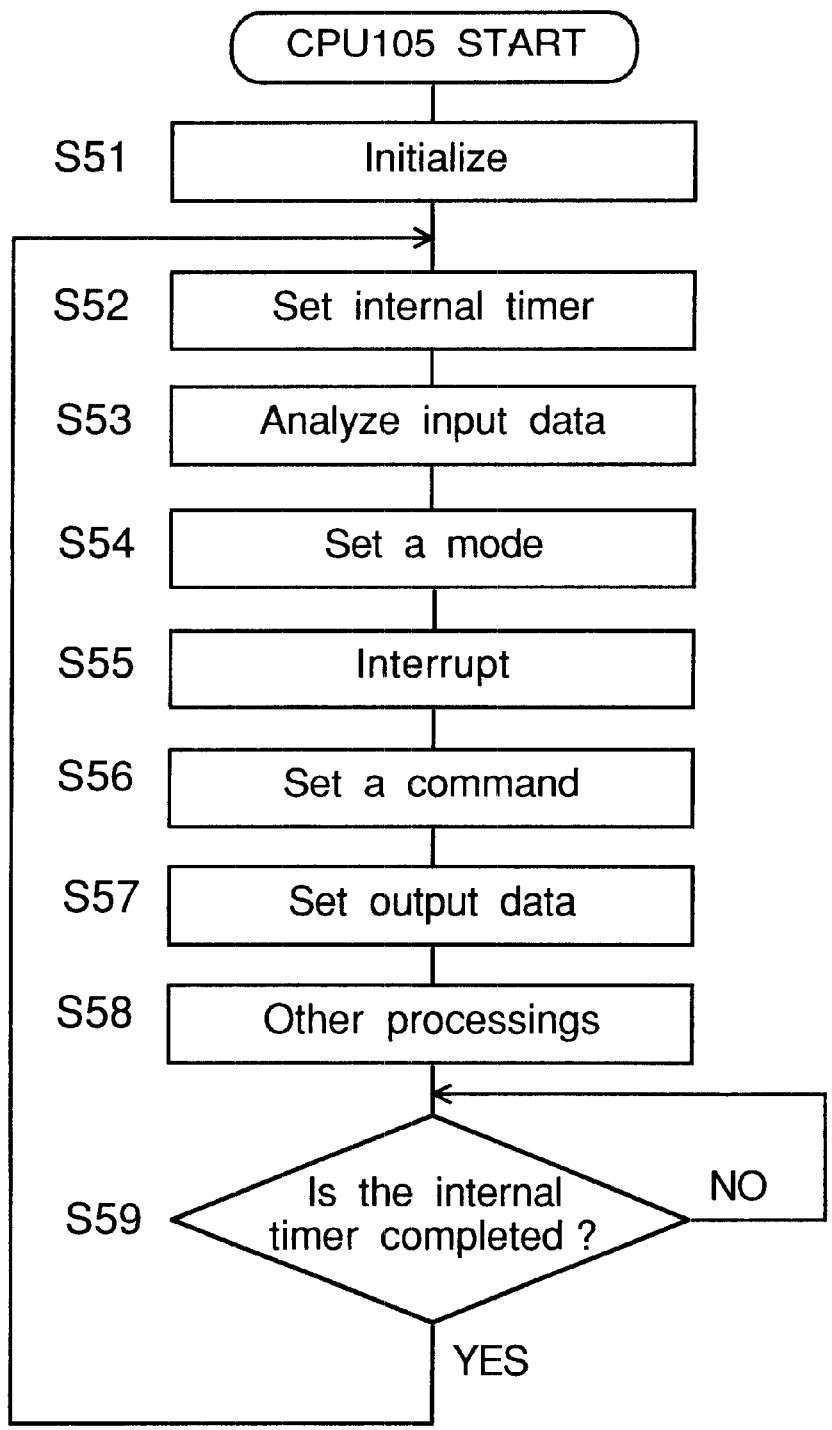
FIG. 42 is a main flowchart of a fifth CPU.

FIG. 42 is a main flowchart of the fifth CPU 105 which controls the entire copying machine. First, the RAM, the registers and the like are initialized (step S51). Next, an, internal timer which defines a time of one routine is set (step S52). Then, following processing are performed successively: input data analysis for checking input data from other CPUs (step S53), mode setting for setting an operation mode according to the contents of operation (step S54), switch due to interrupt (step S55), command setting according to the mode (step S56), and output data setting for providing a command to the communication port (step 57). Further, after other processings are performed (step S58), it is waited until the internal timer is completed (YES at step S59). Then, the flow returns to step S52 to repeat the above processes.

In the above-mentioned embodiment, the tilt angle rotation is explained on the image data received from the image reader. However, image data (including the angle parameters) communicated from an external apparatus in the network can also be processed. For example, the image data received from the external apparatus can be subjected to the tilt angle rotation and printed thereafter. Further, image data received from the external apparatus can be output again after the tilt angle rotation thereon.

G. Digital Copying Machine of Second Embodiment

Next, a copying machine of a second embodiment of the invention is explained. The structure of the copying machine of the second embodiment of the invention is the same as the counterpart of the first embodiment shown in FIG. 1, and the explanation is not repeated here.

Figure 43:
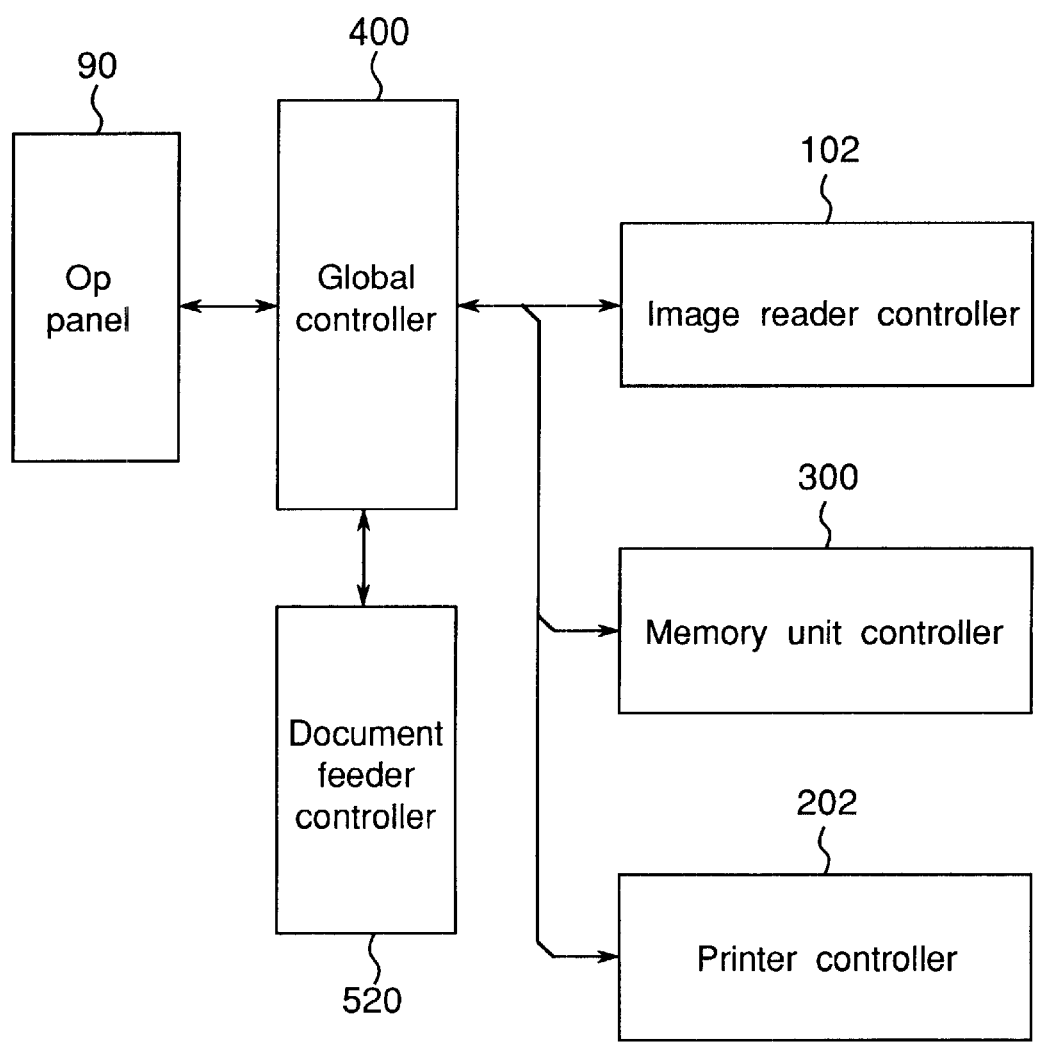
FIG. 43 is a block diagram of an entire control system of a copying machine of a second embodiment.

FIG. 43 is a block diagram of an entire control system of the copying machine. In the control system, a global controller 400 for the entire copying machine is connected to a controller 102 of the image reader 100, a controller 300 of the memory unit 300, a controller 202 of the printer 200, and a controller 520 of the document feeder 500. The global controller 400 transmits data to and from the controllers 102, 300, 202 and 520, and it also controls an operational panel 90.

Figure 44:
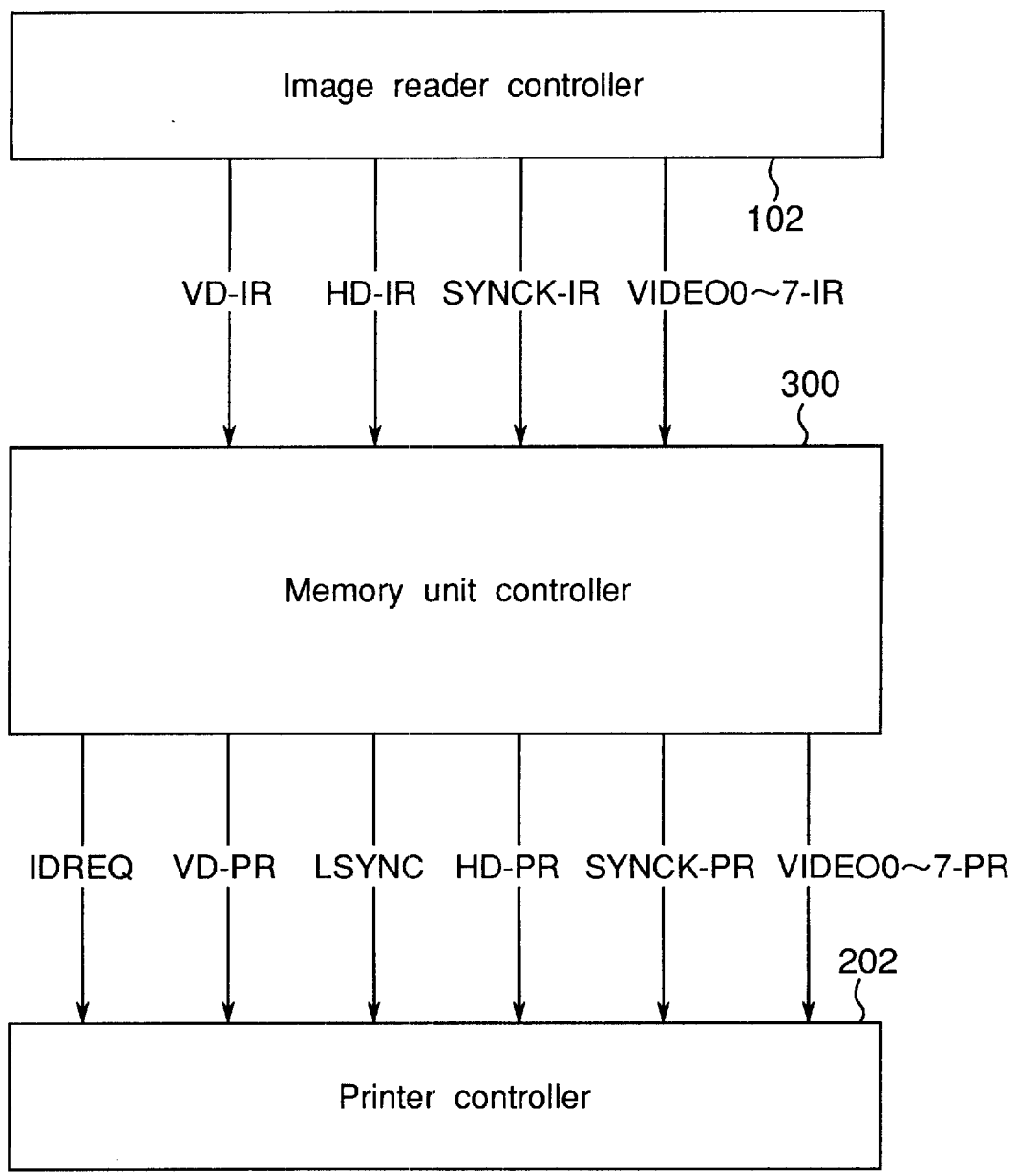
FIG. 44 is a block diagram of image input/output interface for a rotation memory unit.
Figure 45:
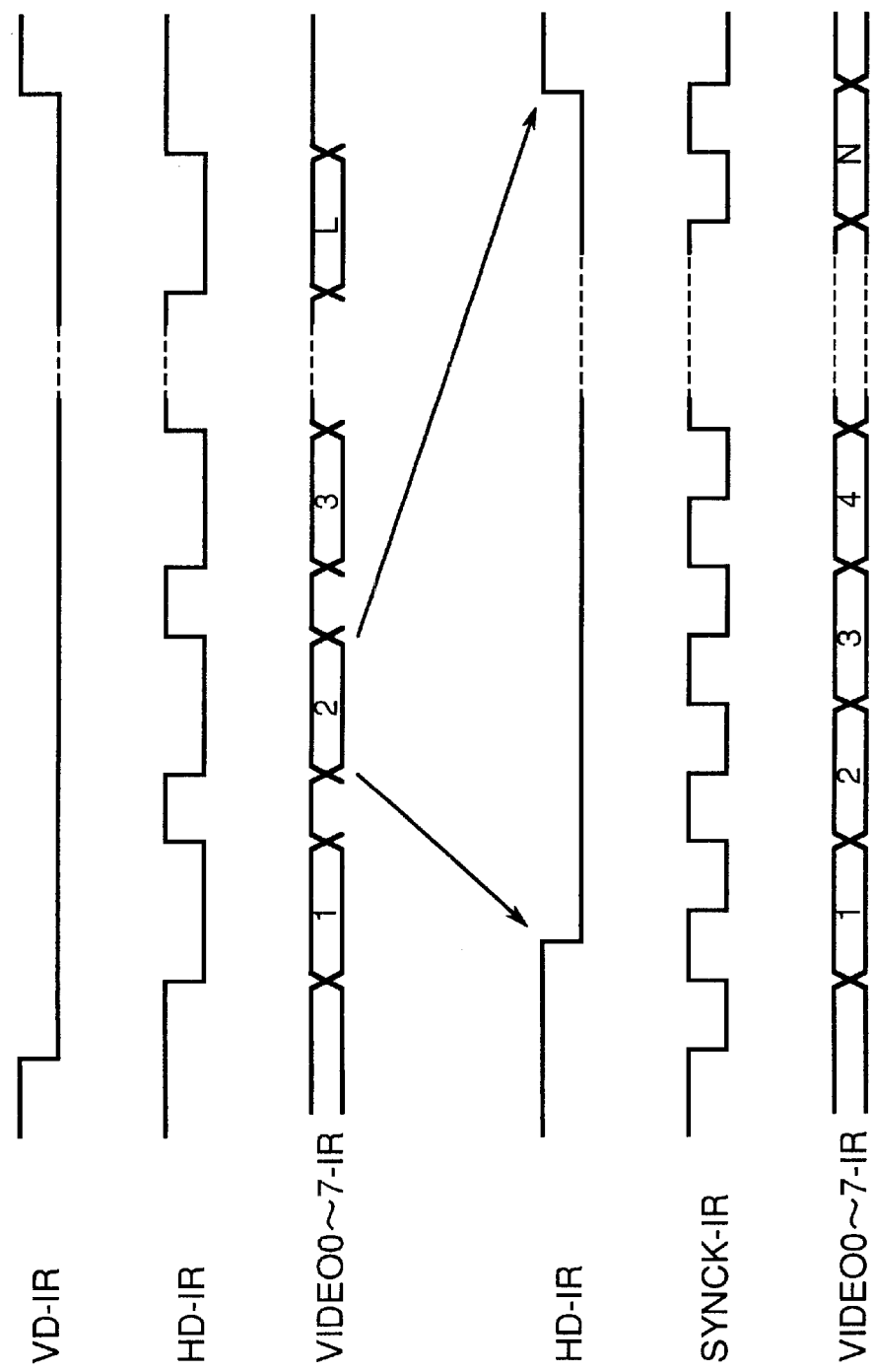
FIG. 45 is a sequence diagram of image data transmitted from an image reader controller.
Figure 46:
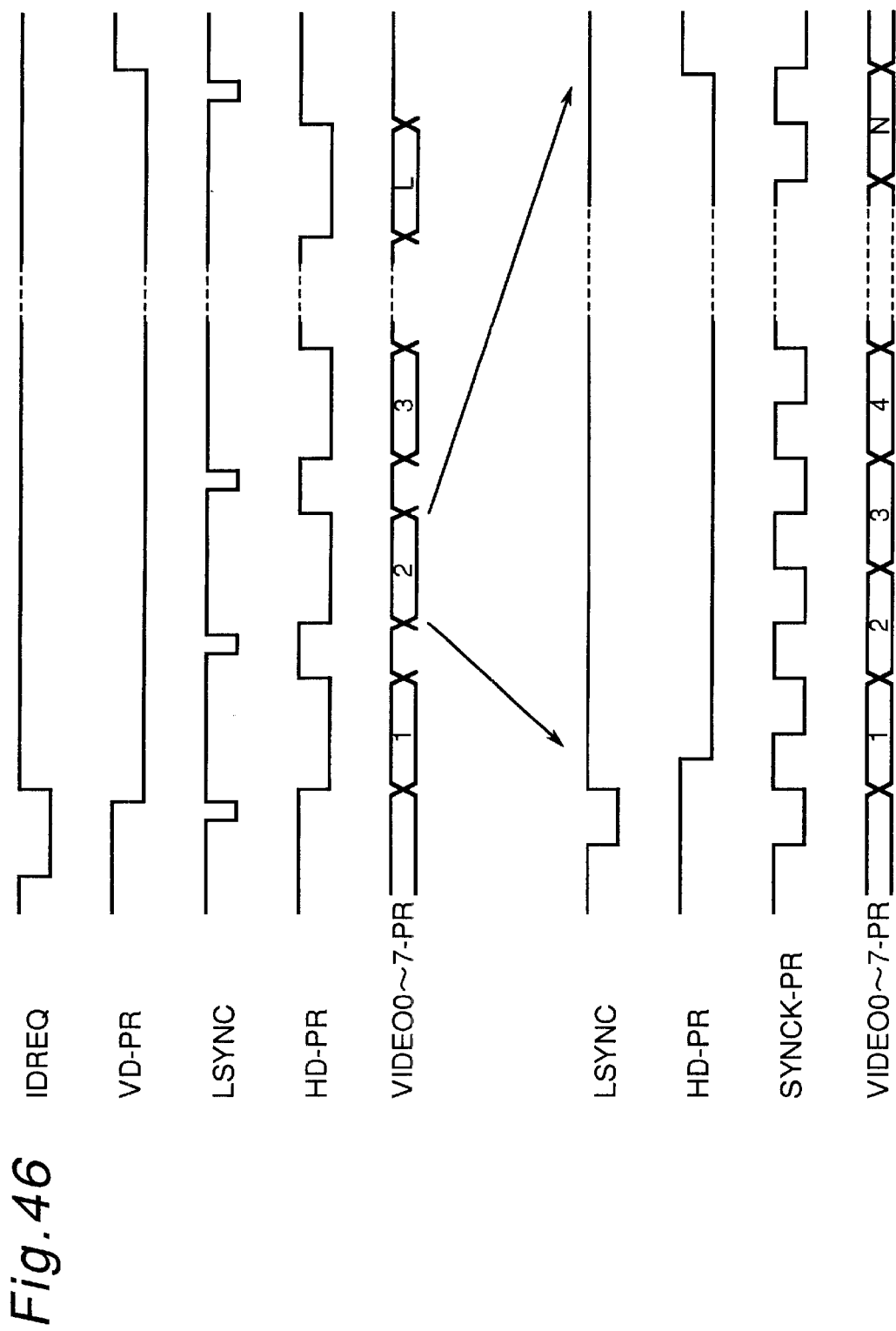
FIG. 46 is a sequence diagram of image data transmitted to a printer controller.

Next, image rotation in the memory unit 30 is explained. FIG. 44 shows an image input/output interface of the controller 300 in the memory unit 30. Further, FIG. 45 is a sequence diagram of image data transmitted from the image reader controller 102, while FIG. 46 is a sequence diagram of image data transmitted to the printer controller 202.

As shown in FIG. 44, the image input/output interface receives signals VD_IR, HD_IR, SYNCK_IR and VIDEO$_{0-7}$_IR. In the sequence diagram shown in FIG. 45 on image data to be transmitted from the image reader controller 102, VD_IR denotes page data output which is active at low level, and HD_IR denotes line data output which is active at low level. If both VD_IR and HD_IR are active, effective image data VIDEO$_{0-7}$_IR are transmitted in synchronization with SYNCK_IR. The data is a multi-level data having 8 bits per pixel.

As shown in FIG. 44, the image input/output interface receives signals IDREQ, VD_PR, LSYNC, HD_PR, SYNCK_PR and VIDEO$_{0-7}$_PR. In the sequence diagram shown in FIG. 46, on image data to be transmitted to the printer controller 202, IDREQ denotes page data transmission start signal, LSYNC denotes 1-line start reference signal from the printer, and image data are transmitted from the memory unit 30 in synchronization with them. VD_PR denotes page data output which is active at low level, and HD_PR denotes line data output which is active at low level. If both VD_PR and HD_PR are active, effective image data VIDEO$_{0-7}$_PR are transmitted in synchronization with SYNCK_PR.

Figure 47:
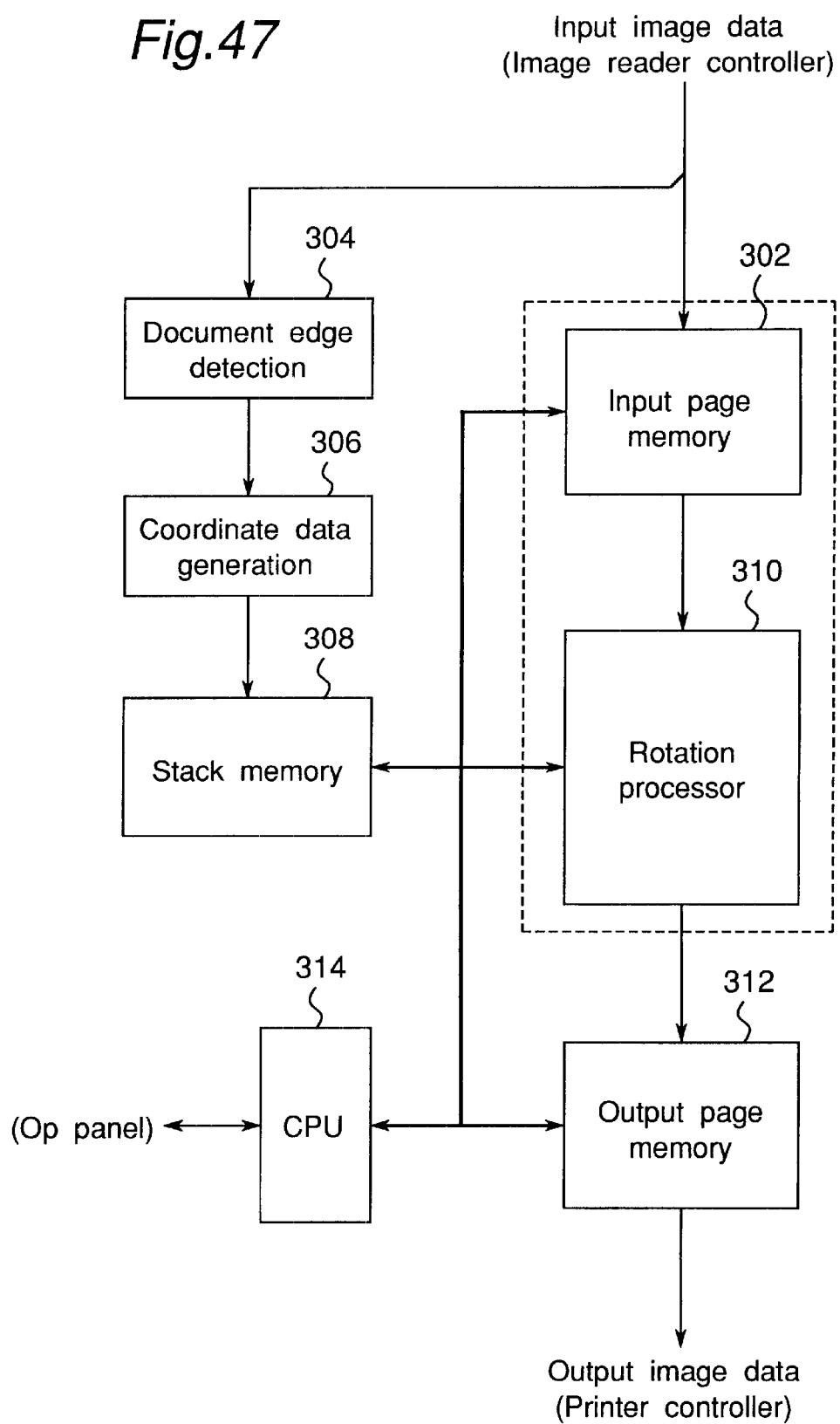
FIG. 47 is a block diagram of rotation memory unit controller.

FIG. 47 is a block diagram of the controller 300 of the memory unit 30. Image data received from the image reader 100 are stored in an input page memory 302 as a buffer and sent; to a document edge detector 304. Then, coordinate data of document edges are generated by a coordinate data generator 306, and are written to a stack memory 308 successively. The input page memory is managed by 2-dimensional coordinates, and the stored image data are edited by a rotation processor 310 based on the document edge data in the stack memory 308 and transmitted to an output page memory. A central processing unit 314 performs data input/output and command setting for edition according to signals from the global controller 400. The output page memory 312 is also managed with 2-dimensional coordinates, and the image data are output successively when printing is performed.

Figure 48:
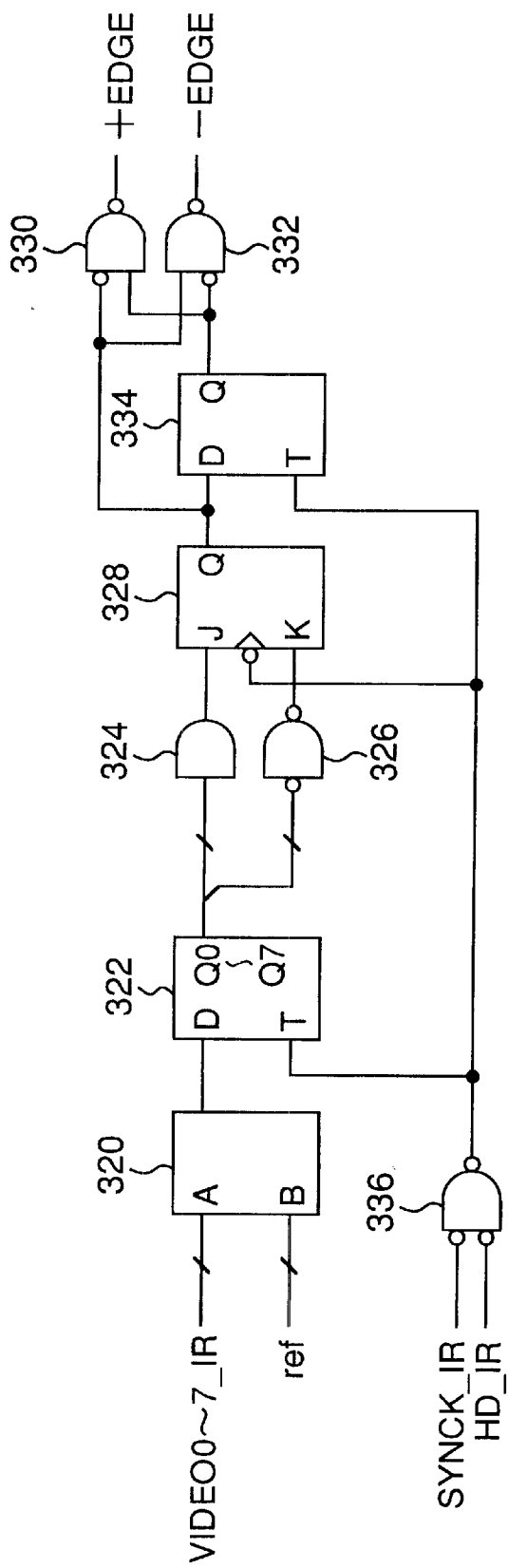
FIG. 48 is a diagram of a circuit for detecting document edges.

FIG. 48 shows the document edge detector 304. Image data VIDEO$_{0-7}$_IR received from the image reader 100 are sent to a comparator 320 for comparing a density of document background with a density while document exists on the belt 506 or on the platen glass 19. Image data VIDEO$_{0-7}$_IR are transmitted in synchronization with SYNCK_IR when line data are output (HD_IR is active). The existence or nonexistence of document can be decided surely by comparing each image data with a reference data "ref" which is set by considering the margin, to output a bi-level data. At a shift register 322 at the next stage, noises are removed by processing in the unit of 8 bits. The output signal of the shift register 322 is sent to AND gates 324 and 326, and the outputs of the two gates are next sent to J and K inputs of a J-K flip flop 328. The output signal of the J-K flip flop 328 is sent to a negative logic input of an AND gate 330 and to another AND gate 332. The output signal of the J-K flip flop 328 is also sent to a D flip flop 334. The output signal of the D flip flop 334 is sent to the AND gate 330 and to a negative logic input of the other AND gate 332. Signals SYNCK_IR and HD_IR are sent to a negative logic AND gate 336, and the output signal thereof is sent to the shift register 322, to the T terminal of the J-K flip flop 328 and to the T terminal of the D flip flop 334. At the last stage, the AND gates 330 and 332 detect an edge (+EDGE) from nonexistence to existence of document and an edge (−EDGE) from existence to nonexistence of document, to output a 1-shot pulse.

Figure 49:
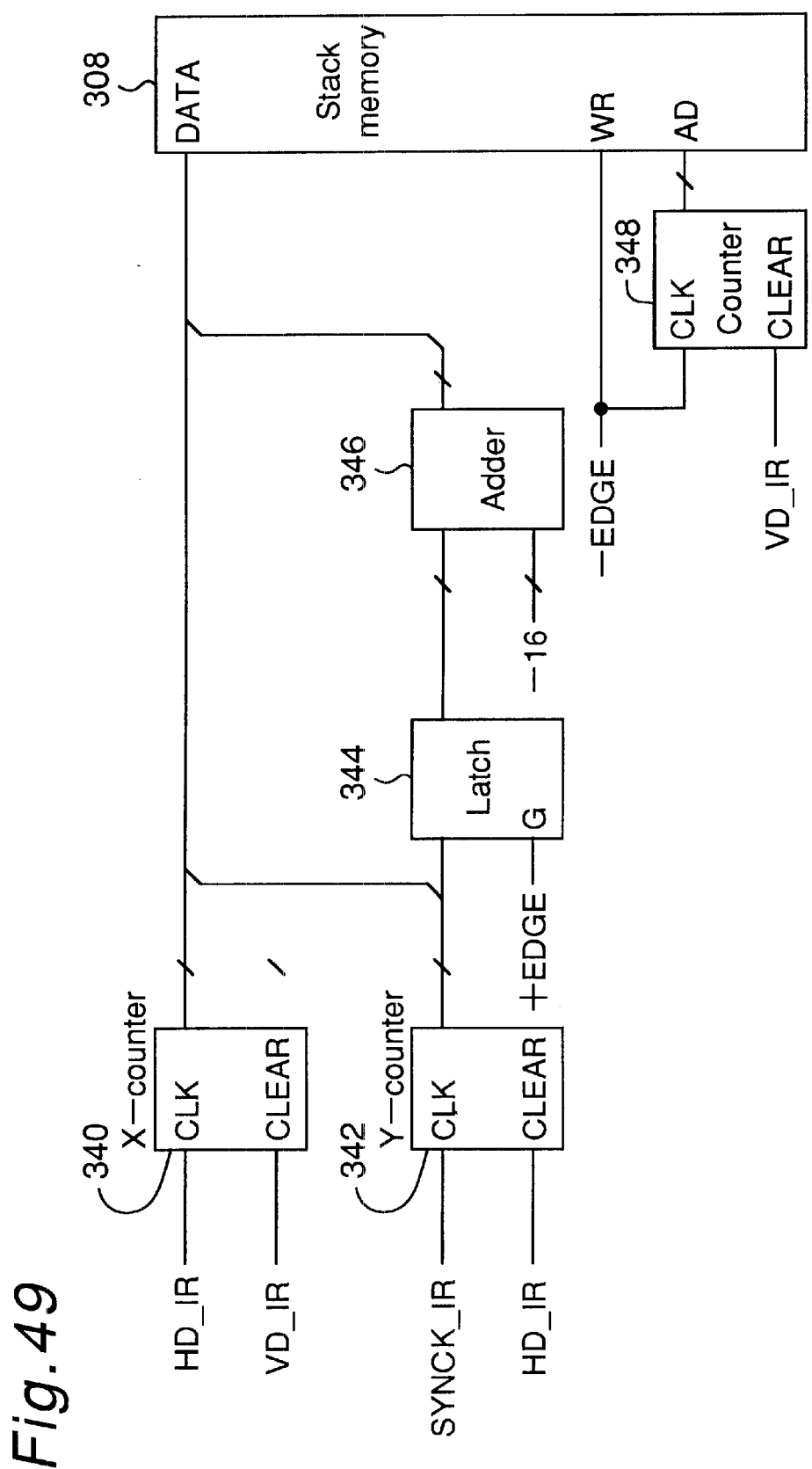
FIG. 49 is a diagram of a circuit for generating coordinate data.

FIG. 49 shows the coordinate data generator 306. By receiving signal HD_IR at CLK terminal and signal VD_IR at CLEAR terminal, a counter 340 generates X coordinate for subscan. Similarly, by receiving signal SYNCK_IR at CLK terminal and signal VD_IR at CLEAR terminal, another counter 342 generates Y coordinate for main scan. A latch 344 latches Y coordinate at +EDGE, and an adder 346 subtracts 16 therefrom, and the result is stored in the stack memory 308 besides X and Y coordinate! data at −EDGE. A counter 348 updates write address in synchronization with −EDGE while initializes it with signal VD_IR.

Figure 50:
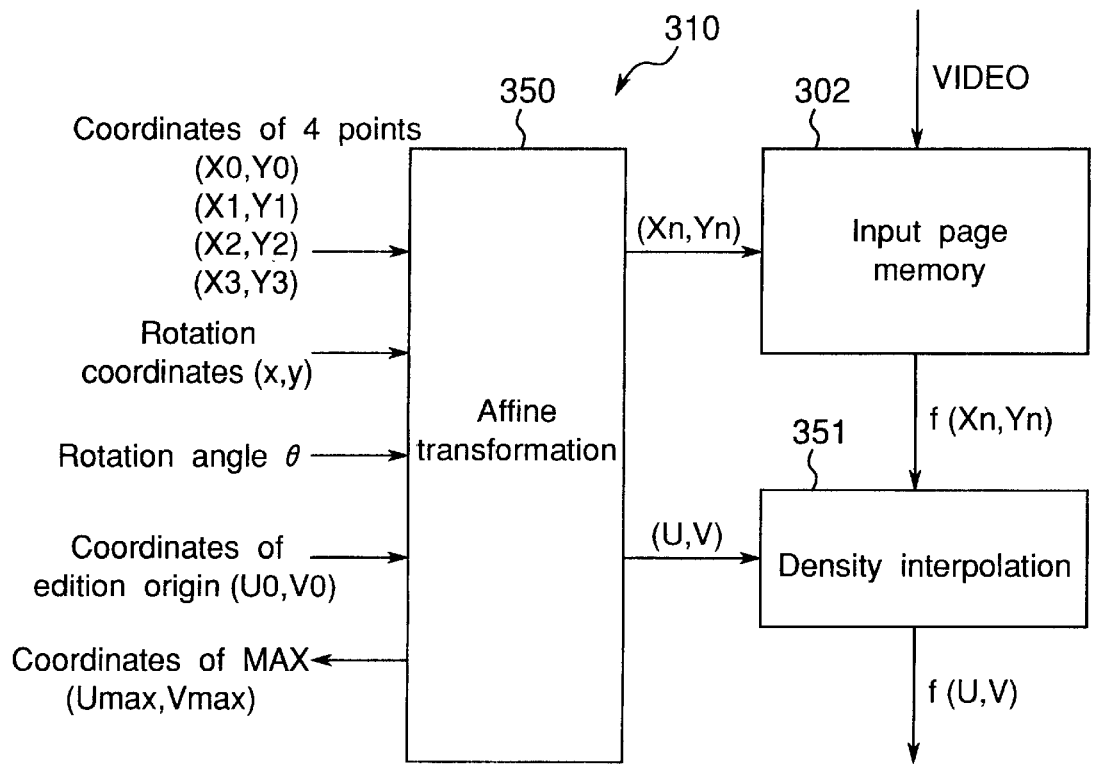
FIG. 50 is a block diagram of a rotation processor.
Figure 51:
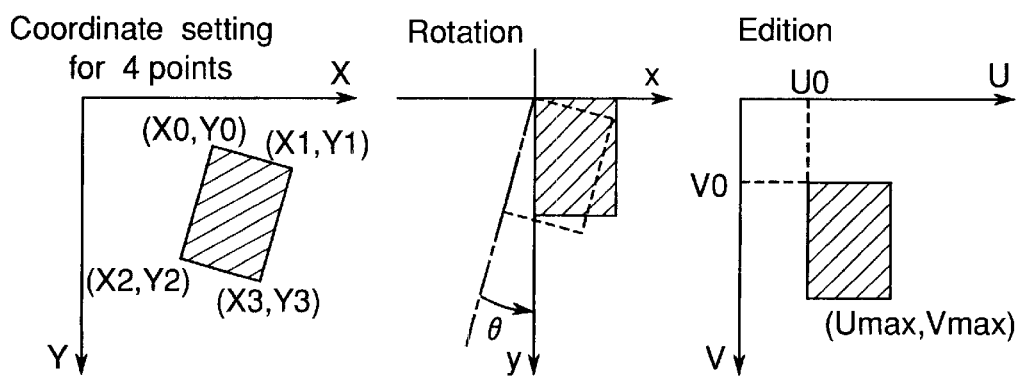
FIG. 51 is a diagram for explaining operations by the rotation processor.

FIG. 50 is a block diagram of the rotation processor 310, while FIG. 51 explains operations thereof. Image rotation uses affine transformation which is algebraic transformation between coordinates as represented below.

$$\begin{pmatrix} u \\ v \end{pmatrix} = \begin{pmatrix} a_0 \\ b_0 \end{pmatrix} + \begin{pmatrix} a_1 & a_2 \\ b_1 & b_2 \end{pmatrix} \begin{pmatrix} x \\ y \end{pmatrix}. \tag{18}$$

An affine transformation section 350 transforms data (image), in x-y coordinate system to u-v coordinate system according to Eq. (18), and parallel translation, expansion, contraction, rotation or the like can be performed. In this embodiment, only parallel translation and rotation are processed. In the affine transformation section 350, an area to be rotated in the input page memory 302 is designated by setting a rectangular area with coordinates of four points (refer to the left side in FIG. 51),, and rotation is performed by further setting the coordinates ($U_o$, $V_o$) of the origin of the edition area, the origin (x, y) of the coordinates used for rotation and the rotation angle θ (refer to the center in FIG. 51). Next, for edition, the origin of the rotated image area (rotation coordinates) is assigned to ($U_o$, $V_o$) for u-v coordinates (refer to the right in FIG. 51). This processing is represented as follows:

$$\begin{pmatrix} u \\ v \end{pmatrix} = \begin{pmatrix} u_0 \\ v_0 \end{pmatrix} + \begin{pmatrix} \cos\theta & -\sin\theta \\ \sin\theta & \cos\theta \end{pmatrix} \begin{pmatrix} X - X_o \\ Y - Y_o \end{pmatrix}. \tag{19}$$

Further, max coordinates ($U_{max}$, $V_{max}$) of the area after rotation and edition are output. The coordinates (u, v) obtained by the affine transformation are usually not integral numbers. Then, output density value f (u, v) has to be interpolated with density data $f(X_n, Y_n)$ of the original image. The interpolation is performed by a density interpolation section 351. For example, linear interpolation, 3-dimensional spline interpolation or the like may be adopted for the interpolation. The data interpolated by the density interpolation section 351 are sent to the output page memory 312 to be stored therein according to 2-dimensional axes (u-v coordinates). The data are output in the unit of line according to print timing signals.

Figure 52:
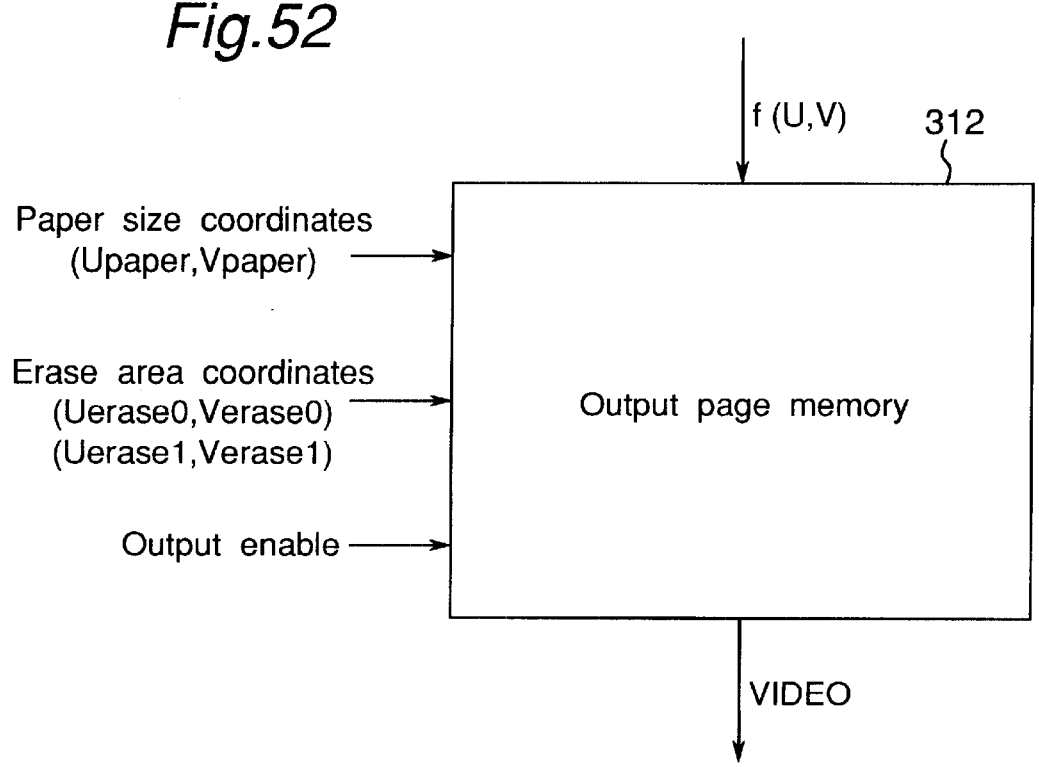
FIG. 52 is a diagram of an output page memory.
Figure 53:
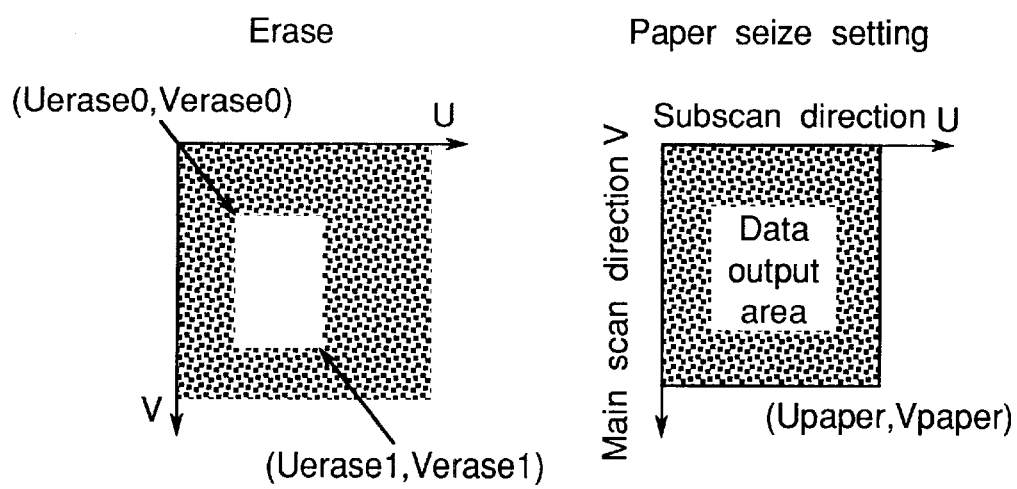
FIG. 53 is a diagram for explaining operations by the output page memory.

FIG. 52 shows the output page memory 312, and FIG. 53 explains operations thereof. After data are stored in the output page memory 312, the data are erased at unnecessary portions in the image. By setting two points of erase area coordinates ($U_{erase0}$, $V_{erase0}$) and ($U_{erase1}$, $V_{erase1}$), a rectangular area having a diagonal between them and being parallel to the coordinate axes is converted to white data (refer to left side in FIG. 53). Further, by setting paper size coordinates ($U_{paper}$, $V_{paper}$), a rectangular area, or paper size, having a diagonal between the origin coordinates and the paper size coordinates, is set as a data output area (refer to right side in FIG. 53). Here, V axis corresponds to the main scan direction and U axis corresponds to subscan direction. Signal VIDEO is output by supplying an output enable signal to the output page memory 312.

Figure 54:
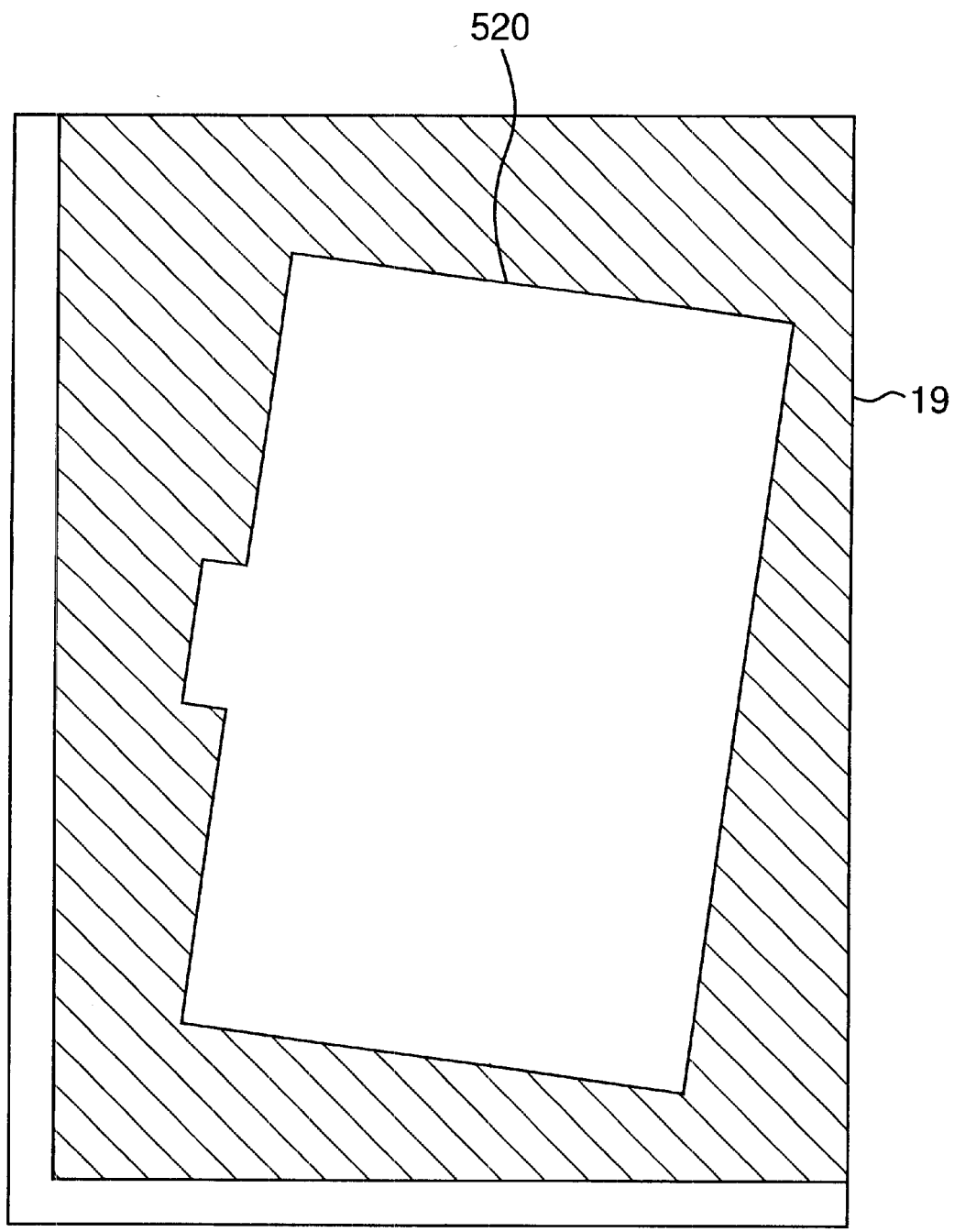
FIG. 54 is a diagram of a document put on a platen glass.
Figure 55:
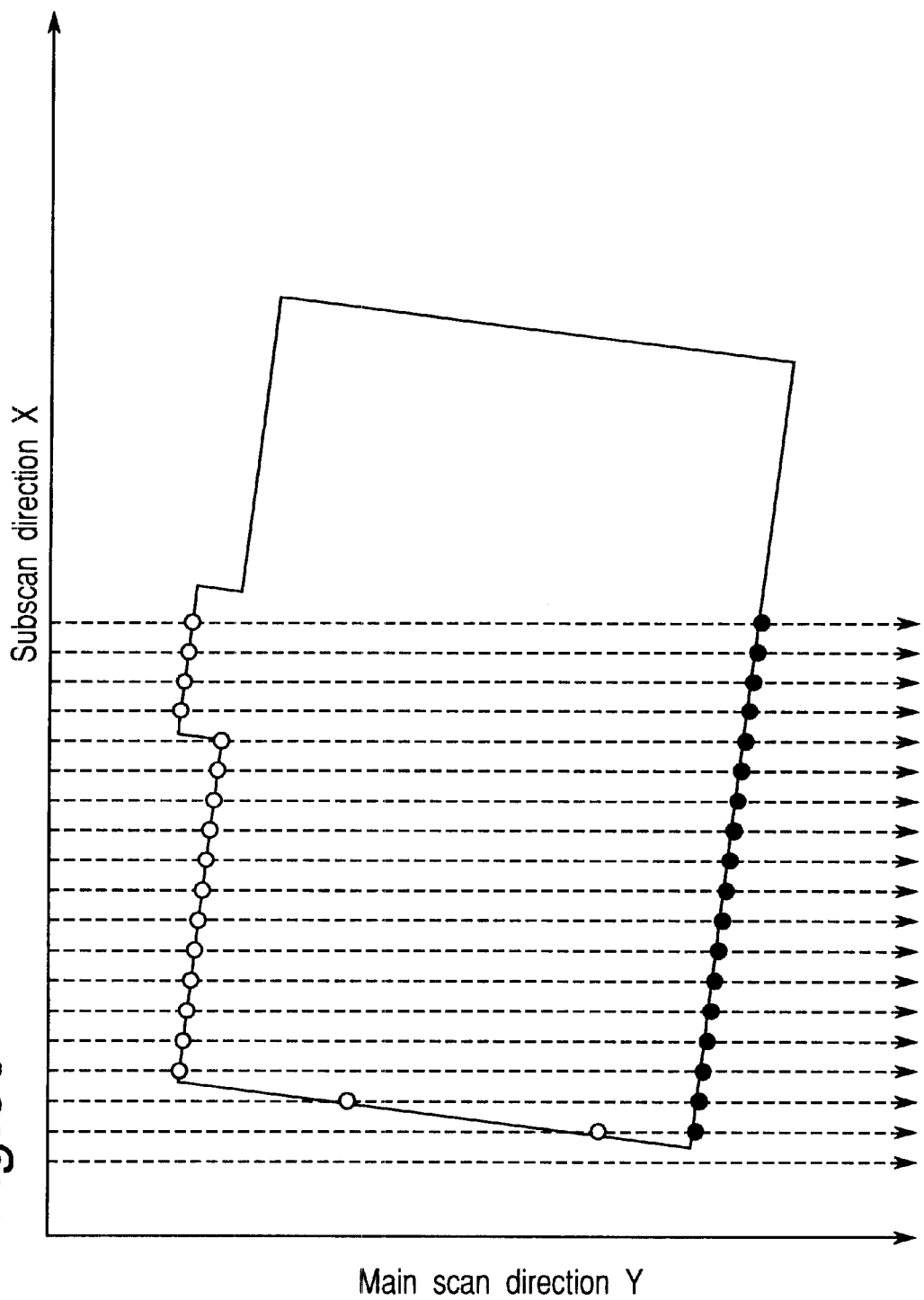
FIG. 55 is a diagram for explaining reading of the document.

Next, document detection using the above-mentioned system is explained which makes it possible to detect the tilt of a document and the document area precisely for a document having extension or the like and for a nonrectangular document. A document 520 put on the platen glass 19 is read. In FIG. 54, an area (white area) except an image reading area represented with hatching represents a document. In this example, the document is put at a tilt. In the image reader 100, the scanner is moved in X-axis (subscan) direction as shown in FIG. 55, and an image is read in the unit of line with the CCD sensor 17 (refer to positions of dashed lines). Edition is performed in the memory unit 30. Data from the CCD sensor 17 are transmitted in the unit of line according to the sequence shown in FIG. 45 and stored in the input page memory 302 in the memory unit 30. As the same time, the document edge detector 304 detects document edges for each line. In FIG. 55, open circles represent edges (+EDGE) changing from black to white, and solid circles represent edges (−EDGE) changing from white to black. The two coordinate data are written successively to the stack memory 308 as a pair. In the stack memory 308, line number $X_n$, count $YW_m$ of +EDGE and $YB_m$ of −EDGE are stored as a set, and they are picked in the order of storage when processed.

Figure 56:
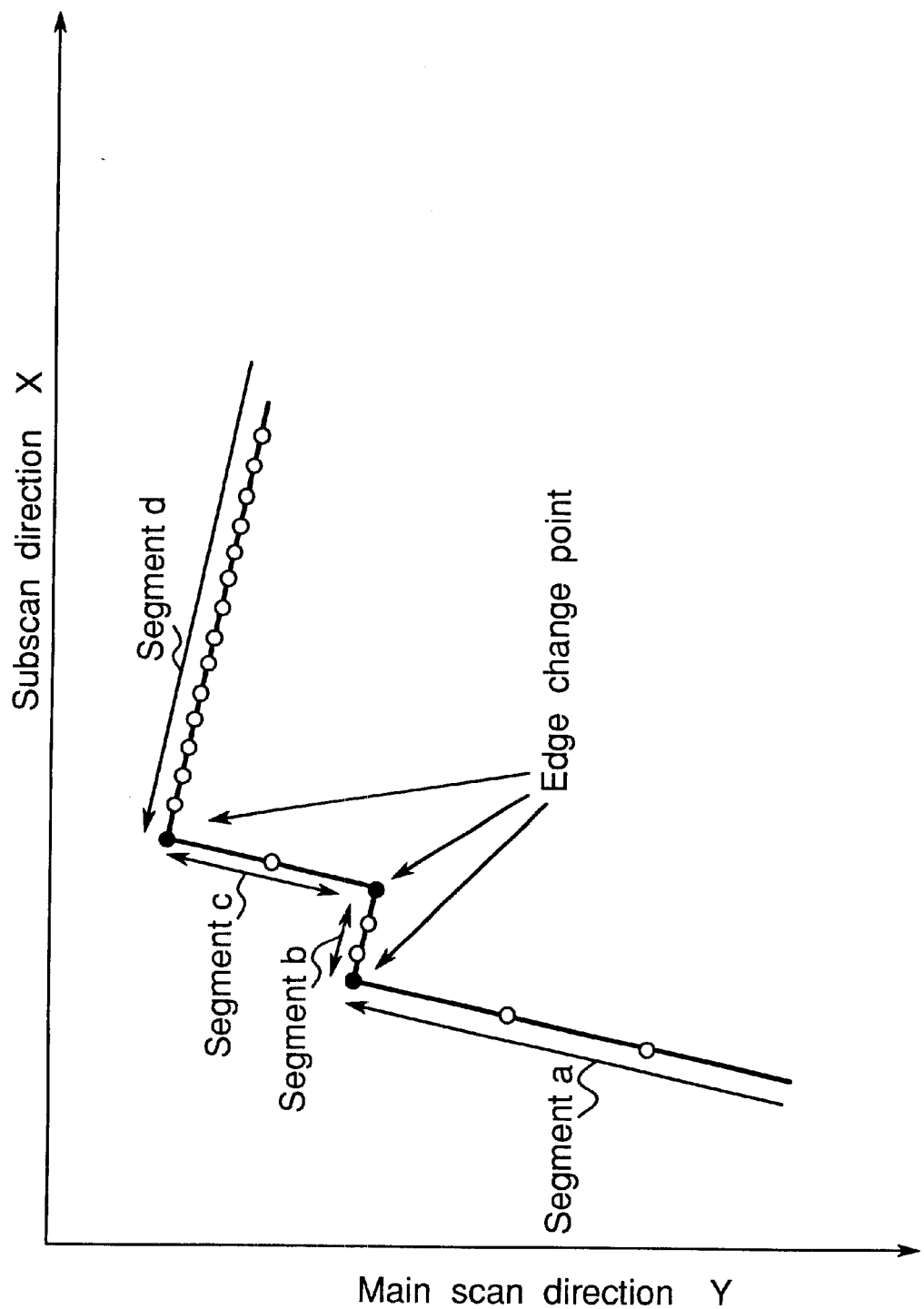
FIG. 56 is a diagram for explaining edge change points and segments.
Figure 57:
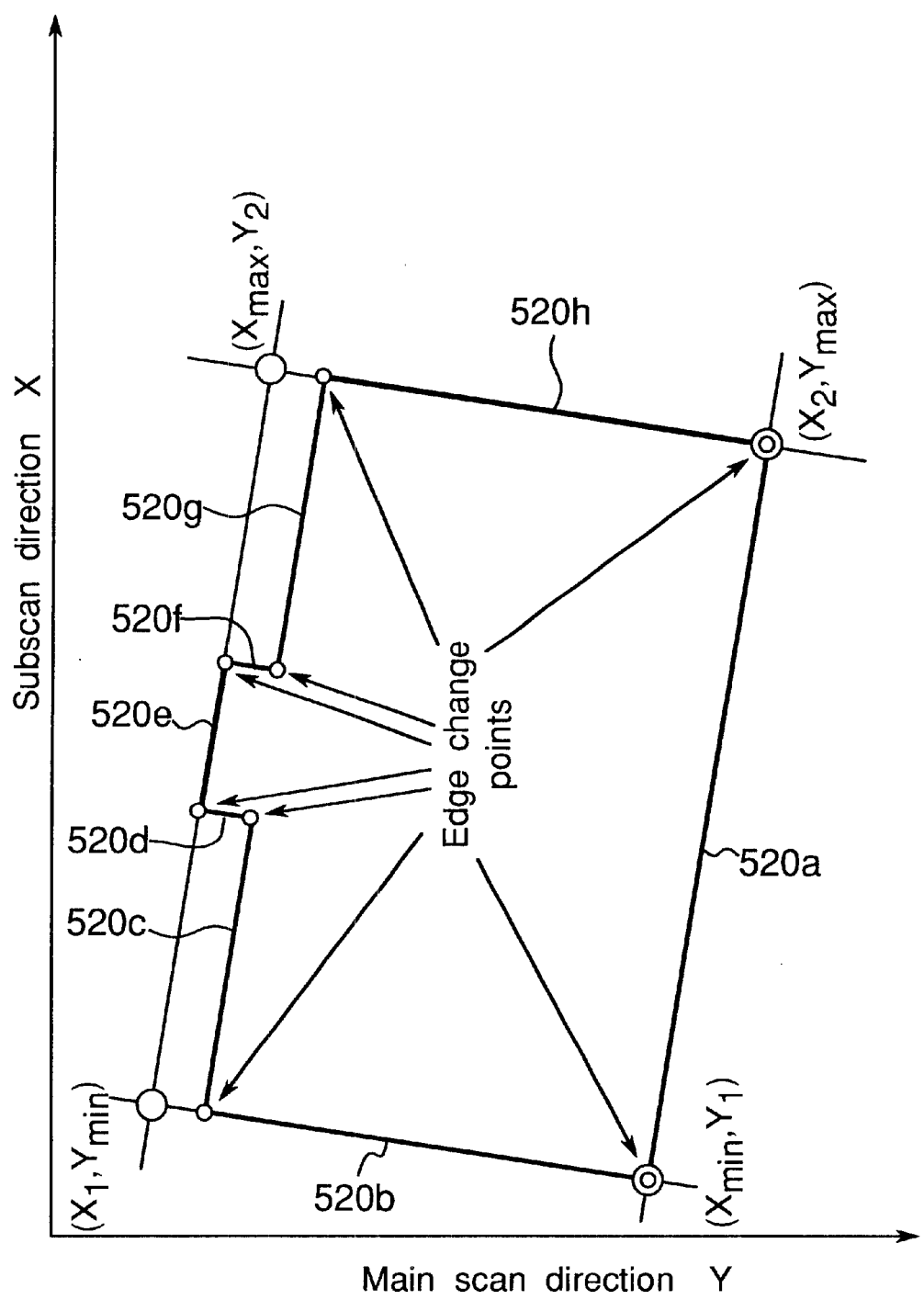
FIG. 57 is a diagram for explaining setting of document; area.
Figure 58:
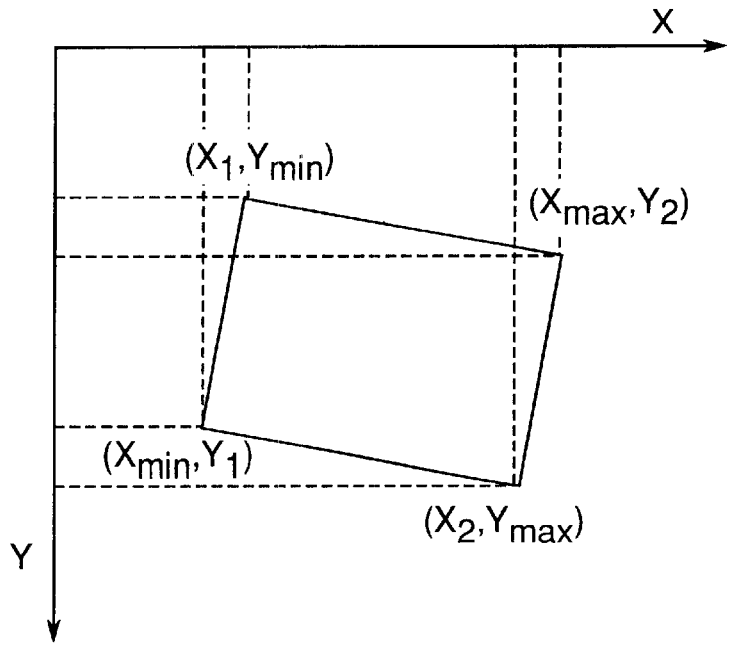
FIG. 58 is a diagram for explaining inclination direction of a document.
Figure 59:
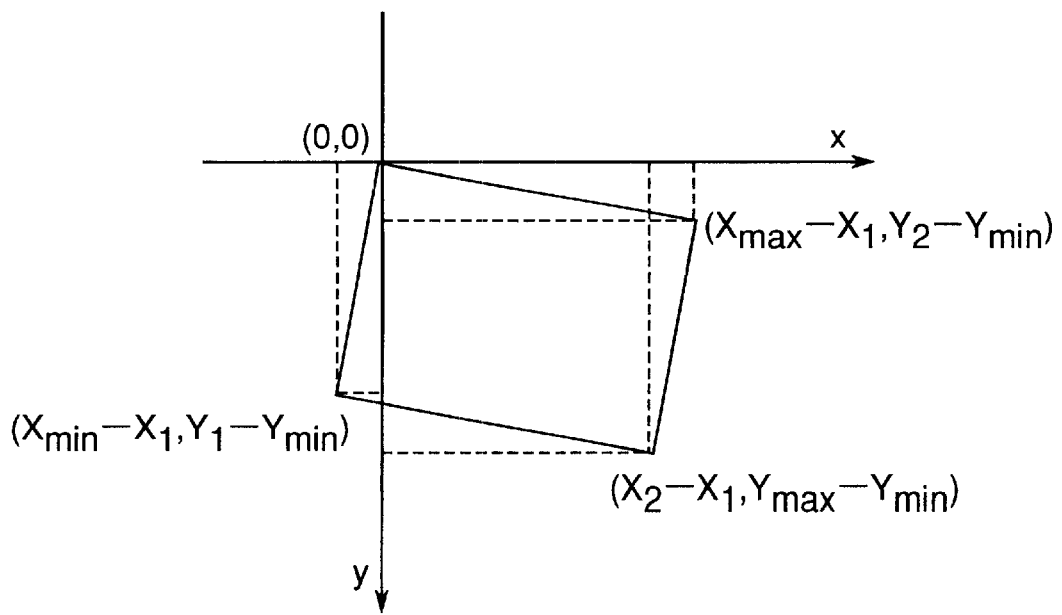
FIG. 59 is a diagram for explaining setting of rotation angle.
Figure 60:
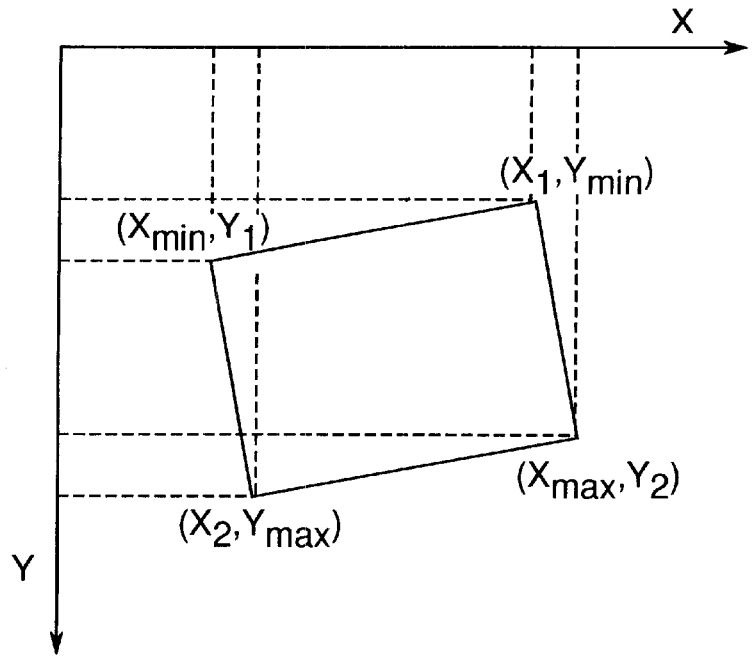
FIG. 60 is another diagram for explaining inclination direction of a document.
Figure 61:
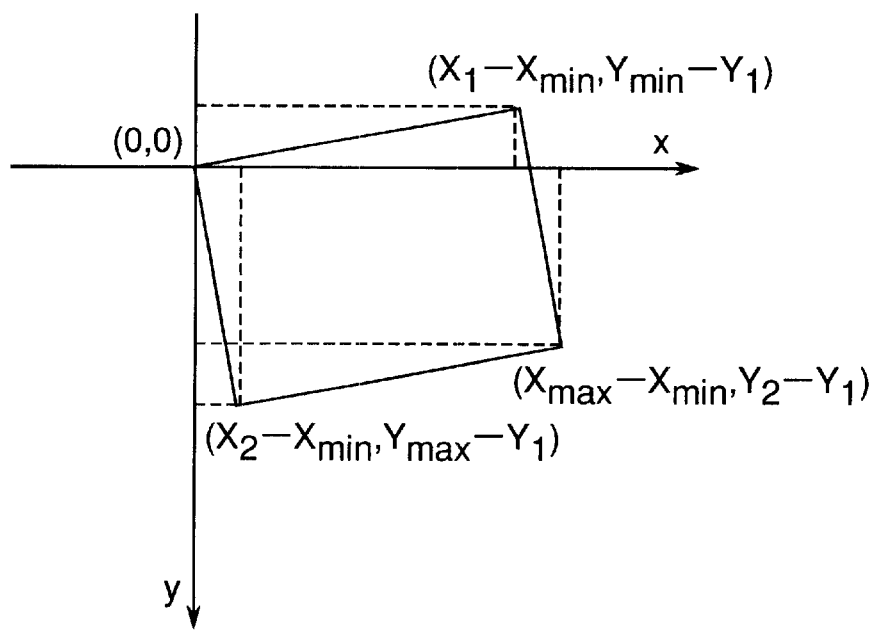
FIG. 61 is another diagram for explaining setting of rotation angle.

Then, as shown in FIG. 56, the CPU 314 detects a change in slope between coordinate data for each document edge according to the coordinate data stored in the stack memory 308, and edge change points where the slope is changed are determined. Then, straight lines connecting the edge change points are extracted (refer to segments a, b, c and d in FIG. 56). In FIG. 57, small circles represent edge change points, and bold lines represent detected segments. The longest among the segments is determined. In the example shown in FIG. 57, the right side 520a is determined as the longest among the eight segments. Further, a straight line including the segment 520e in parallel and opposing to the right side 520a is determined, and two straight lines including the segments 520b and 520h and perpendicular to the segment 520a are also determined, so as to enclose all the extracted segments. Then, the four straight lines enclosing the document area are determined. That is, a rectangular area including all the extracted segments is determined. Therefore, even for a document having an extension or the like or a non-rectangular document, an appropriate document area enclosing the document can be obtained based on the longest segment. Next, the coordinates of the four points (large circles in FIG. 57) which define a document area are determined according to intersections of the four straight lines. Further, the tilt direction and the rotation angle of the document are determined as the slope of the longest line. FIG. 58 shows a position of a document when $X_1-X_{min}<Y_1-Y_{min}$, while FIG. 59 shows setting of the rotation angle θ of the document. In the rotation, the origin is ($X_1$, $Y_{min}$), and the rotation angle is $-\tan^{-1}\{(Y_1-Y_{min})/(X_{min}-X_1)\}$. On the other hand, FIG. 60 shows a position of a document when $X_1-X_{min}>Y_1-Y_{min}$ and FIG. 61 shows setting of the rotation angle of the document. In the rotation, the origin is ($X_{min}$, $Y_1$,), and the rotation angle θ is $-\tan^-\{(Y_{max}-Y_1)/(X_2-X_{min})\}$.

Settings for the rotation and the parallel shift are performed according to the above results, and the rotation and the parallel shift are performed by the rotation processor 310. The obtained image data are stored in the output page memory 312, and an image is formed by the printer 200 according to the image data.

Next, the operation of image forming is explained in detail with reference to flowcharts shown in FIGS. 62–68. The controller 102 of the image reader controls the image processing unit 20 to detect edge change points, to extract the segments and to calculate the size of the document area, the tilt angle, and the shift. The memory unit 30 performs edition including tilt angle rotation. The controller 300 of the memory unit 30 sets the parameters. For the brevity of the explanation, the control is explained by using a flow.

Figure 62:
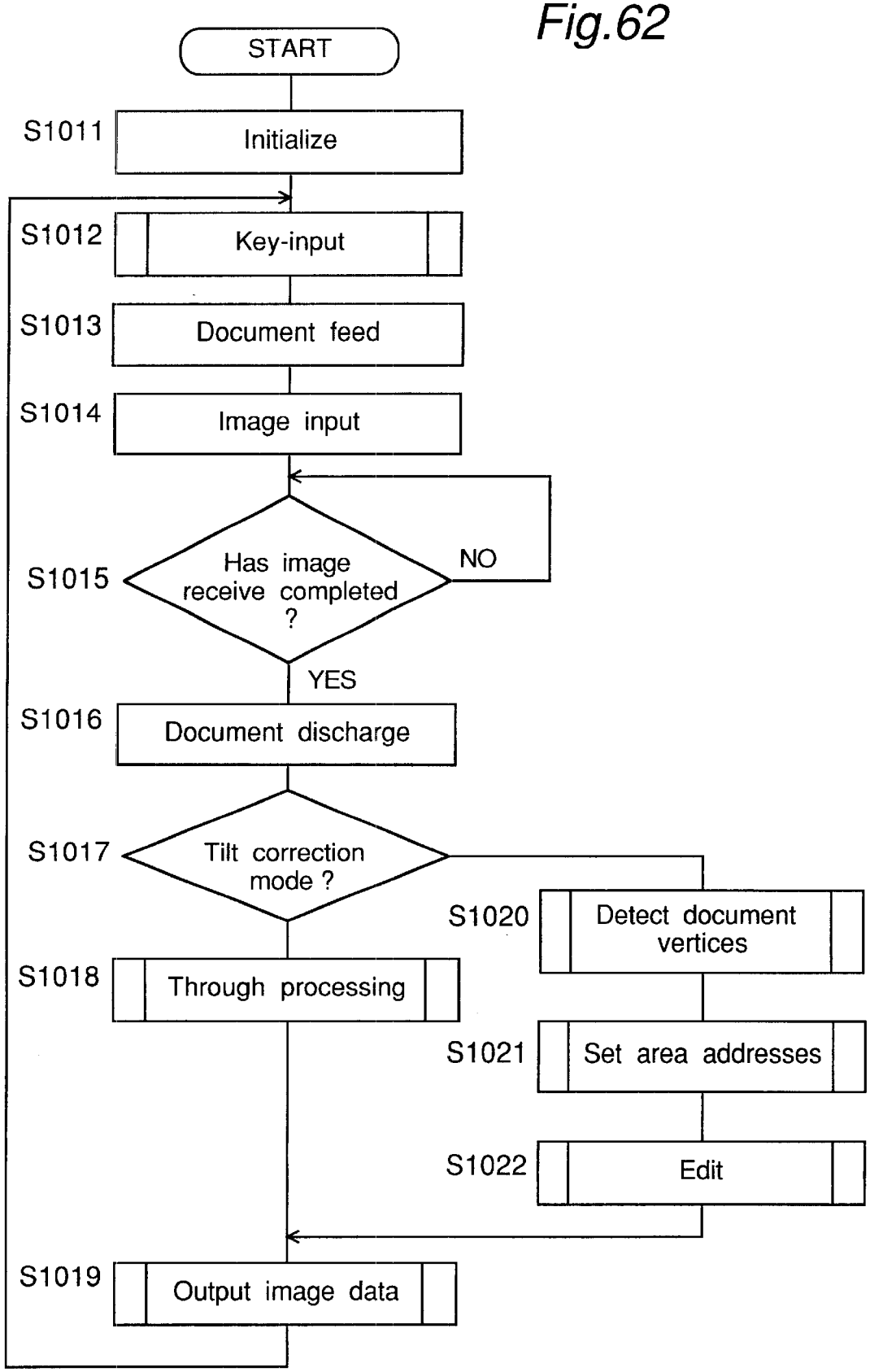
FIG. 62 is a flowchart on an entire flow in a second embodiment.

FIG. 62 is a flowchart on an entire flow of image forming in the second embodiment. After the initialization (step S1011), key-input signals of various keys of the operational panel are controlled (step S1012, refer to FIGS. 63A and 63B), document feeding by the document feeder 500 is controlled (step S1013), and image input by the image reader 100 is controlled (step S1014). After the image data input is completed (YES at step S1015), the document is discharged (step S1016).

Next, it is decided if tilt correction mode is set or not (step S1017). If tilt correction mode is not set (NO at step S1017), through processing is performed (step S1018, refer to FIG. 68), and the image data are output (step S1019, refer to FIG. 67). Then, the flow returns to step S1012. On the other hand, if tilt correction mode is set (YES at step S1017), document vertices are detected (step S1020, refer to FIGS. 64A–64C), area addresses are set (step S1021, refer to FIGS. 65A and 65B) and edition is performed (step S1022, refer to FIG. 66). Then, the image data are output (step S1019), and the flow returns to step S1012.

Figure 63A:
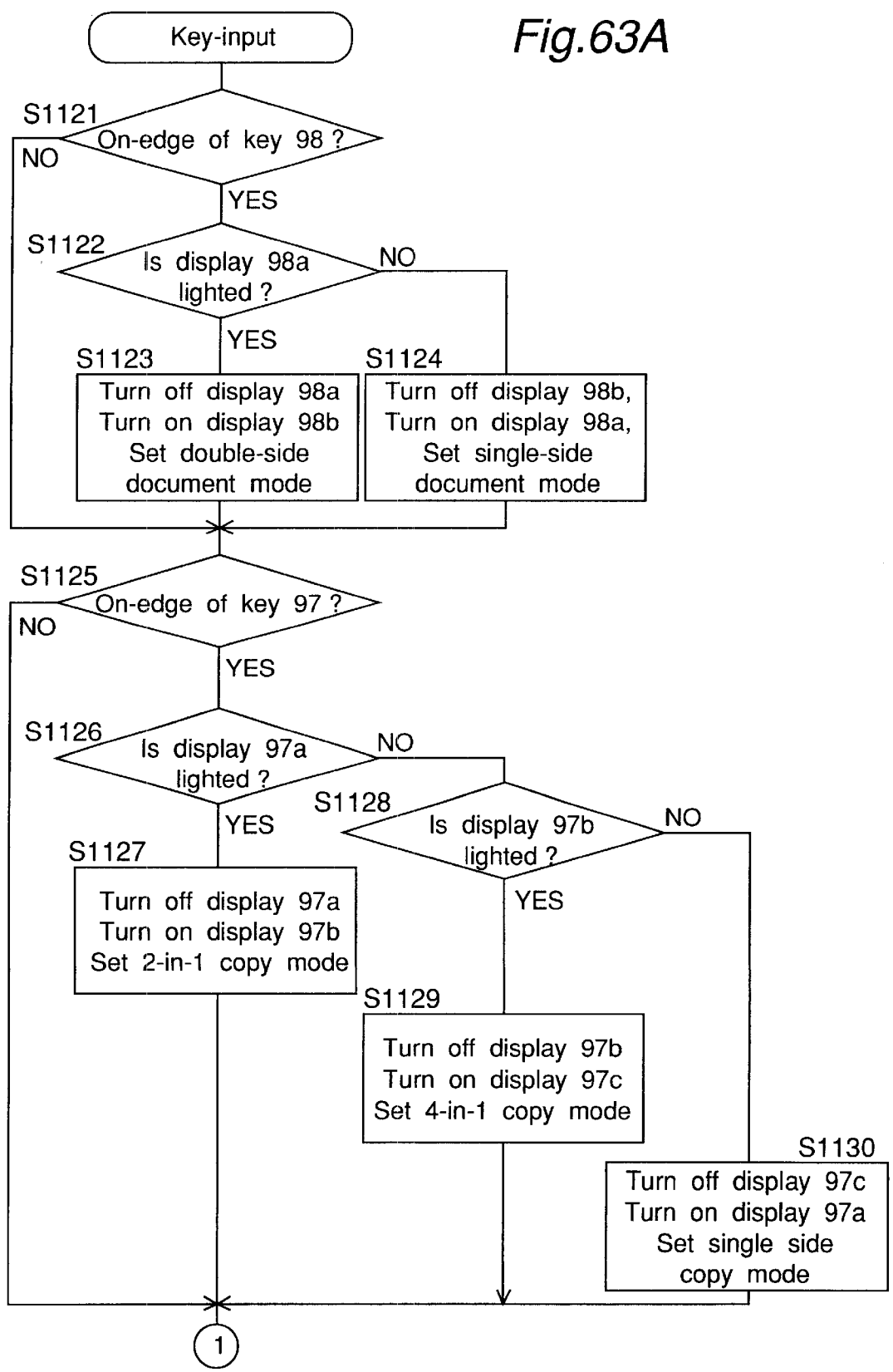
FIGS. 63A and 63B are flowcharts of key-input processing.
Figure 63B:
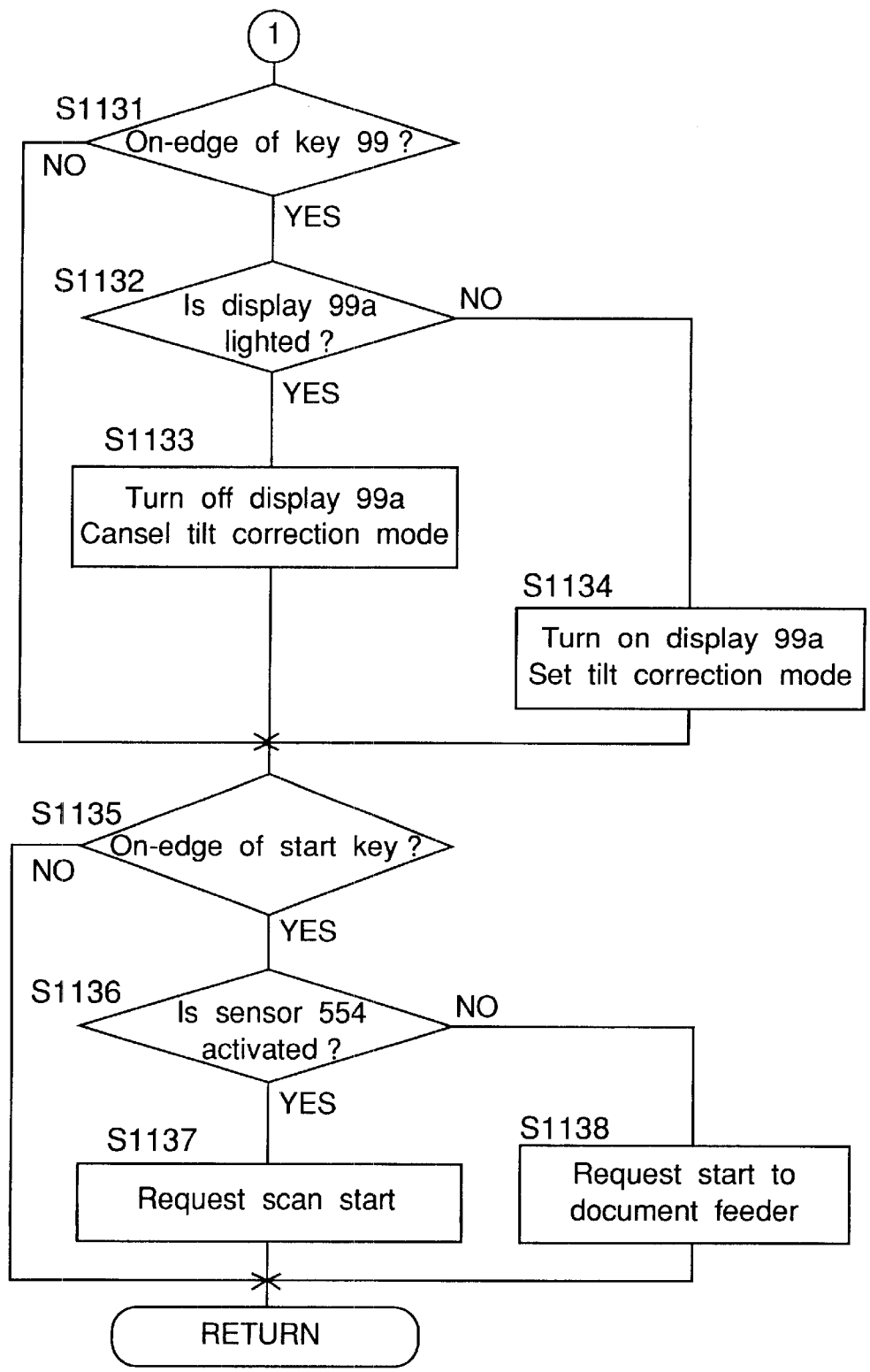

FIGS. 63A and 63B are flowcharts of the key-input processing (step S1012 in FIG. 62). First, the selection of document mode is checked according to on-edge (that is, change from off level to on level) of the document mode key 98 (step S1121). If on-edge of the document mode key 98 is detected (YES at step S1121), it is checked whether the indicator (display) 98a is lighted or not (step S1122). If the indicator 98a is, lighted, the indicator 98a is turned off, the other indicator 98b is turned on, and double-side document mode is set (step S1123). On the other hand, if the indicator 98a is not lighted, the indicator 98b is turned off, the indicator 98a is turned on, and single-side document mode is set (step S1124).

Next, the selection of copy mode is checked according to on-edge of the copy mode key 97 (step S1125). If on-edge of the copy mode key 98 is detected (YES at step S1125), it is checked whether the indicator (display) 97a is lighted or not (step S1126). If the indicator 97a is lighted, the indicator 97a is turned off, the indicator 97b is turned on, and single-side 2-in-1 copy mode is set (step S1127). If the indicator 97a is not lighted, it is checked next whether the indicator (display) 97b is lighted or not (step S1128). If the indicator 97b is lighted, the indicator 98b is turned off, the indicator 98c is turned on, and single-side 4-in-1 copy mode is set (step S1129). On the other hand, if the indicator 97b is not lighted, the indicator 97c is turned off, the indicator 97a is turned on, and single-side copy mode is set (step S1130).

Next, the selection of tilt correction mode is checked according to on-edge of the tilt correction key 99 (step S1131). If on-edge of the document mode key 99 is detected (YES at step S1131), it is checked whether the indicator (display) 99a is lighted or not (step S1132). If the indicator 99a is lighted, the indicator 99a is turned off, and double-side document mode is canceled (step S1133). On the other hand, if the indicator 99a is not lighted, the indicator 99a is turned on, and tilt correction mode is set (step S1134).

Next, copy start is checked according to on-edge of the start key 96 (step S1135). If on-edge of the start key 96 to start copy operation is detected (YES at step S1135), it is; checked whether the empty sensor 544 (not shown) is activated or not (step S1136). If the empty sensor is not activated, scan start request is output (step S1137). On the other hand, if the empty sensor is activated, documents are put on the tray 510, and the document feeder start request is output (step S1138).

Figure 64A:
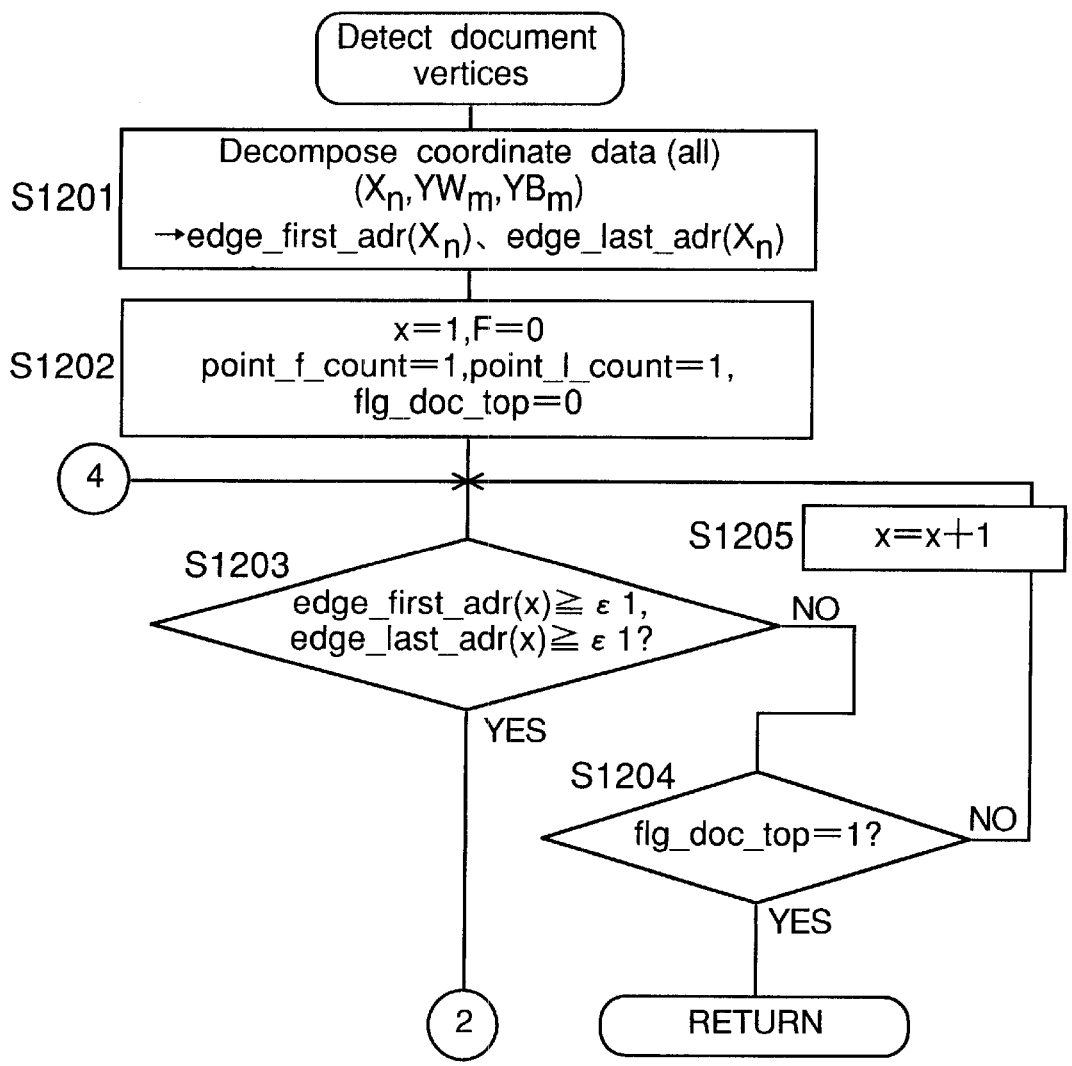
FIGS. 64A, 64B and 64C are flowcharts of detection of document vertices.
Figure 64B:
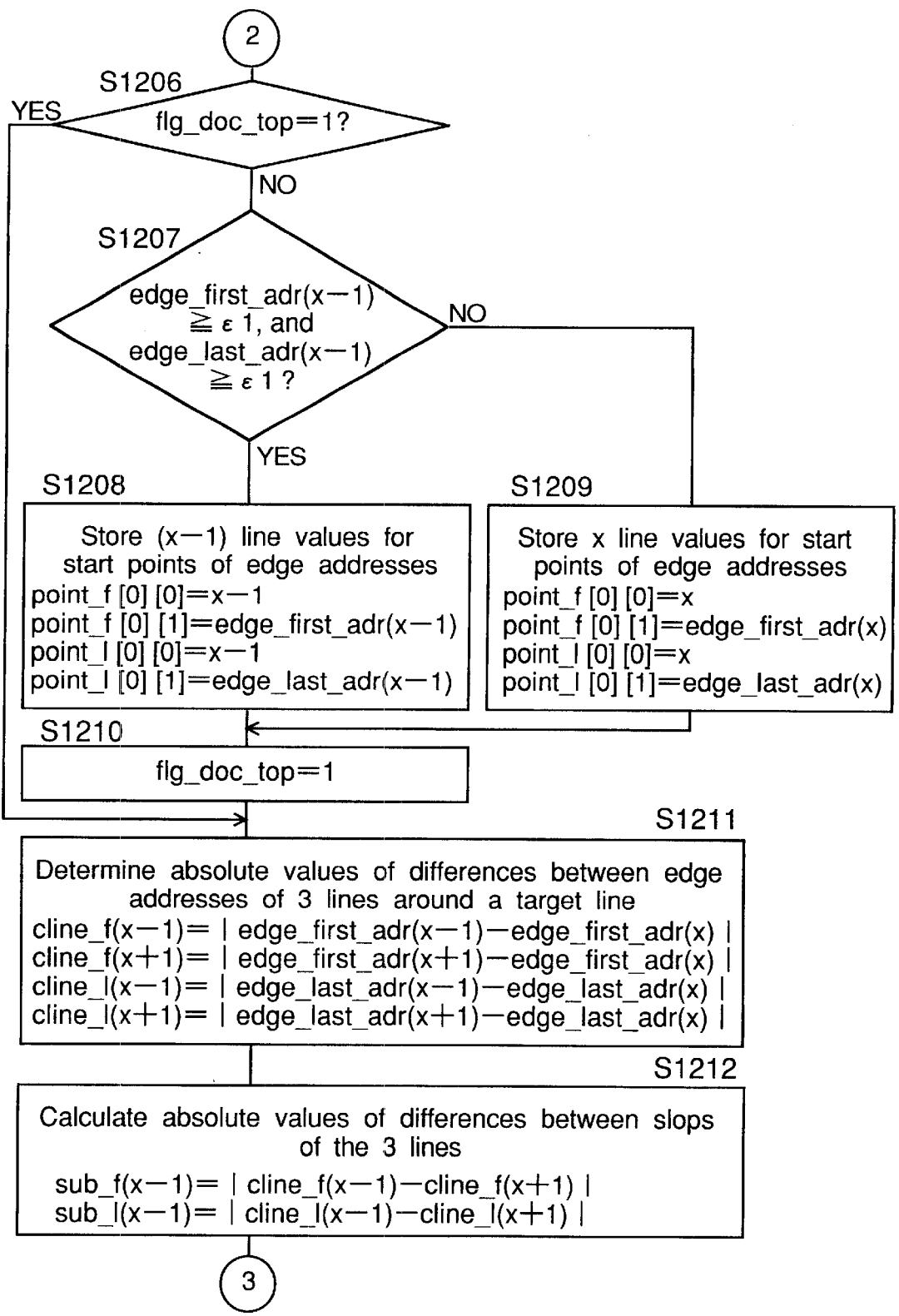
Figure 64C:
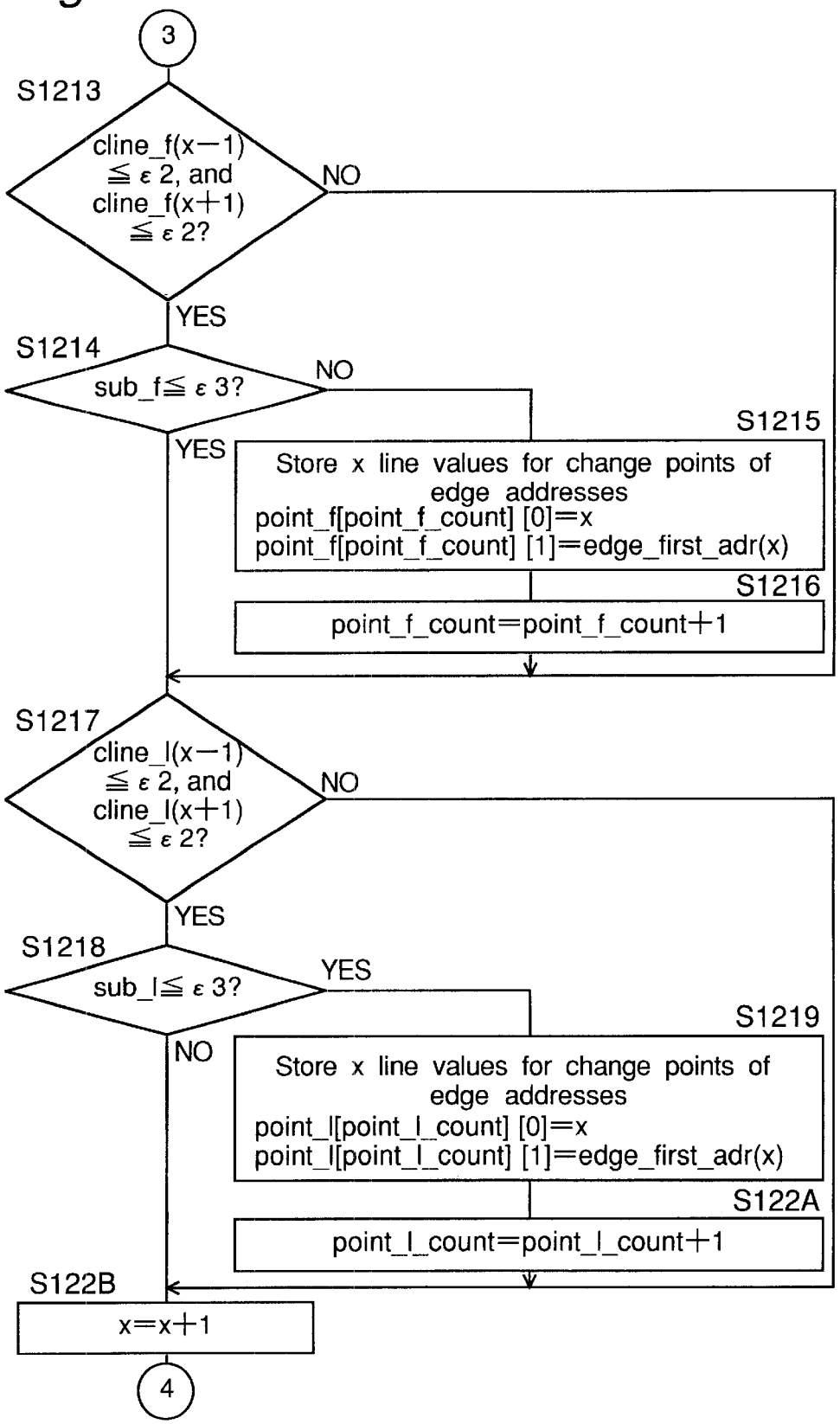

FIGS. 64A, 64B and 64C are flowcharts of document vertices detection (step S1020 in FIG. 62). First, coordinate data of a pair of +EDGE and −EDGE coordinates are decomposed (step S1201).

$$(X_n, YW_m, YB_m) \rightarrow \text{edge\_first\_adr}(X_n), \text{edge\_last\_adr}(x_n),$$

wherein edge_first_adr($X_n$) is +EDGE coordinate of $X_n$ line and edge_last_adr($X_n$) is −EDGE coordinate of $X_n$ line.

Next, lines on which edges are not yet detected are extracted. Variables x, F, point_f_count, point_i_count, and flag flg_doc_top are initialized first (step S1202). Then, the processing is started from a line of x=1. At step S1203, it is checked whether both of edge_first_adr(x) and edge_last_adr(x) are equal or larger than $\epsilon 1$ or not. It is appropriate that the value $\epsilon 1$ is the address in Y direction of the position of the document scale. If both of edge_first_adr(x) and edge_last_adr(x) are equal or larger than $\epsilon 1$, it is decided that an edge is detected, and the flow proceeds to step S1206. If at least one of edge_first_adr(x) and edge_last_adr(x) is smaller than $\epsilon 1$, it is decided that edges have not yet been detected on the line. Then, flag, flg_doc_top, which indicates the detection of the top of the document is checked (step S1204). If the top of the document has not yet been detected (NO at step S1204), x is incremented by one (step S1205), and the flow returns to step S1203 to repeat the processings of steps S1203–S1204. If the document top is detected (YES at step S1204), the flow returns to the main flow.

Next, the processing of the document top is explained. First, the flag, flg_doc_top, which represents detection of document top is checked (step S1206). If the document top has not yet been detected, it is checked next whether both edge addresses of edge_first_adr(x−1) and edge_last_adr(x−1) of (x−1) line not yet checked are equal or larger than $\epsilon 1$ or not (step S1207). If the two edge addresses are equal or larger than $\epsilon 1$, the following values are stored in the array point_f and point_l for each vertex as start points for detecting segments of edge addresses (step S1208).

point_f[0][0]=x−1, point_f[0][1]=edge_first_adr(x−1), point_l[0][0]=x−1, (20)

and point_l[0][1]=edge_last_adr(x−1).

On the other hand, at least one of two edge addresses are equal or larger than $\epsilon 1$, the following values of x line are stored, in the array point_f and point_l for each vertex as start points for detecting segments of edge addresses (step S1209).

point_f[0][1]=x, point_f[0][1]=edge_first_adr(x), point_l[0][0]=x, (21)

and point_l[0][1]=edge_last_adr(x).

Then, the flag, flg_doc_top, is set to 1 (step S1210), and the flow proceeds to step S1211. If the document top is decided to be detected (YES at step S1206), the flow proceeds readily to step S1211.

Next, detection of the change in tilt (or detection of segment or vertex) is explained. First, absolute values of differences between first edge address edge first_adr(x−1), edge_first_adr(x+1) and last edge address edge_last_adr (x−1), edge_last_adr(x+1) of lines (x−1) and (x+1) and the counterparts of a target line x are calculated according to Eqs. (22) (step S1211).

$$cline\_f(x-1)=|edge\_first\_adr(x-1)-edge\_first\_adr(x)|,$$

$$cline\_f(x+1)=|edge\_first\_adr(x+1)-edge\_first\_adr(x)|,$$

$$cline\_l(x-1)=|edge\_last\_adr(x-1)-edge\_last\_adr(x)|, \quad (22)$$

and $$cline\_l(x+1)=|edge\_last\_adr(x+1)-edge\_last\_adr(x)|.$$

Next, according to Eqs. (23), absolute values of differences of slope between the successive three lines are calculated (step S1212).

$$sub\_f=|cline\_f(x-1)-cline\_f(x+1)|,$$

and $$sub\_l=|cline\_l(x-1)-cline\_l(x+1)|. \quad (23)$$

Next, it is checked whether both of absolute values cline_f(x−1) and cline_f(x+1) between the first edge addresses are smaller than $\epsilon 2$ or not (step S1213). It is appropriate that the value of $\epsilon 2$ is about 2 mm. If at least one of absolute values cline_f(x−1) and cline_f(x+1) is not smaller than $\epsilon 2$ (NO at step S1213), the segment is decided to be substantially parallel to the main scan direction, and the flow proceeds readily to step S1217. On the other hand, if both absolute values cline_f(x−1) and cline_f(x+1) are smaller than $\epsilon 2$ (YES at step S1213), each first edge address is decided not to be changed sharply, and the segment is decided not to be in parallel to the main-scan direction. Thus, the flow proceeds to step S1214, and in order to confirm whether the address exists along the same segment, it is checked whether absolute value sub_f of difference of the slope of first edge addresses calculated at step S1212 is equal to or smaller than $\epsilon 3$ (step S1214). It is appropriate that the value of $\epsilon 3$ is about 8 dots. If sub_f is larger than $\epsilon 3$ (NO at step S1214), it is decided that the slope of the first edge address is changed, and the vertex setting is performed (step S1215). That is, the line number x of the target line and the first edge address, edge_first_adr(x), are stored in an array, point_f, for first edge vertex (step S1215). Then, the counter, point_f_count, of the vertices of first edge is incremented (step S1216). Then, the flow proceeds to step S1217. On the other hand, if absolute value sub_f is equal to or smaller than $\epsilon 3$ (YES at step S1214), the slope of the first edge address is not changed sharply, and it is decided that the address is not a vertex of a side of the document. Thus, the flow proceeds readily to step S1217.

Similarly, it is checked next whether both of absolute values, cline_l(x−1) and cline_l(x+1), between the last edge addresses are smaller than $\epsilon 2$ or not (step S1217). If at least one of the absolute values, cline_l(x−1) and cline_l (x+1), is not smaller than $\epsilon 2$ (NO at step S1217), the segment is decided to be substantially parallel to the main scan direction, and the flow proceeds readily to step S1221. On the other hand, if both absolute values, cline_l(x−1) and cline_l(x+1), are smaller than $\epsilon 2$ (YES at step S1217), each last edge address is decided not to be changed sharply, and the segment is decided not to be in parallel to the main scan direction. Thus, the flow proceeds to step S1218, and in order to confirm whether the address exists along the same segment, it is checked whether absolute value sub_l of difference of the slope of last edge addresses calculated at step S1212 is equal to or smaller than $\epsilon 3$ (step S1218). If sub_l is larger than $\epsilon 3$ (NO at step S1218), it is decided that the slope of the last edge address is changed, and the vertex setting is performed (step S1219). That is, the line number x of the target line and the last edge address, edge_first_adr(x), are stored in an array, point_l, for last edge vertex (step S1219). Then, the counter, point_l_count, of the vertices of first edge is incremented (step S1220). Then, the flow proceeds to step S122B. On the other hand, if absolute value sub_l is equal to or smaller than $\epsilon 3$ (YES at step S1218), the slope of the last edge address is not changed sharply, and it is decided that the address is not a vertex of a side of the document. Thus, the flow proceeds readily to step S122A. At step S122B, the line number x of target line is incremented, and the flow returned to step S1203 for a new target line.

Figure 65A:
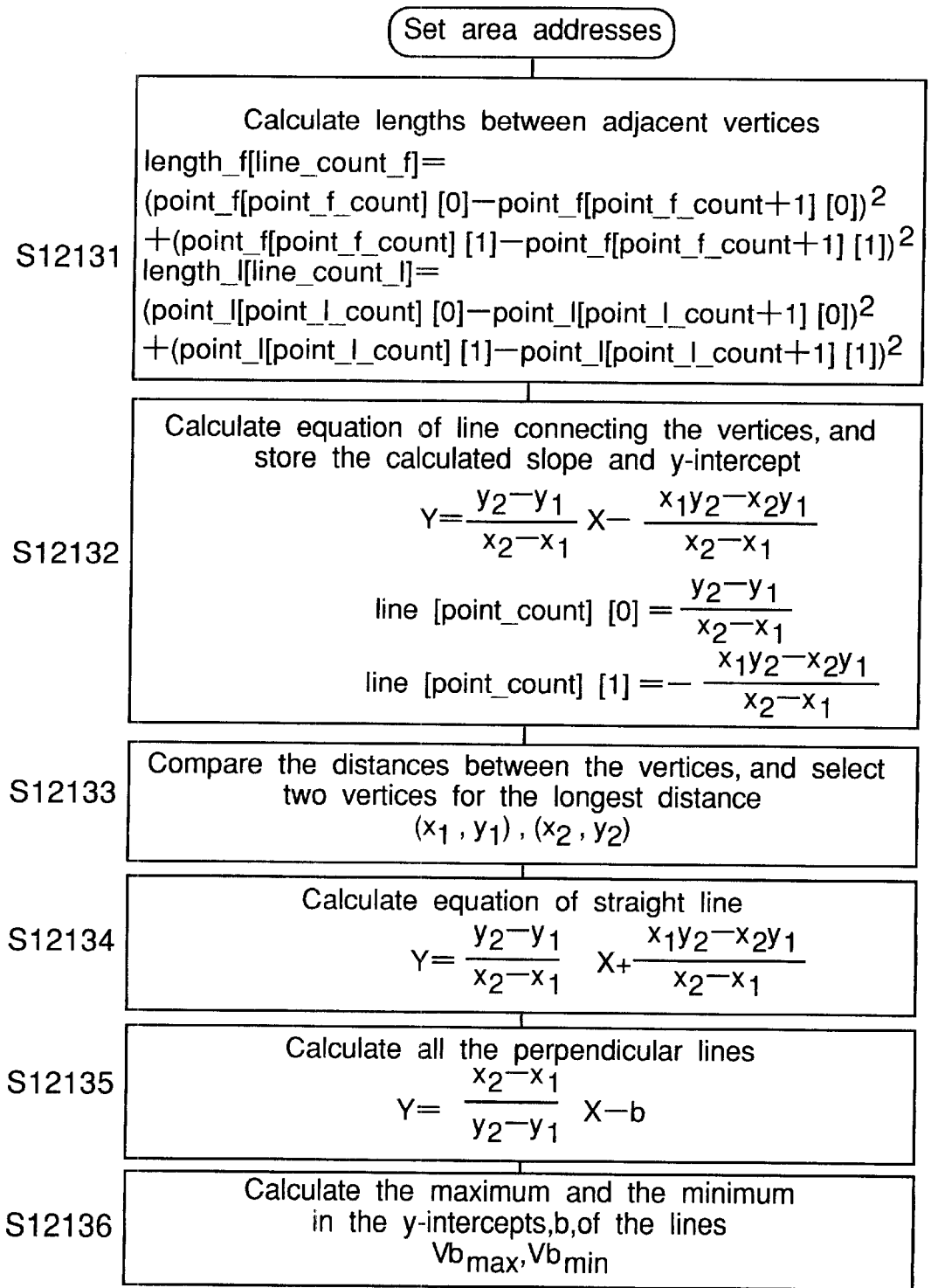
FIGS. 65A and 65B are flowcharts of area address setting.
Figure 65B:
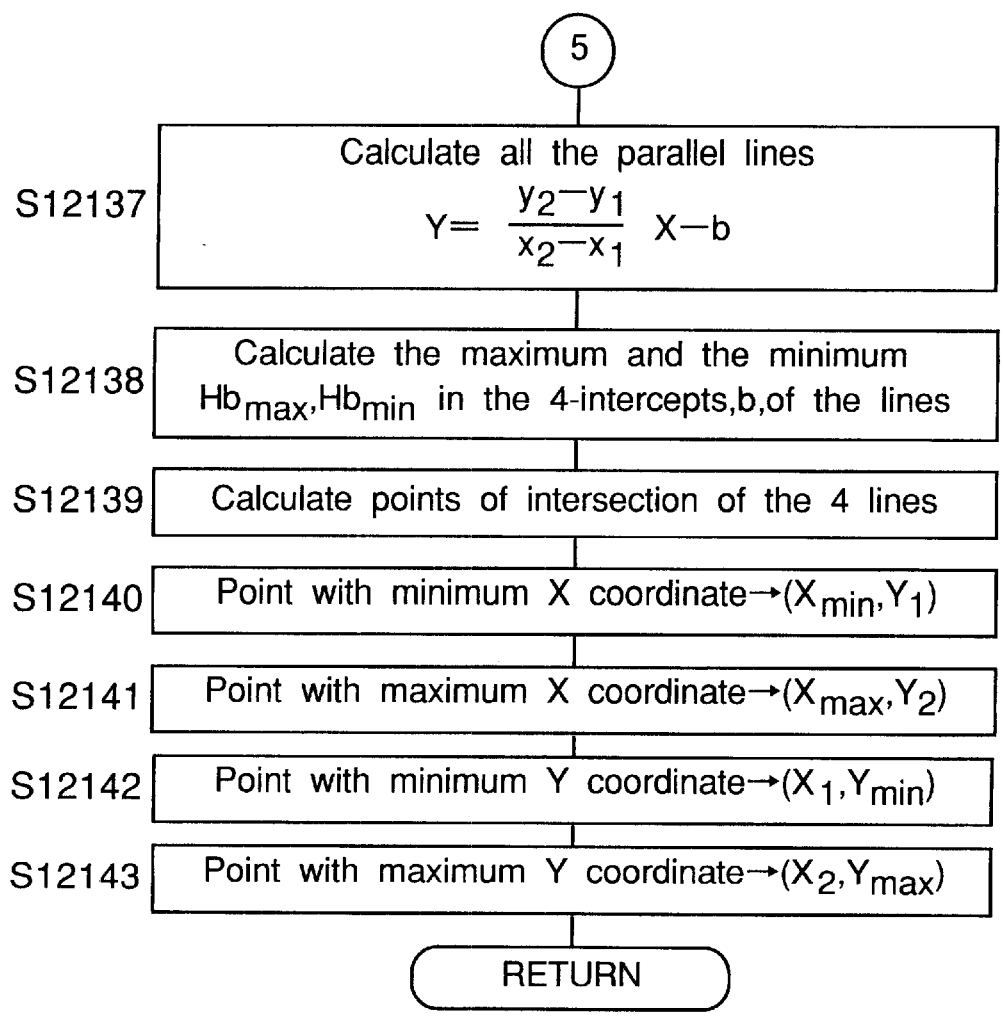

FIGS. 65A and 65B are flowcharts of setting of coordinates of four points which define a document area according to the detected segments (step S1021 in FIG. 62). In this setting, a rectangular document area including the extracted segments is set.

First, lengths between vertices or lengths of segments are calculated (step S12131). Because the distances are calculated for comparing them, a sum of squares of differences in x and y directions is calculated, as shown below. The adjacent vertices represent adjacent vertices of first and last edges including the first vertex of first edge (point_f[0][0], point_f[0][1]) and that of last edge (point_l[0][0], point_l[0][1]), and the last vertex of first; edge (point_f[0][0], point_f[0][1]) and that of last edge (point_l[0][0], point_l[0][1]).

$$length\_f[line\_count\_f]=(point\_f[point\_f\_count][0]-point\_f[point\_f\_count+1][0])^2+(point\_f[point\_f\_count][1]-point\_f[point\_f\_count+1][1])^2,$$

$$length\_l[line\_count\_l]=(point\_l[point\_l\_count][0]-point\_l[point\_l\_count+1][0])^2+(point\_l[point\_l\_count][1]-point\_l[point\_l\_count+1][1])^2,$$

$$length\_f[0]=(point\_l[0][0]-point\_f[0][0])^2+(point\_l[0][1]-point\_f[0][1])^2, \quad (24)$$

and $$length\_l[0]=(point\_l[point\_l\_count][0]-[point\_f[point\_f\_count][0])^2+(point\_l[point\_l\_count][1]-[point\_f[point\_f\_count][1])^2.$$

Next, equations of straight lines connecting the vertices are obtained for all the segments, and the slope and the intercept thereof are stored (step S12132). The equations of straight lines are as follows:

$$Y=(y_b-y_a)/(x_b-x_a)*X-(x_ay_b-x_by_a)/(x_b-x_a), \quad (25)$$

wherein the slope is $(y_b-y_a)/(x_b-x_a)$ and the intercept is $-(x_ay_b-x_by_a)/(x_b-x_a)$. That is, line[point_count][0]=$(y_b-y_a)/(x_b-x_a)$, and line[point_count][1]=$(x_ay_b-x_by_a)/(x_a-x_b)$.

Next, the distances between the vertices are calculated, and two vertices $(x_1, y_1)$, $(x_2, y_2)$ of the longest distance are selected (step S12133). Then, an equation of straight line connecting the selected two vertices is calculated as follows (step S12134).

$$Y=(y_2-y_1)/(x_2-x_1)*X-(x_1y_2-x_2-y_1)/(x_2-x_1), \quad (26)$$

wherein the slope is $(y_2-y_1)/(x_2-x_1)$ and the intercept is $(x_1y_2-x_2y_1)/(x_2-x_1)$. Thus, the longest segment (side) of the document is determined. The longest side is determined even if the document is nonrectangular.

Next, in order to determine the document area, equations of all straight lines perpendicular to the segments calculated at step S12134 are extracted by using the slope and the y-intercept stored at step S12132 (step S12135). An equation of the perpendicular segments is as follows:

$$Y=(x_2-x_1)/(y_2-y_1)*X-b. \quad (27)$$

Then, the maximum $Vb_{max}$ and the minimum $Vb_{min}$ are calculated in the y-intercepts, b, of the segments extracted at step S12134 (step S12136).

Further, equations of all straight lines in parallel to the segments calculated at step S12134 are extracted by using the slope and the y-intercept stored at step S12132 (step S121337). An equation of the parallel segments is as follows:

$$Y=(y_2-y_1)/(x_2-x_1)*X-b, \quad (28)$$

Then, the maximum $Hb_{max}$ and the minimum $Hb_{min}$ are calculated in the y-intercepts, b, of the segments extracted at step S12136 (step S12138).

Thus, the equations of the four segments enclosing the document area are calculated. The perpendicular segments are as follows:

$$Y=(x_2-x_1)/(y_2-y_1)*X-Vb_{max}, \quad (29)$$

and $$Y=(x_2-x_1)/(y_2-y_1)*X-VB_{min}. \quad (30)$$

On the other hand, the parallel segments are as follows:

$$Y=(y_2-y_1)/(x_2-x_1)*X-Vb_{max}, \quad (31)$$

and $$Y=(y_2-y_1)/(x_2-x_1)*X-Vb_{min}. \quad (32)$$

Then, the intersections of the perpendicular and parallel segments (29)–(32) having the maximum and minimum y-intercepts are calculated to determine the coordinates of the four points as a document area (step S12139). Next, the maxima and the minima of the X and Y coordinates in the coordinates of the four points are extracted, and they are denoted as $(X_{min}, Y_1)$, $(X_{max}, Y_2)$, $(X_1, Y_{min})$, and $(X_2, Y_{max})$ (step S12140–S12144). Thus, the document area is detected.

Figure 66:
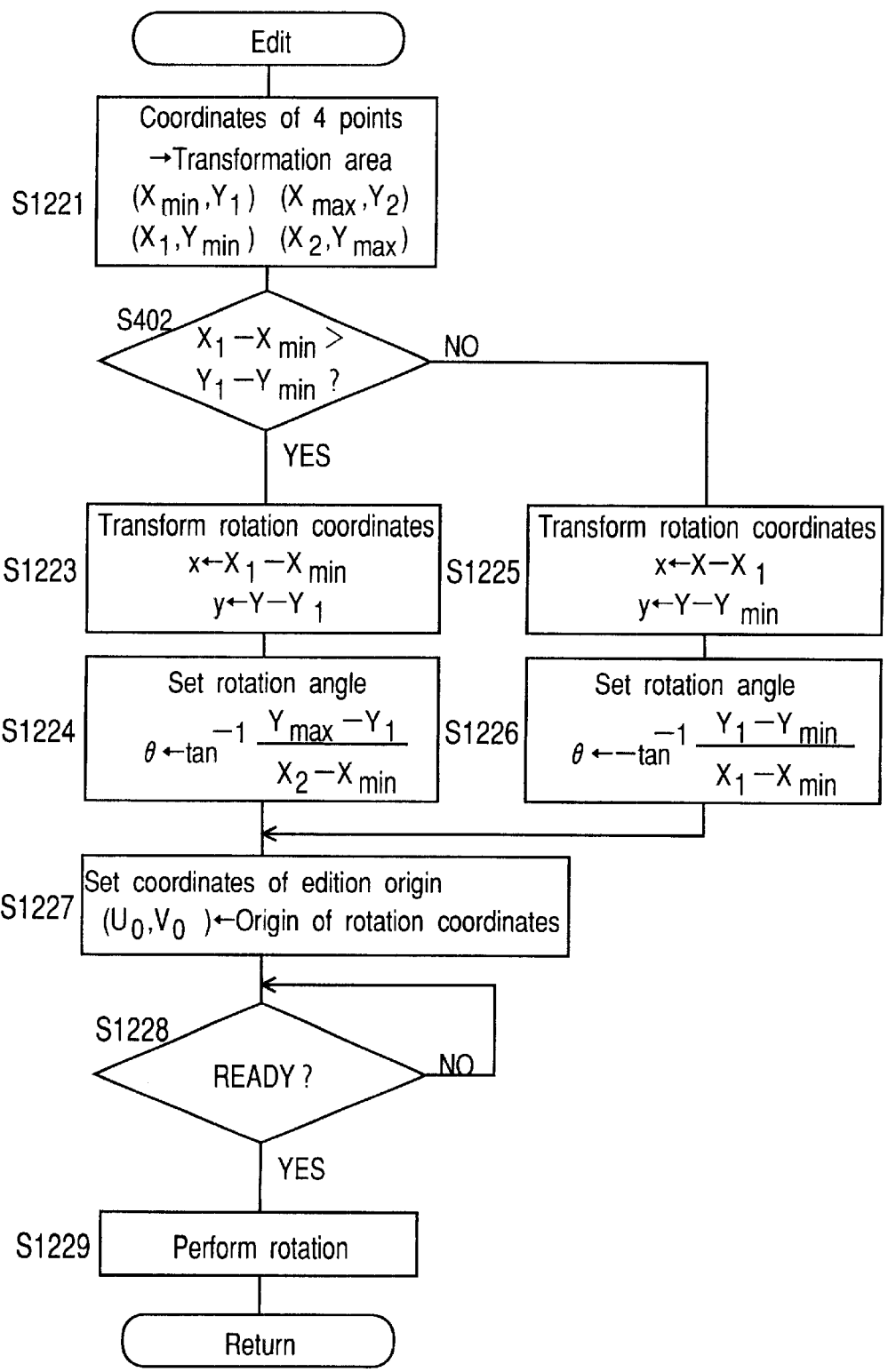
FIG. 66 is a flowchart of edition.

FIG. 66 is a flowchart of the edition (step S1022 in FIG. 62) on the setting of data and commands by the CPU for the rotation processor 310 explained above with reference FIGS. 50 and 51. First, the coordinates of the four points extracted at the area address setting (step S1021 in FIG. 62) are set to coordinates of a transformation area (step S1221). Next, by comparing the distances between two thereof, the inclination direction of the document is decided, the rotation coordinates are transformed, and the rotation angle is set. The setting is performed according to the rules shown in FIGS. 58–61.

If $X_1-X_{min}>Y_1-Y_{min}$ (YES at step S1222), the origin of the rotation coordinate (x, y) is set to $(X_{min}, Y_1)$ (step S1223), and the rotation angle θ is set to $\tan^{-1}((Y_{max}-Y_1)/(X_2-X_{min}))$ (the rotation direction is counterclockwise) (step S1224). On the other hand, if $X_1-X_{min}<Y_1-Y_{min}$ (NO at step S1222), the origin of the rotation coordinate (x, y) is set to $(X_1, Y_{min})$ (step S1225), and the rotation angle θ is set to $-\tan^-(Y_1-Y_{min1})/(X_{min}-X_1))$ (step S1226). By using the above conditions, the positions of the sides and the reference coordinates which are used as reference of correction become the same for correction at a small rotation angle smaller than 45°. Next, the origin of the rotation coordinates is set to the edition origin $(u_o, v_o)$ (step S1227). Then, if the rotation is ready (YES at step S1228), the rotation is performed according to the above setting (step S1229).

Figure 67:
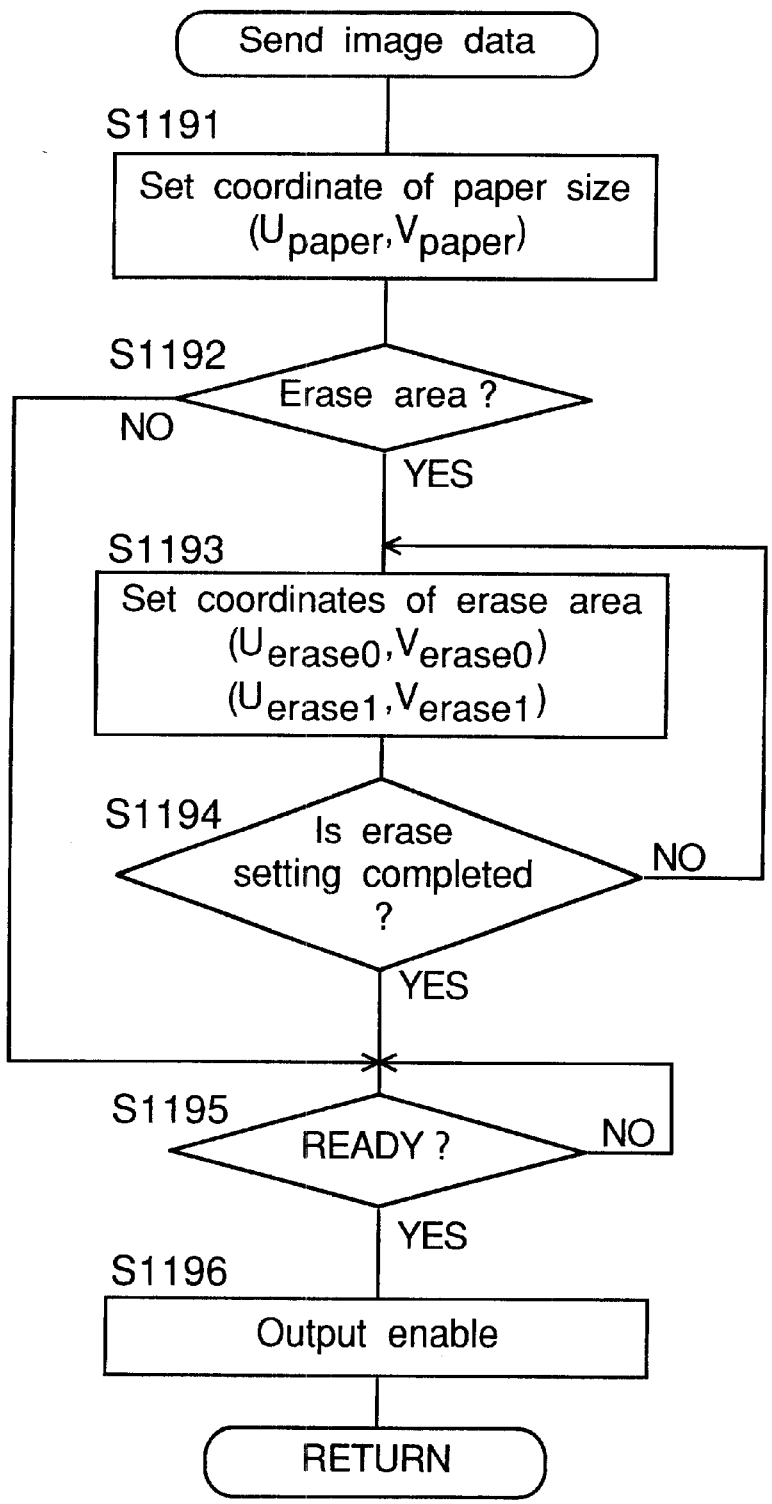
FIG. 67 is a flowchart of sending image data.

FIG. 67 is a flowchart of sending image data (step S1019 in FIG. 62). First, coordinates $(U_{paper}, V_{paper})$ of paper size are set (step S1191). Next, it is decided whether there is an area which is needed to be erased or not (step S1192). If there is an area needed to be erased, two points of erase area coordinates $(U_{erase0}, V_{erase0})$, $(U_{erase1}, V_{paper1})$ are set (step S1193). If it is decided that erase setting is completed (YES at step S1194), and the image output is ready (YES at step S1195), the image data output is enabled (step S1196) to allow data transmission to the printer.

Figure 68:
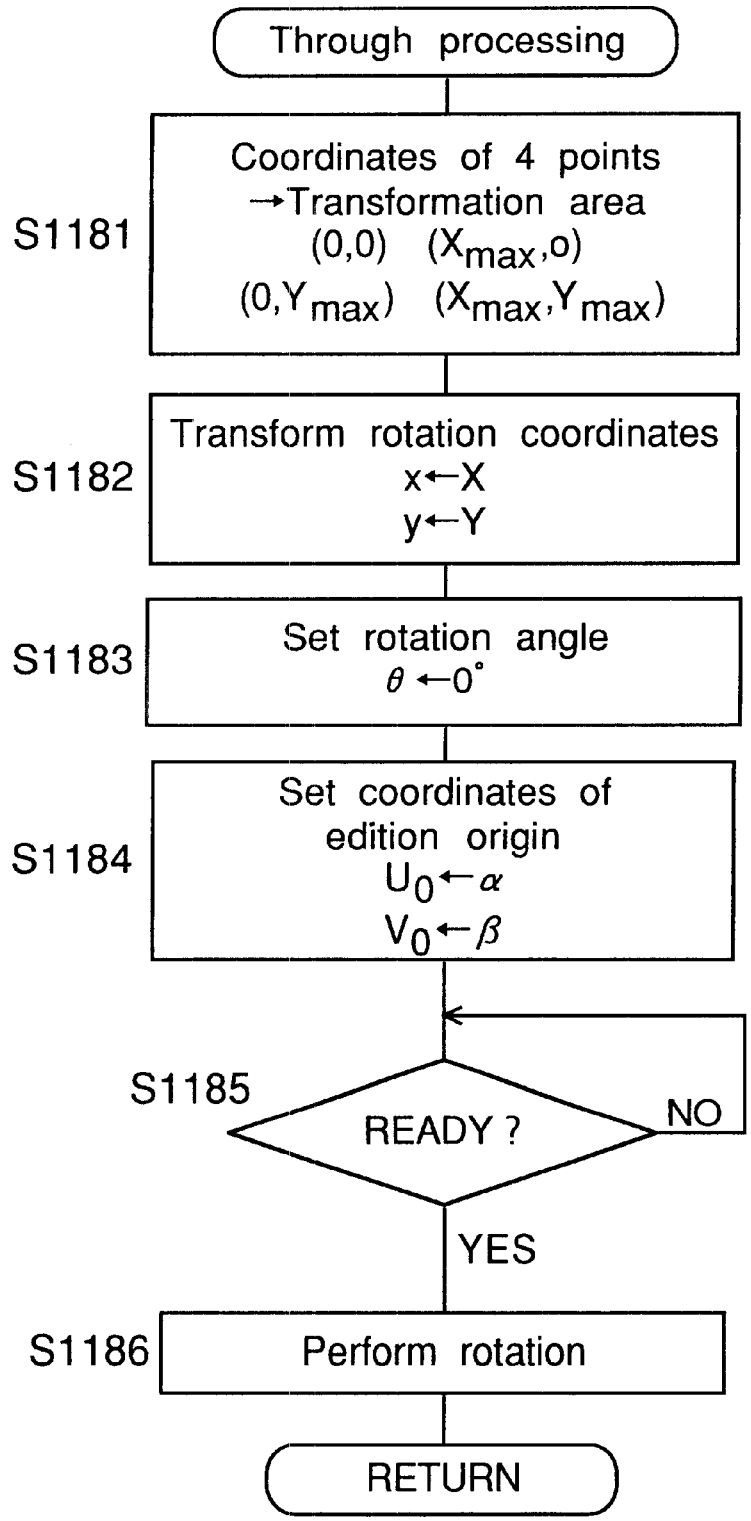
FIG. 68 is a flowchart of through processing.

FIG. 68 is a flowchart of through processing (step S1018 in FIG. 62) which is performed when the mode is not the tilt correction mode. First, coordinates of the four points are set as coordinates of transformation area (step S1181). Next, the rotation coordinates are set to have the origin of the original image (step S1182), the rotation angle is set to 0° (step S1183), and the coordinates $(u_o, v_o)$ of the edition origin are set to $(α,β)$ (step S1184). If the preparation is completed (step S1185), the rotation is performed according to the above setting (step S1186).

As explained above, even if a nonrectangular document is read, the document area can be determined according to the detected longest side of the document. Then, even for a nonrectangular document, image data can be rotated to the normal position according to the detected tilt and the document area, without deficit image.

H. Copying Machine According to a Third Embodiment

Next, a digital copying machine according to the third embodiment of the invention is explained. The digital copying machine is the same as that of the second embodiment except the detection of document position, and only the different point is explained below.

In this embodiment, when the tilt and segments of a document are detected, the extracted segments are grouped. That is, segments consisting of detected continuous edges are extracted, and the segments are classified by the magnitude of slope. For example, grouping is performed as groups having the substantially same slope and a slope perpendicular thereto. Then, a sum of the lengths of the segments is calculated for each group, and a group having the largest sum is selected, and the slope of the selected group is set to the slope of the document. Further, the four vertices of the document area are determined as an area including all the edges.

An example which uses the above system is explained below. When a document is read, the document is put on the platen glass 19. In FIG. 54, an area (white area) except an image reading area represented with hatching represents a document 520. As explained above, the scanner 11 is moved in main scan direction shown in FIG. 55 while reading the image, and the data are transmitted in the unit of line according to the sequence shown in FIG. 45 to be stored in the input page memory 302 in the memory unit 30. As the same time, document edges are detected for each line, and open circles in FIG. 55 represent edges (+EDGE) changing from black to white, and solid circles represent edges (−EDGE) changing from white to black. In the stack memory 308, line number $X_n$, count $YW_m$ of +EDGE and $YB_m$ of −EDGE are stored as a set.

Figure 69:
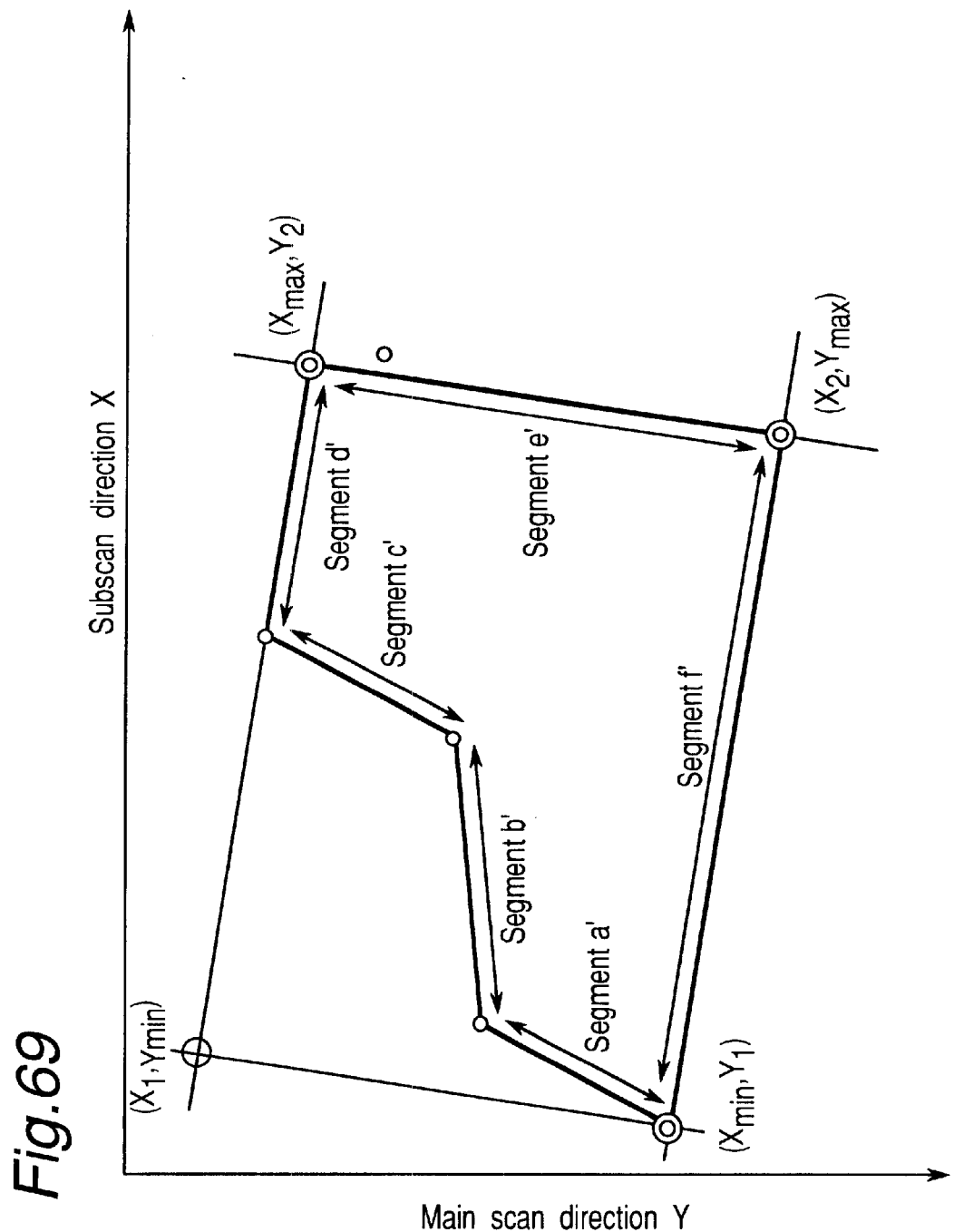
FIG. 69 is a diagram for explaining setting of document area in a third embodiment.

Then, as shown in FIG. 56, change in slope between coordinate data for each document edge is detected according to the coordinate data stored in the stack memory 308, and segments connecting the detected change points where the slope is changed are extracted. Then, the extracted segments are divided into groups having the same and perpendicular slopes, and a group having the largest sum of the segment length is selected. In an example shown in FIG. 69, the first group consists of segments d', e' and f', the second group consists of segments a' and c' and the third group consists of segment b'. Then, the first group is selected as the group having the largest sum of the segment length. Then, the coordinates of the four points are detected, and various settings are performed based on the result. The four coordinates define the document area (large circles in FIG. 69), the tilt direction of the document and the rotation angle. Then, the rotation and the parallel shift of the image data are performed, and an image is formed by the printer according to the image data.

Figure 70B:
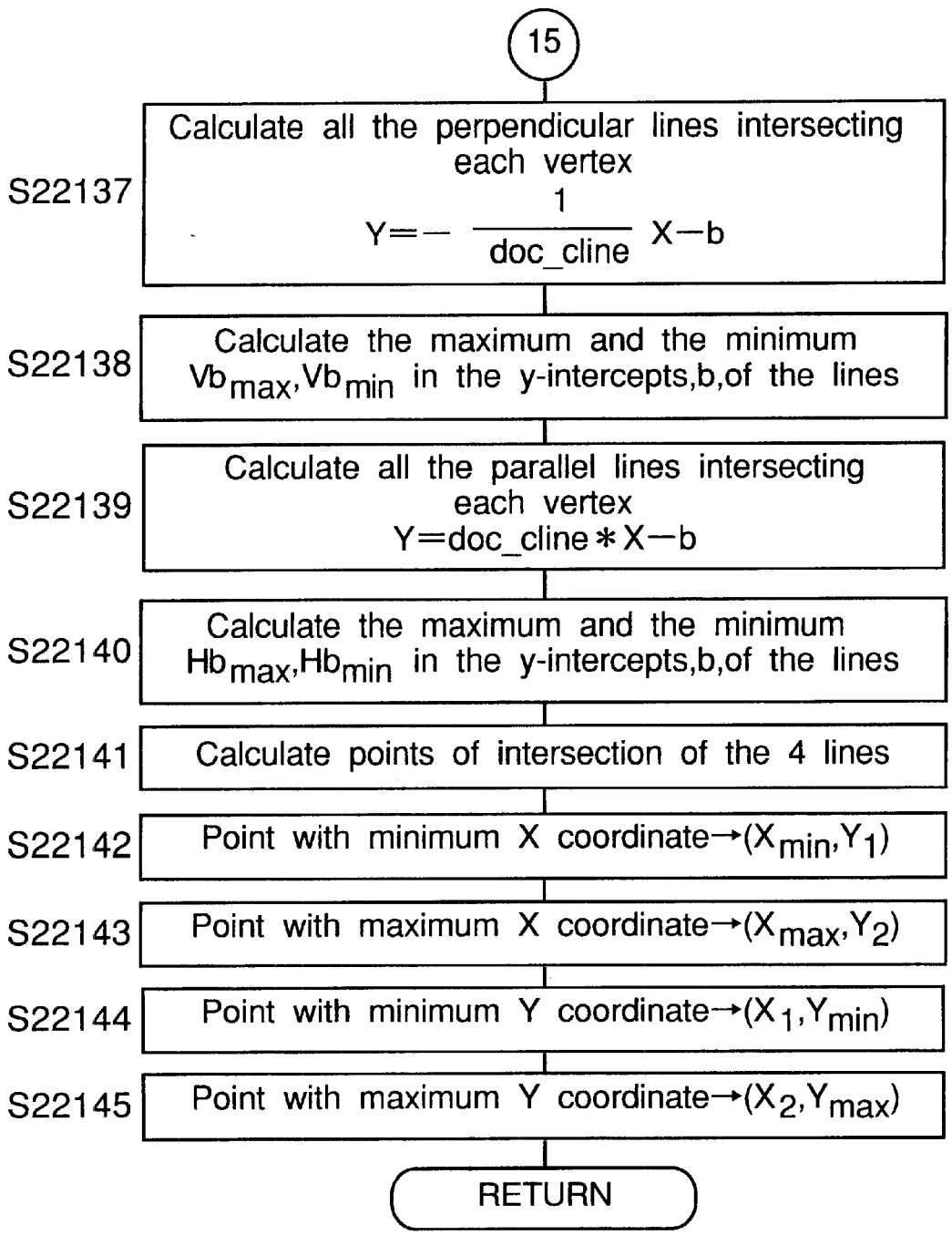

Next, the operation mode is explained in detail. It is different only on the area address setting (step S1021 in FIG. 62) shown in FIGS. 70A and 70B from the counterpart of the second embodiment, and the d. In the area address setting, the coordinate addresses of the four points which define the document area are set according to the detected vertices of the document (step S1020 in FIG. 62).

First, lengths between adjacent vertices or lengths of segments are calculated (step S22131). Because the distances are calculated for comparing them, a sum of squares of differences in x and y directions is calculated, as shown below. The adjacent vertices represent adjacent vertices of first and last edges including the first vertex of first edge (point_f[0][0], point_f[0][1] and that of last edge (point_l[0][0], point_l[0][1]), and the last vertex of first edge (point_f[0][0], point_f[0][1]) and that of last edge (point_l[0][0], point_l[0][1]).

$$\text{length\_f}[\text{line\_count\_f}]=(\text{point\_f}[\text{point\_f\_count}][0]-\text{point\_f}[\text{point\_f\_count+1}][0])^2+(\text{point\_f}[\text{point\_f\_count}][1]-\text{point\_f}[\text{point\_f\_count+1}][1])^2,$$

$$\text{length\_l}[\text{line\_count\_l}]=(\text{point\_l}[\text{point\_l\_count}][0]-\text{point\_l}[\text{point\_l\_count+1}][0])^2+(\text{point\_l}[\text{point\_l\_count}][1]-\text{point\_l}[\text{point\_l\_count+1}][1])^2,$$

$$\text{length\_f}[0]=(\text{point\_l}[0][0]-\text{point\_f}[0][0])^2+(\text{point\_l}[0][1]-\text{point\_f}[0][1])^2, \quad (33)$$

and $$\text{length\_l}[0]=(\text{point\_l}[\text{point\_l\_count}][0]-\text{point\_f}[\text{point\_f\_count}][0])^2+(\text{point\_l}[\text{point\_l\_count}][1]-\text{point\_f}[\text{point\_f\_count}][1])^2.$$

Next, equations of straight lines connecting the vertices are obtained for all the segments, and the slope and, the intercept thereof are stored (step S22132). The equations; of straight lines are as follows:

$$Y=(y_b-y_a)/(x_b-x_a)*X-(x_a y_b-x_b y_a)/(x_b-x_a), \quad (34)$$

wherein the slope is $(y_b-y_a)/(x_b-x_a)$ and the intercept is $-(x_a y_b-x_b y_a)/(x_b-x_a)$. That is, line[point_count][0]=$(y_b-y_a)/(x_b-x_a)$, and line[point_count][1]=$(x_a y_b-x_b y_a)/(x_b-x_a)$.

Next, the segments obtained at step S22132 are grouped according to the obtained equations of straight lines (slopes and y-intercepts) so that segments having the same slope and a slope perpendicular thereto belongs to one group (step S22133) Further, at the same time, a representative slope is stored for each group.

$$\text{line}[\text{point\_count}][0]\approx\text{line}[\text{point\_count+1}][0], \quad (35)$$

and $$\text{line}[\text{point\_count}][0]\approx -1/\text{line}[\text{point\_count+1}][0].$$

$$\text{group}[\text{point\_count}][0]\approx\text{line}[\text{point\_count}][0]. \quad (36)$$

Then, a sum of the lengths of the segments is calculated for each group and stored in group[group_count)[1] (step S22134).

$$\text{group}[\text{group\_count}][1]=\text{a sum of segment lengths in each group}. \quad (37)$$

Next, the sums of the lengths of the segments are compared with each other, and a group having the largest sum is extracted. Then the group name thereof, group_count, is stored at max group (step S22135).

$$\text{max\_group}=\text{group\_count}. \quad (38)$$

Then, the representative slope group stored at step S22133 of the extracted group [max_group][0] is set to the slope of the document doc_line (step S22136).

$$\text{doc\_line}=\text{group}[\text{max\_group}][0]. \quad (39)$$

Next, the document area is determined. In order to determine the document area, equations of all straight lines perpendicular to the line having the slope doc_cline and passing the detected vertices are calculated (step S22137). An equation of the perpendicular straight line is as follows:

$$Y=-(\text{doc\_line})^{-1}*X-b. \quad (40)$$

Then, the maximum $Vb_{max}$ and the minimum $Vb_{min}$ are calculated in the y-intercepts, b, of the segments extracted at step S22137 (step S22138).

Further, equations of all straight lines are calculated which are in parallel to the segments of slope doc_cline determined at step S22136 and which pass through the detected vertices (step S22139). An equation of the parallel straight lines is as follows, and b or y-intercept is determined by assigning coordinates of each vertex to X and Y:

$$Y=\text{doc\_cline}*X-b, \quad (41)$$

Then, the maximum $Hb_{max}$ and the minimum $Hb_{min}$ are determined in the y-intercepts, b, of the segments extracted at step S22139 (step S22140).

Thus, the equations of the four segments enclosing the document area are calculated. Then, by calculating the intersections of the parallel and perpendicular lines having the maximum and minimum y-intercepts, the coordinates of the four points for the document area are determined (step S22141). The perpendicular segments are as follows:

$$Y=-(\text{doc\_cline})^{-1}*X-Vb_{max}, \quad (42)$$

and $$Y=-(\text{doc\_cline})^{-1}*X-Vb_{min}. \quad (43)$$

On the-other hand, the parallel segments are as follows:

$$Y = doc\_cline * X - Vb_{max}, \quad (44)$$

and $$Y = doc\_cline * X - Vb_{min}. \quad (45)$$

Next, the maxima and the minima of the X and Y coordinates in the coordinates of the four points are extracted, and they are denoted as $(X_{min}, Y_1)$, $(X_{max}, Y_2)$, $(X_1, Y_{min})$, and $(X_2, Y_{min})$ (step S22142–S22145). Thus, the document area is detected.

As explained above, even if a nonrectangular document is read, the document area can be determined more precisely by grouping the detected segments according to the slope thereof. Then, even if a nonrectangular document is tilted erroneously, the read image data can be corrected more appropriately.

I. Copying Machine According to a Fourth Embodiment

Next, a digital copying machine according to the fourth embodiment of the invention is explained. The copying machine is substantially the same as that of the second embodiment, except the detection of document area is different. Then, only the different point is explained below.

In this embodiment, when the tilt of a document is detected, the document area and the tilt of the document can be detected appropriately even for a nonrectangular document, and the inclination of the document image is corrected according to the result. Then, a desired copy can be obtained for a nonrectangular document without bothering the position, the tilt of a document on the platen glass or the shape of the document.

Figure 71A:
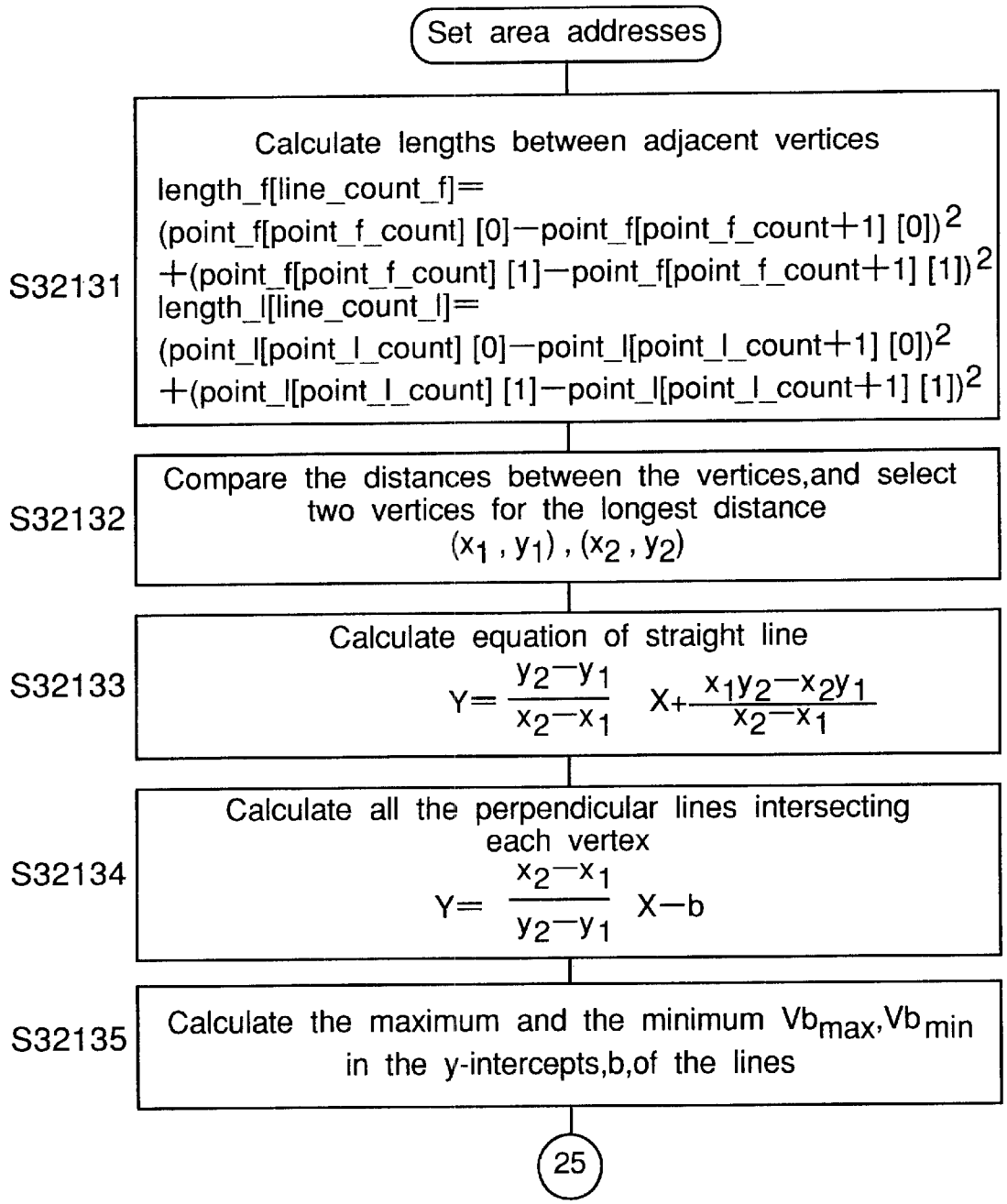
FIGS. 71A and 71B are flowcharts of area address setting in a fourth embodiment.
Figure 71B:
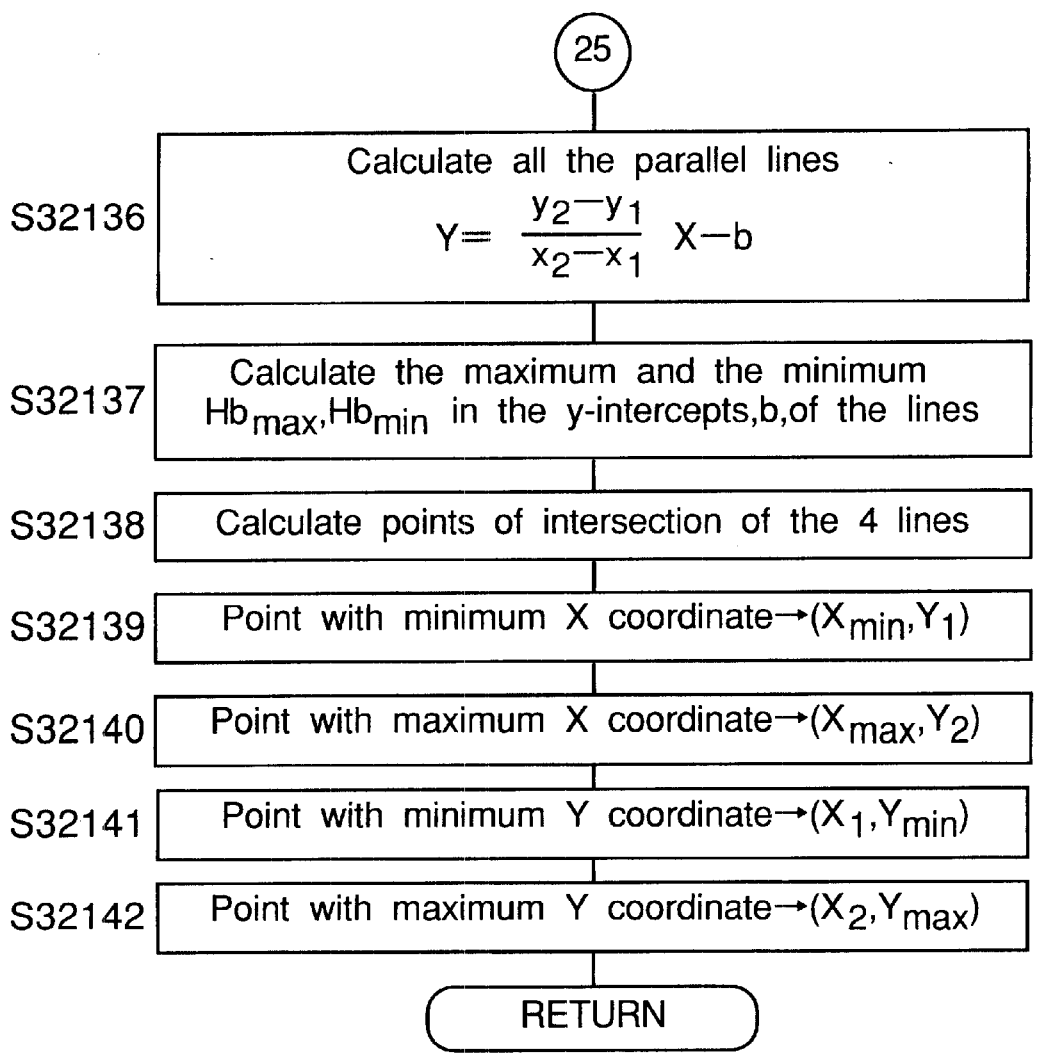

Next, the operation mode is explained in detail. Because the flow is different only on the area address setting (step S1021 in FIG. 62) from the counterpart of the second embodiment. In the area address setting shown in FIGS. 71A and 71B, the coordinate addresses of the four points which defines the document area are set according to the vertices of a document detected at step S1020 in FIG. 62.

First, lengths between vertices or the lengths of segments are calculated. Lengths between adjacent vertices are calculated first (step S32131). Because the distances are calculated for comparing them, a sum of squares of differences in x and y directions is calculated, as shown below. The adjacent vertices represent adjacent vertices of first and last edges including the first vertex of first edge (point_f[0][0], point_f[0][1]) and that of last edge (point_l[0][0], point_l[0][1]), and the last vertex of first edge (point_f[0][0], point_f[0][1]) and that of last edge (point_l[0][0], point_l[0][1]).

length_f[line_count_f]=(point_f[point_f_count][0]-point_f[point_f_count+1][0])²+(point_f[point_f_count][1]-point_f[point_f_count+1][1])², length_l[line_count_l]=(point_l[point_l_count][0]-point_l[point_l_count+1][0])²+(point_l[point_l_count][1]-point_l[point_1_1 count+l][1])², length_f[0]=(point_l[0][0]-point_f[0][0])²+(point_l[0][1]-point_f[0][1])², (46)

and length_l[0]=(point_l[point_l_count][0]-point_f[point_f_count][0])²+(point_l[point_l_count][1]-point_f[point_f_count][1])².

Next, the distances between the vertices are calculated, and two vertices, $(x_1, Y_1)$, $(x_2, y^2)$, of the longest distance are selected (step S32132). Then, an equation of straight line connecting the selected two vertices is calculated as follows (step S32133).

$$Y = (y_2 - y_1)/(x_2 - x_1) * X - (x_1 y_2 - x_2 y_1)/(x_2 - x_1), \quad (47)$$

wherein the slope is $(y_2-y_1)/(x_2-x_1)$ and the intercept is $-(x_1 y_2 - x_2 y_1)/(x_2 x_1)$. Thus, the longest segment (side) of the document is determined. The longest side can be determined even if the document is nonrectangular.

Next, in order to determine the document area, equations of all straight lines perpendicular to the segment calculated at step S32133 and passing the detected vertices are calculated (step S32134). An equation of the perpendicular lines is as follows:

$$Y = (x_2 - x_1)/(y_2 - y_1) * X - b. \quad (48)$$

The y-intercept or b is determined by assigning the coordinates of each vertex to x and Y. Then, the maximum $Vb_{max}$ and the minimum $Vb_{min}$ are calculated in the y-intercepts, b, of the lines (step S32135).

Further, equations of all straight lines in parallel to the lines calculated at step S32133 and passing the detected vertices are extracted (step S32136). An equation of the parallel segments is as follows:

$$Y = (y_2 - y_1)/(x_2 - x_1) * X - b, \quad (49)$$

Then, the maximum $Hb_{max}$ and the minimum $Hb_{min}$ are calculated in the y-intercepts, b, of the segments calculated at step S32136 (step S32137).

Thus, the equations of the four segments enclosing the document area are calculated. The perpendicular segments are as follows:

$$Y = (x_2 - x_1)/(y_2 - y_1) * X - Vb_{max}, \quad (50)$$

and $$Y = (x_2 - x_1)/(y_2 - y_1) * X - Vb_{min}. \quad (51)$$

On the other hand, the parallel segments are as follows:

$$Y = (y_2 - y_1)/(x_2 - x_1) * X - Vb_{max}, \quad (52)$$

and $$Y = (y_2 - y_1)/(x_2 - x_1) * X - Vb_{min}. \quad (53)$$

Then, the intersections of the perpendicular and parallel segments (50)–(53) having the maximum and minimum y-intercepts are calculated and coordinates of the four points as a document area are determined (step S32138). Next, the maxima and the minima of the X and Y coordinates in the coordinates of the four points are extracted, and they are denoted as $(X_{min}, Y_1)$, $(X_{max}, Y_2)$, $(X_1, Y_{min})$ and $(X_2, Y_{max})$ (step S32139–S32143). Thus, the document area is detected.

As explained above, even for a nonrectangular document, the tilt and the document area of the document can be detected correctly be extracting the longest side of the document according to the edge change points. The document area has the slope of the longest side and includes all the edge change points. Then, an appropriate document area can be set even for a nonrectangular document.

J. Copying Machine According to a Fifth Embodiment

Next, a digital copying machine according to the fifth embodiment of the invention is explained. The copying machine is substantially the same as that of the second embodiment, only except the detection of document area is different. Then, only the different point is explained below. In this embodiment, when the document area is determined, the unequal reading pitch is considered.

Figure 72:
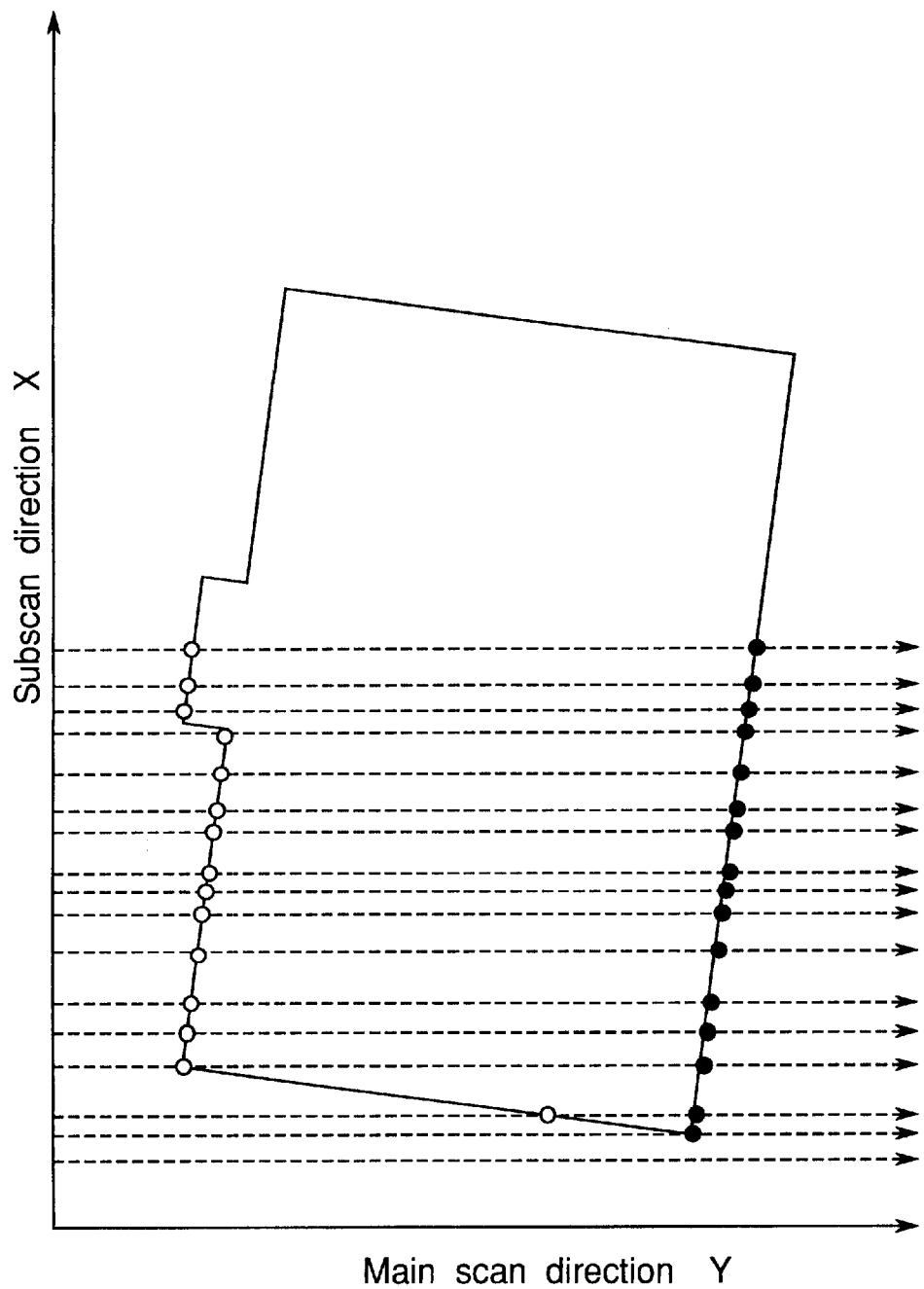
FIG. 72 is a diagram for explaining image reading in a fifth embodiment when sampling pitch is not constant.

When a document is read, it is put on the platen glass 19. In FIG. 54, an area (white area) except an image reading area represented with hatching represents a document 520. In this example, the document 520 is erroneously put at a tilt. In the image reader 100, the scanner 11 is moved in X-axis (subscan) direction shown in FIG. 55, and an image is read in the unit of line with the CCD sensor 17 (refer to positions of dashed lines). As shown in FIG. 55, in an ideal state, the sampling pitch in the subscan direction is constant. However, in an actual case, as shown in FIG. 72, the sampling pitch in, the subscan direction scatters usually due to pitch irregularity of the scanner 11. The sampling is performed at constant time intervals by the timing signal SYNCK_IR of the hardware circuit as shown in FIGS. 48 and 49. However, the action of the scanner 11 accompanies vibrations (pitch irregularity) in the subscan direction.

Edition on the image data read as mentioned above is performed in the memory unit 30. Data from the CCD sensor 17 are transmitted in the unit of line according to the sequence shown in FIG. 45 to be stored in the input page memory 302 in the memory unit 30. At the same time, the document edge detector 304 detects document edges. As explained above with reference to FIG. 55, edges (+EDGE) changing from black to white and edges. (−EDGE) changing from white to black are detected. The two coordinate data are written successively to the stack memory 308 as a pair. In the stack memory 308, line number $X_n$, count $YW_m$ of +EDGE and $YB_m$ of −EDGE are stored as a set, and they are picked up in the order of storage when processed.

Then, as shown in FIG. 56, change in slope is detected between coordinate data for each document edge according to the coordinate data stored in the stack memory 308, and edge change points where the slope is changed are determined. Then, straight lines connecting the edge change points are extracted (refer to segments a, b, c and d in FIG. 56). In FIG. 57, small circles represent edge change points, and bold lines represent detected segments. A change in slope between the coordinate data at the document edges is detected from the coordinate data stored in the stack memory, and segments connecting the detected change points are extracted. Then, segments having a slope equal to or smaller than 45° relative to the X direction (main scan direction) are selected. In the example shown in FIG. 57, segments 520*a*, 520*c*, 520*e* and 520*g* are selected. By selecting segments having a slope equal to or smaller than 45° relative to the X direction, correct slope can be detected even if the reading pitch is unequal. Preferably, the longest segments is selected among the segments having a slope equal to or smaller than 45° relative to the X direction. In the example shown in, FIG. 57, segment 520*a* is selected. Then, aside is selected which is most suitable for setting document area even for a nonrectangular document. In a different way, a segment is selected which has a slope equal to or smaller than 45° relative to the X direction and having a segment perpendicular thereto. In the example shown in FIG. 57, segment 520*a* is selected. Then, erroneous detection of document area can be avoided.

A reason why segments are selected having a slope equal to or smaller than a predetermined angle (45° in this example) relative to the X direction is explained. Because edges are detected at two points on one line, edge detection becomes very coarse for a segment having a slope larger than 45° relative to the subscan direction or equal to or smaller than 45° relative to the main scan direction, as shown in FIGS. 55 and 72. On the other hand, in the sampling for a segment which is near parallel to the subscan direction, address change of detected edges is very small though the position is shifted from the ideal position. Then, in this embodiment, segments are dealt differently according as the slope is equal to or smaller than a predetermined angle or not, or segments having a slope equal to or smaller than a predetermined angle relative to the subscan direction are selected.

The value 45° is a threshold which decides whether a segment is parallel to the main scan direction or to the subscan direction. Then, it is decided whether a slope (angle) of a segment or side is nearer to which of the two lines perpendicular to each other (main scan direction and subscan direction). A usual document is a rectangular document, and the sides are perpendicular to each other. If a document is inclined by 45° relative to the subscan direction, all the sides have angles of 45° relative to the subscan direction. If a side of a document is inclined by 45° relative to the subscan direction, all the sides have angles of 45° relative to the subscan direction. If a side of a document is inclined by an angle larger than 45° relative to the subscan direction, it has an angle smaller than 45° relative to the main scan direction. Further, sides adjacent to the side have an angle smaller than 45° relative to the subscan direction. Then, if sides roughly in parallel to the subscan direction are desirable, sides having an angle equal to or smaller than 45° relative to the subscan direction are searched.

After the slope is detected according to the selected segment as explained above, the coordinates of the four points (large circles in FIG. 57) which define a document area are determined according to intersections of the four straight lines Further, the tilt direction and the rotation angle of the document are determined as the slope of the longest line. Then, the rotation and parallel shift are set according to the above results and performed by the rotation processor 310. The obtained image data are stored in the output page memory 312, and an image is formed by the printer 200 according to the image data.

Figure 73A:
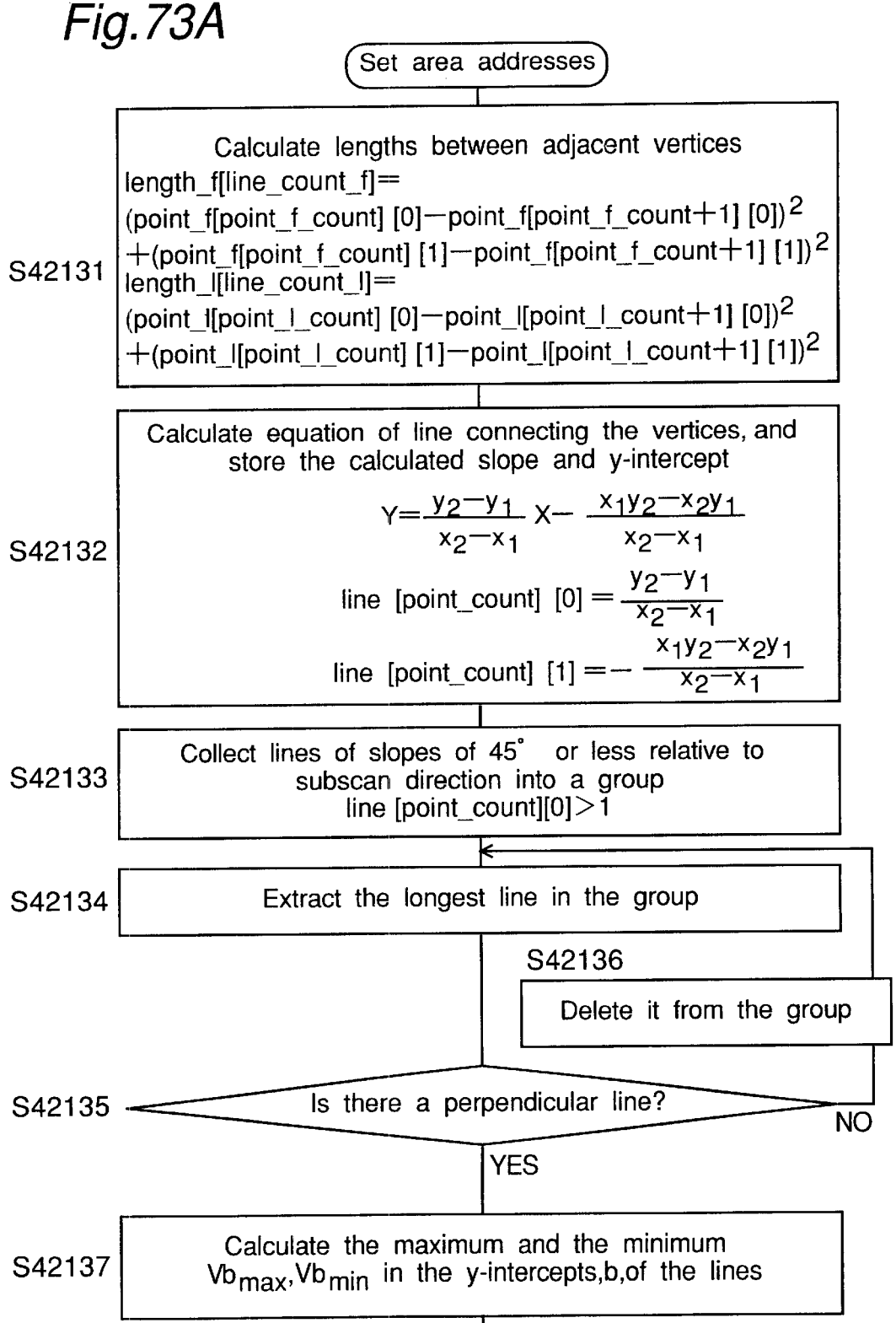
FIGS. 73A and 73B are flowcharts of area address setting in the fifth embodiment.
Figure 73B:
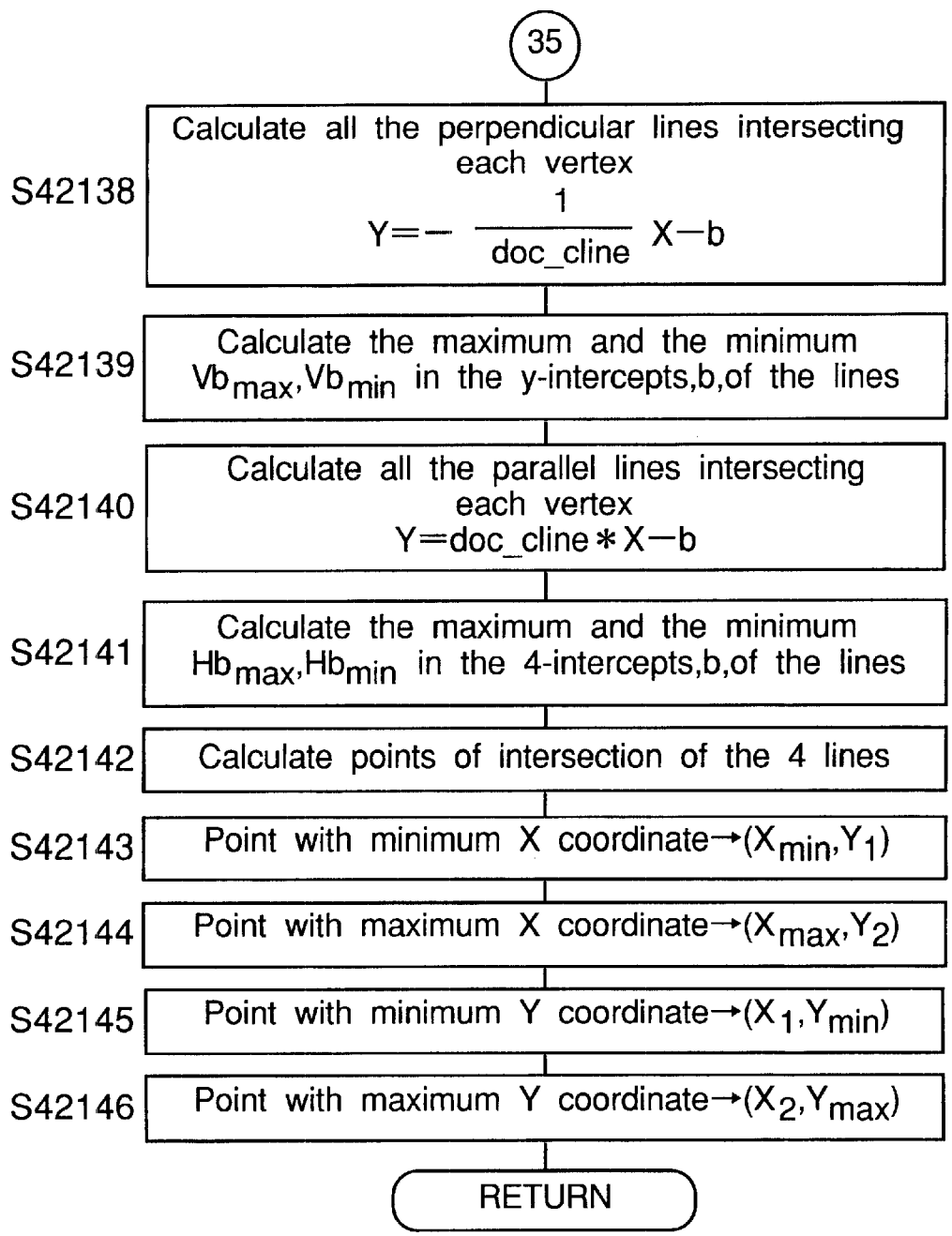

The image forming of the copying machine of this embodiment is the same as that of the second embodiment except the area address setting, and only the area address setting is explained here with reference to the flowcharts shown in FIGS. 73A and 73B. In the area address setting, after the vertices of a document are detected (step S1020 in FIG. 62), the coordinate addresses of the four points which define the document area are set.

First, lengths between vertices or the lengths of segments are calculated. Lengths between adjacent vertices are calculated first (step S42131). Because the distances are calculated for comparing them, a sum of squares of differences in x and y directions is calculated, as shown below. The adjacent vertices represent adjacent vertices of first and last edges including the first vertex of first edge (point_f[0][0], point_f[0][1]) and that of last edge (point_l[0][0], point_l[0][1]), and the last vertex of first edge (point_f[0][0], point_f[0][1]) and that of last edge (point_l[0][0], point_l[0][1]).

length_f[line_count_f]=(point_f[point_f_count][0]−point_f[point_f_count+1][0])$^2$+(point_f[point_f_count][1]−point_f[point_f_count+1][1])$^2$, length_l[line_count_l]=(point_l[point_l_count][0]−point_l[point_l_count+1][0])$^2$+(point_l[point_l_count][1]−point_l[point_l_count+1][1])$^2$, $$\text{length\_f}[0]=(\text{point\_l}[0][0]-\text{point\_f}[0][0])^2+(\text{point\_l}[0][1]-\text{point\_f}[0][1])^2, \qquad (54)$$

and $$\text{length\_l}[0]=(\text{point\_l}[\text{point\_l\_count}][0]-\text{point\_f}[\text{point\_f\_count}][0])^2+(\text{point\_l}[\text{point\_l\_count}][1]-\text{point\_f}[\text{point\_f\_count}][1])^2.$$

Next, the distances between the vertices are calculated, and two vertices, $(x_1, y_1)$, $(x_2, y_2)$, of the longest distance are selected (step S42132). Then, an equation of straight line connecting the selected two vertices is calculated as follows (step S42133).

$$Y=(y_2-y_1)/(x_2-x_1)*X-(x_1y_2-x_2y_1)/(x_2x-_1), \qquad (55)$$

wherein the slope is $(y_2-y_1)/(x_2-x_1)$ and the intercept is $-(x_1y_2-x_2y_1)/(x_2-x_1)$. The obtained slope and the intercept are stored in line[point_count][0] and line[point count][1].

Next, the obtained lines are grouped according as a segment has a slope equal to or smaller than 45° or not (step S42133). Slope line[point_count][0] of "1" means a segment of tilt angle of 45°. By extracting segments having slope of equal to or larger than 1 (line[point_count][0]>1), segments having a slope equal to or smaller than 45° relative to the subscan direction are determined. Next, the longest segment in the group of the extracted segments is extracted (step S42134).

In order to enhance the usefulness of the segment, it is checked whether there exists a segment perpendicular to the selected longest segment or not (step S42135). If no perpendicular segment exists, the longest segment is deleted from the group (step S412136), and the flow returns to step S42134 to repeat the extraction process. If there exists a segment perpendicular to the longest segment, the slope of the longest segment line[point_count][0 ] is set to the slope of the document doc_cline (step S42137).

Figure 74:
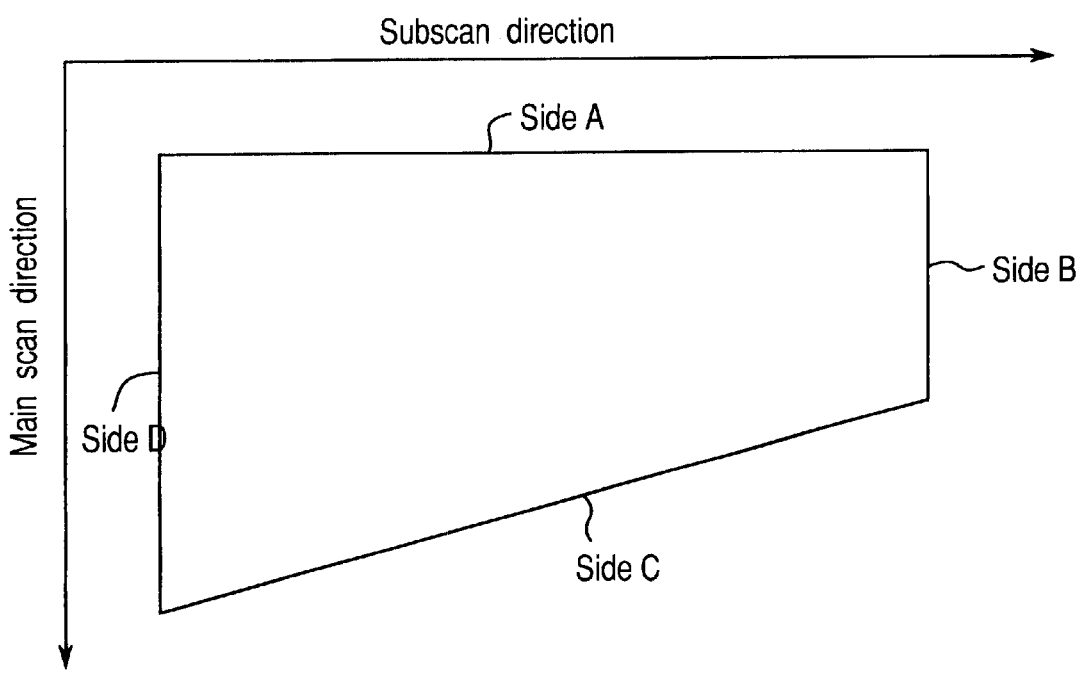
FIG. 74 is a diagram for explaining image reading.

As explained above, the longest segment belonging to the group of the segments having a slope of equal to or smaller than 45° and having a perpendicular segment is extracted, and as will be explained below, the slope of the document is determined based on the slope of the extracted segment. For example, in an example of a nonrectangular document shown in FIG. 74, the group of the segments having a slope of equal to or smaller than 45° consists of sides A, C, and the longest side is C in the group. However, it is apparent on this document that it is not suitable to determine the slope of the document based on side C. Side C has no segment perpendicular thereto. Then, side C is deleted from the candidates included in the group. Next, side A in the group is checked. The side A has perpendicular segments B and D. Then, side A is selected. Thus, even for a nonrectangular document, a correct side can be selected by considering the existence of perpendicular segment.

Next, in order to determine the document area, equations of all straight lines perpendicular to the segment calculated at step S4134 and passing the detected vertices are calculated (step S42138). An equation of the perpendicular lines is as follows:

$$Y=1/\text{doc\_cline}*X-b. \qquad (56)$$

The y-intercept or b is determined by assigning the coordinates of each vertex to X and Y. Then, the maximum $Vb_{max}$ and the minimum $Vb_{min}$ are calculated in the y-intercepts, b, of the lines (step S42139).

Further, equations of all straight lines in parallel to the line extracted at step S42134 and passing the detected vertices are extracted (step S42140). An equation of the parallel segments is as follows:

$$Y=\text{doc\_cline}*X-b, \qquad (57)$$

Then, the maximum $Hb_{max}$ and the minimum $Hb_{min}$ are calculated in the y-intercepts, b, of the segments calculated at step S32136 (step S42141).

Thus, the equations of the four segments enclosing the document area are calculated. The perpendicular segments are as follows:

$$Y=(x_2-x_1)/(y_2-y_1)*X-Vb_{max}, \qquad (58)$$

and $$Y=(x_2-x_1)/(y_2-y_1)*X-Vb_{min}. \qquad (59)$$

On the other hand, the parallel segments are as follows:

$$Y=(y_2-y_1)/(x_2-x_1)*X-Vb_{max}, \qquad (60)$$

and $$Y=(y_2-y_1)/(x_2-x_1)*X-Vb_{min}. \qquad (61)$$

Then, the intersections of the perpendicular and parallel segments (58)–(61) having the maximum and minimum y-intercepts are calculated to determine coordinates of the four points as a document area (step S42142). Next, the maxima and the minima of the X and Y coordinates in the coordinates of the four points are extracted, and they are denoted as $(X_{min}, Y_1)$, $(X_{max}, Y_2)$, $(X_1, \text{web } Y_{min})$ and $(X_2, Y_{max})$ (step S42143–S42146). Thus, the document area is detected.

As explained above, even if reading pitch is unequal in image reading of a document when a document is put at a tilt, appropriate document area and document slope can be detected precisely without error, and tilt angle rotation of image data is performed according to the result. Even if the document is nonrectangular, appropriate document area and document slope can be detected. Then, a user can obtain a copy of a document without bothering the position of the document on the platen glass, the slope of the document or the shape thereof.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image processing apparatus comprising:

a document setter, having an image reading area on which a document is put;

an image reader which reads the document put on said document setter;

a detector which detects an offset of the document from a standard position based on image data of the document read by said image reader, said detector including a means for determining an area of the entire document based on a portion of the document which exists within the image reading area in the case when the document extends beyond the image reading area;

a moving means for modifying the image data such that a position of the image data is moved to be located at a predetermined position when the offset of the document is detected by said detector; and a means for forming an image on a paper based on the modified image data.

2. The image processing apparatus according to claim 1, wherein the document to be detected is rectangular.

3. The image processing apparatus according to claim 1, wherein said moving means comprises a rotator to rotate the image data.

4. The image processing apparatus according to claim 3, wherein said detector detects sides of the document in the image reading area, estimates sides of the document extending beyond the image reading area, determines a paper size for image forming from the detected and estimated sides and sets parameters for image forming based on a tilt angle of the document, the paper size and the offset of the document.

5. The image processing apparatus according to claim 4, wherein said detector determines the sides of the document based on coordinates of the document area and estimates the tilt angle based on the determined sides.

6. The image processing apparatus according to claim 3, wherein said detector detects sides of the document and wherein said image processing apparatus further comprises a means for inhibiting said rotator from rotating the image data when said detector cannot detect the sides of the document.

7. The image processing apparatus according to claim 3, wherein said detector detects sides of the document and determines at least one tilt angle and wherein said image processing apparatus further comprises a means for inhibiting said rotator from rotating the image data when said at least one tilt angle is substantially different from other tilt angles obtained from the sides of the document.

8. The image processing apparatus according to claim 3, wherein said detector detects a document area and sides of the document and said detector further calculates a paper size from a rectangular size which corresponds to the detected document area and the detected sides.

9. The image processing apparatus according to claim 8, further comprising a means for inhibiting said rotator from rotating the image data when the calculated paper size is larger than a maximum paper size.

10. The image processing apparatus according to claim 8, further comprising a 90° rotation means for rotating the image by 90°, wherein said 90° rotation means and said rotator are activated while changing the direction of the paper when the calculated paper size exceeds a dimension of a current paper size but is smaller than the maximum paper size which can be prepared by the printer.

11. The image processing apparatus according to claim 1, wherein said detector detects sides of the document and determines a tilt of the document on said document setter based on a longest side in the detected sides of the document.

12. The image processing apparatus according to claim 1, wherein said detector detects a document area and sides of the document, said detector further calculates a paper size which corresponds to the detected document area and the detected sides, and wherein said detector calculates a parallel translation of the image data from the calculated paper size when two adjacent sides of the document exist in the detected sides.

13. A method for detecting a document comprising the steps of:

reading a document put on a document setter, having an image reading area on which a document to be read is put;

extracting edges of the document based on image data obtained by reading the document put on the image reading area;

obtaining lines of the document from the extracted edges;

determining edges along a longest line among the obtained lines of the document obtained from the extracted edges; and determining a slope of the document put on the document setter based on the edges along the longest line.

14. The method according to claim 13, further comprising the step of determining a document area in the image reading area based on the obtained lines and slope.

15. The method according to claim 13, further comprising the step of grouping the obtained lines according to the slope, wherein the slope of the document is determined by calculating a sum of slopes of the obtained lines in each group and the slope of the document is set as the slope of the group having the largest sum.

16. The method according to claim 15, wherein in said grouping step, a group consists of lines having a first slope and lines having a second slope which is perpendicular to the first slope.

17. An image forming apparatus comprising:

a document setter, having an image reading area on which a document is put;

an image reader which reads the document put on said document setter;

a detector which detects a document area of the document in the image reading area based on image data of the document read by said image reader;

a means for determining a rectangular area which includes the detected document area, said means for determining a rectangular area being adapted for determining a rectangular area even in the case when the document extends beyond the image reading area;

a means for determining a slope of the rectangular area;

a rotator which rotates the image data included in the rectangular area to correct a tilt of the document; and a printer which forms an image on a paper based on the image data rotated by said rotator.

18. The image forming apparatus according to claim 17, wherein said detector which detects a document area of the document comprises:

an edge detecting means for detecting edges of the document; and an extraction means for extracting edge change points as points at which a slope of a line changes between connecting adjacent edges; and a determining means for determining the document area based on the edge change points.

19. The image forming apparatus according to claim 18, wherein said detector which detects a document area of the document further comprises a means for detecting a slope of the document based on lines connecting the extracted edge change points, and said determining means determines the document area as a rectangular area having the slope of the document and including all the edge change points.

20. A method for detecting a document comprising the steps of:

reading a document put on a document setter, having an image reading area for reading a document which is put in the image reading area, by moving a scanner in the subscan direction for reading an image with a line sensor aligned in the main scan direction;

extracting edges of the document based on image data read from the document;

determining, from the extracted edges, edges of lines having slopes equal to or smaller than a predetermined angle relative to the subscan direction in the extracted edges; and determining a tilt of the document put on the document setter based on the determined edges of lines;

wherein in the step of determining the tilt of the document, the slope of a longest line in the lines having slopes equal to or smaller than the predetermined angle relative to the subscan direction is determined as the tilt of the document.

21. The method according to claim 20, wherein in the step of determining the tilt of the document, the slope of a longest line in the lines having slopes equal to or smaller than the predetermined angle relative to the subscan direction and having a line perpendicular thereto is determined as the tilt of the document.

* * * * *

UNITED STATES PATENT AND TRADEMARK OFFICE
CERTIFICATE OF CORRECTION

PATENT NO. : 6,433,896 B1
DATED : August 13, 2002
INVENTOR(S) : Kazuhiro Ueda et al.

It is certified that error appears in the above-identified patent and that said Letters Patent is hereby corrected as shown below:

Title page,
Insert -- [30]   Foreign Application Priority Data
              June 10, 1997       (JP)............. 9-152344
              December 15, 1997   (JP)............. 9-345216
              December 15, 1997   (JP)............. 9-345224
              December 15, 1997   (JP)............. 9-345225 --.

Column 39,
Line 47, delete "printer.", and insert -- means for forming an image. --.

Column 40,
Line 41 and 51, delete "The", and insert -- An --.

Column 42,
Line 3, delete "The", and insert -- A --.

Signed and Sealed this

Twentieth Day of July, 2004

JON W. DUDAS
*Acting Director of the United States Patent and Trademark Office*